US012491191B2

(12) United States Patent
Kang et al.

(10) Patent No.: US 12,491,191 B2
(45) Date of Patent: Dec. 9, 2025

(54) INHIBITION OF INTERACTION BETWEEN OCT4 AND MAPKAPK2 OR DNA-PKcs TO REGULATE c-MYC IN CANCER

(71) Applicant: Texas Tech University System, Lubbock, TX (US)

(72) Inventors: Min H. Kang, Lubbock, TX (US); Sung-Jen Wei, Lubbock, TX (US); Charles P. Reynolds, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 764 days.

(21) Appl. No.: 17/667,000

(22) Filed: Feb. 8, 2022

(65) Prior Publication Data

US 2022/0233554 A1 Jul. 28, 2022

Related U.S. Application Data

(63) Continuation-in-part of application No. PCT/US2020/045600, filed on Aug. 10, 2020.
(Continued)

(51) Int. Cl.
*A61K 31/58* (2006.01)
*A61K 31/357* (2006.01)
(Continued)

(52) U.S. Cl.
CPC ............ *A61K 31/58* (2013.01); *A61K 31/357* (2013.01); *A61K 31/4355* (2013.01);
(Continued)

(58) Field of Classification Search
CPC .. A61K 31/58; A61K 31/357; A61K 31/4355; A61K 31/437; A61K 31/506;
(Continued)

(56) References Cited

U.S. PATENT DOCUMENTS

| | | |
|---|---|---|
| 6,380,167 B1 | 4/2002 | Braude |
| 2007/0259837 A1 | 11/2007 | Meier et al. |
| 2009/0018088 A1 | 1/2009 | Valdes et al. |

OTHER PUBLICATIONS

Bogenberger et al. (Leukemia & Lymphoma, 2015, vol. 56, pp. 226-229) (Year: 2015).*
(Continued)

*Primary Examiner* — Scarlett Y Goon
*Assistant Examiner* — Sarah Grace Scrivener
(74) *Attorney, Agent, or Firm* — Shackelford, McKinley & Norton, LLP

(57) ABSTRACT

Embodiments of the present disclosure pertain to methods of treating a cancer in a subject by administering to the subject a compound that inhibits interaction between octamer-binding transcription factor 4 (OCT4) and Mitogen-activated protein kinase-activated protein kinase 2 (MAPKAPK2), OCT4 and DNA-dependent protein kinase catalytic subunit (DNA-PKcs), or combinations thereof. Additional embodiments of the present disclosure pertain to the compounds of the present disclosure. Further embodiments of the present disclosure pertain to methods of inhibiting interaction between OCT4 and MAPKAPK2 and/or OCT4 and DNA-PKcs by exposing protein complexes to the compounds of the present disclosure. Additional embodiments of the present disclosure pertain to methods of screening potential inhibitors of protein-protein interaction between a first protein and a second protein.

6 Claims, 45 Drawing Sheets

Specification includes a Sequence Listing.

Related U.S. Application Data

(60) Provisional application No. 62/884,249, filed on Aug. 8, 2019.

(51) Int. Cl.
| | |
|---|---|
| *A61K 31/4355* | (2006.01) |
| *A61K 31/437* | (2006.01) |
| *A61K 31/506* | (2006.01) |
| *A61K 31/53* | (2006.01) |
| *A61K 31/7048* | (2006.01) |
| *A61P 35/00* | (2006.01) |
| *A61P 35/02* | (2006.01) |

(52) U.S. Cl.
CPC .......... *A61K 31/437* (2013.01); *A61K 31/506* (2013.01); *A61K 31/53* (2013.01); *A61K 31/7048* (2013.01); *A61P 35/00* (2018.01); *A61P 35/02* (2018.01)

(58) Field of Classification Search
CPC ..... A61K 31/53; A61K 31/7048; A61P 35/00; A61P 35/02
See application file for complete search history.

(56) References Cited

OTHER PUBLICATIONS

Ingrassia et al. (Transitional Oncology, 2008, vol. 1, pp. 1-13) (Year: 2008).*
Mill et al. (Blood, published Jul. 4, 2019, vol. 134, pp. 59-73) (Year: 2019).*
Matveenko et al. (Chemistry & Biodiversity, 2009, vol. 6 pp. 685-691) (Year: 2009).*
International Search Report for PCT/US20/45600, Mailed on Jan. 14, 2021.
Lin et al., Survival of Cancer Stem Cells under Hypoxia and Serum Depletion via Decrease in PP2A Activity and Activation of p38-MAPKAPK2-HSP27, PLOS One, 2012, vol. 7(11).
Jerabek et al., OCT4: Dynamic DNA Binding Pioneers Stem Cell Pluripotency, Blochmica et al.Biophysica Acta, 2014, vol. 18339, pp. 138-154.
Spelat et al., Serine 111 Phosphorylation Regulates OCT 4 Protein Subcellular Distribution and Degradation, The Journal of Biological Chemistry, 2012, vol. 287 (45), pp. 38279-38288.

* cited by examiner

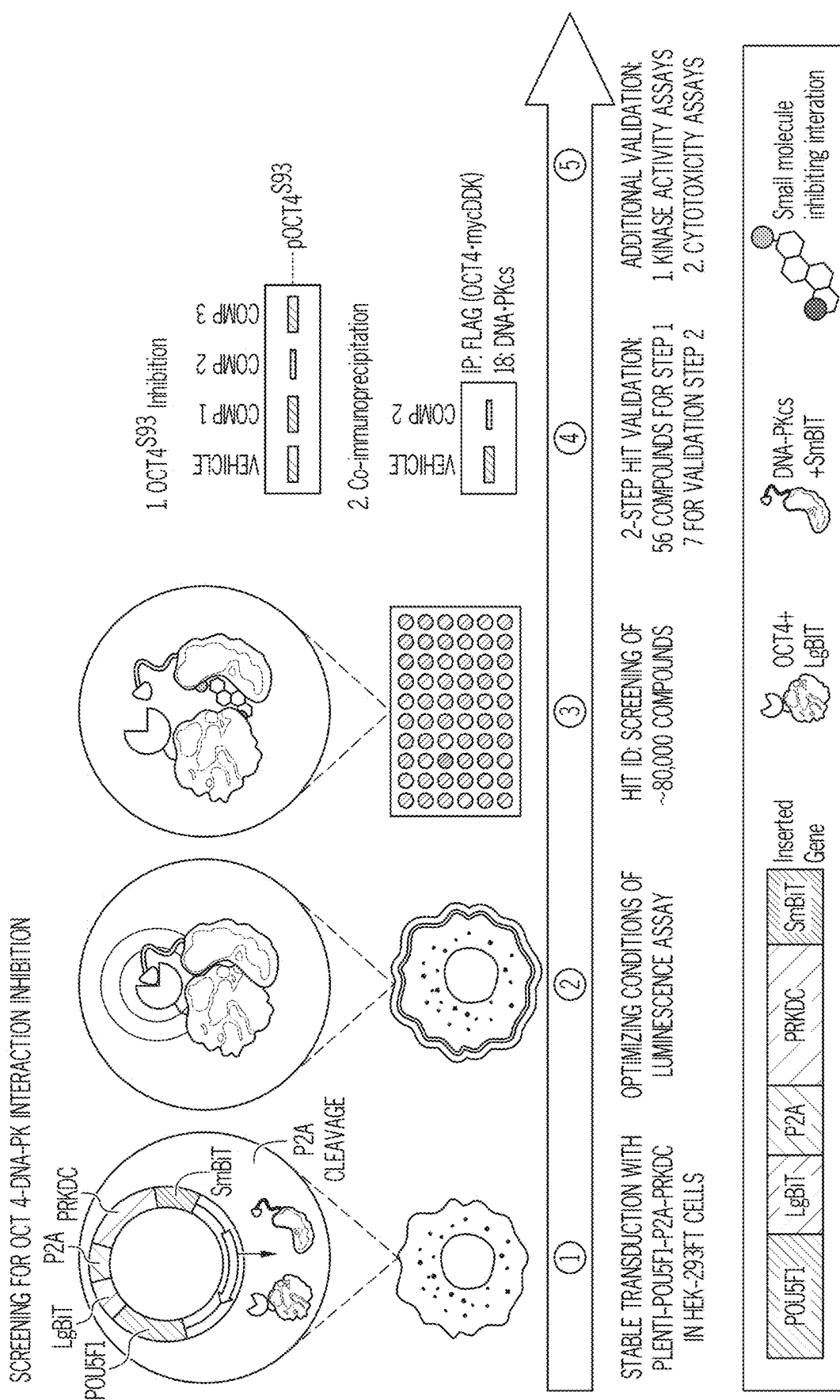
FIG. 3A1

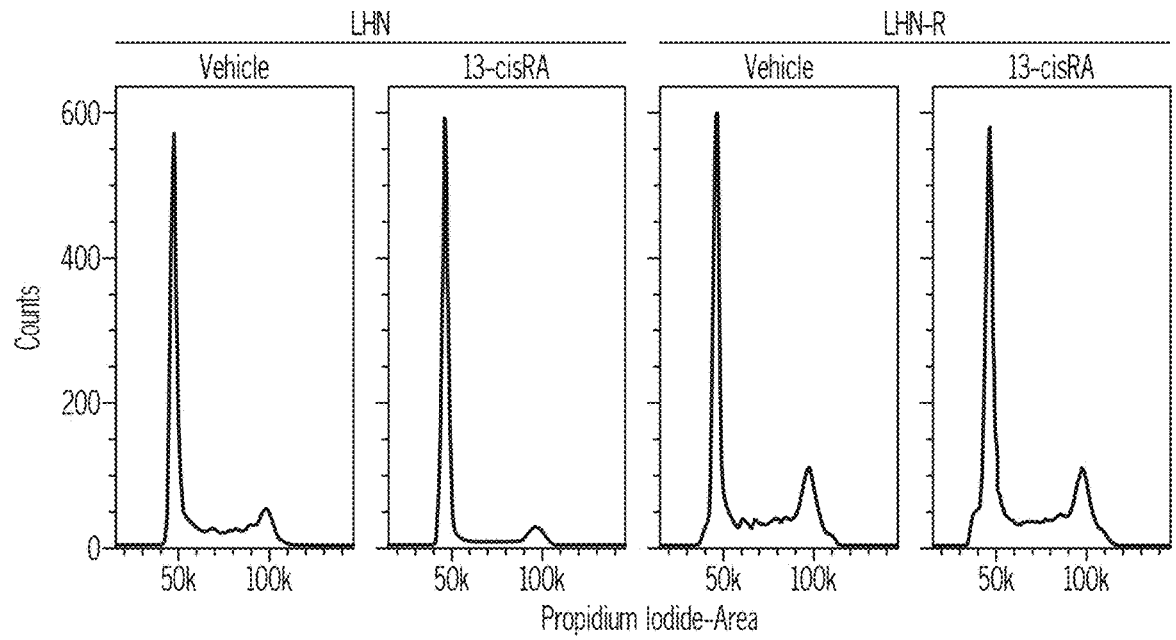
FIG. 4E
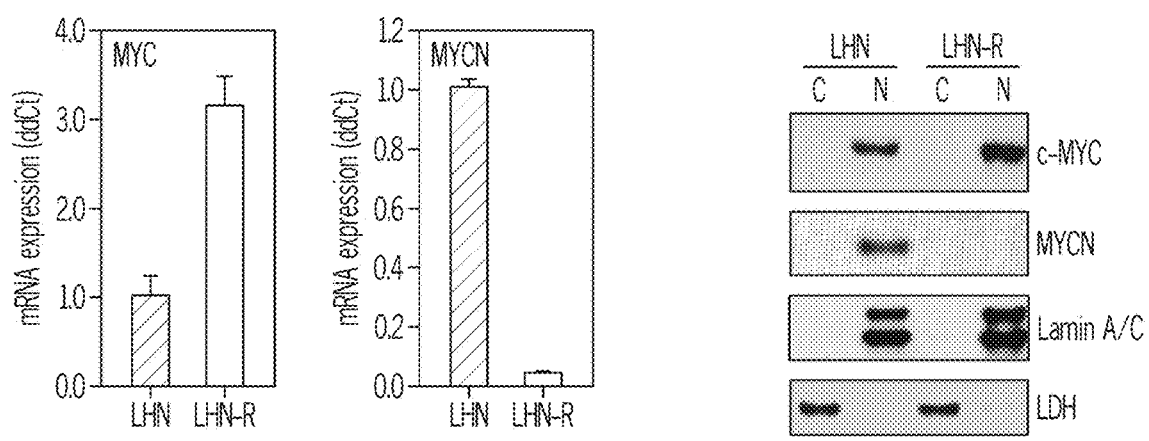
FIG. 4F
FIG. 4G

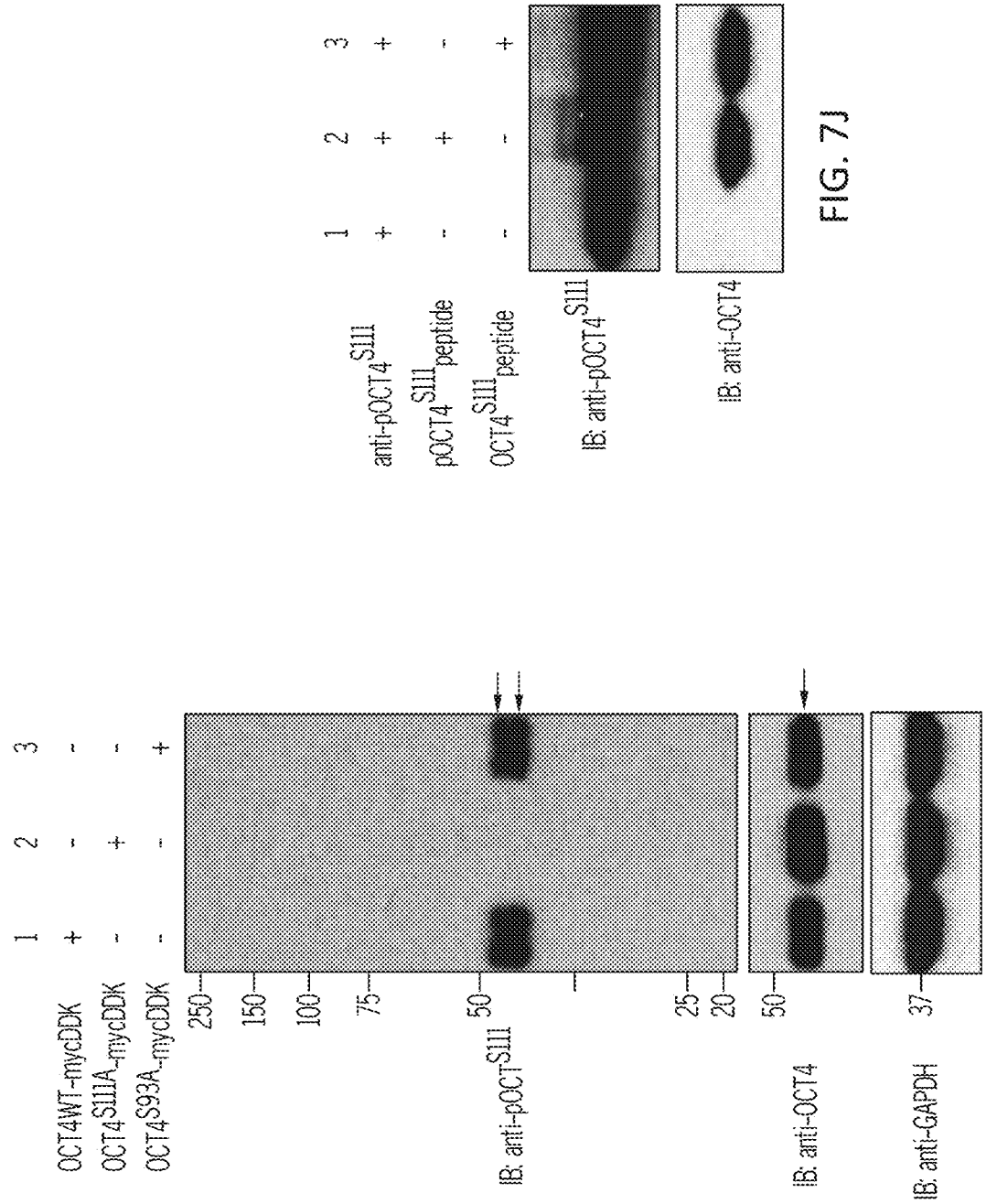

INHIBITION OF INTERACTION BETWEEN OCT4 AND MAPKAPK2 OR DNA-PKcs TO REGULATE c-MYC IN CANCER

CROSS-REFERENCE TO RELATED APPLICATIONS

This application is a continuation-in-part application of PCT/US20/45600, filed on Aug. 10, 2020, which claims priority to U.S. Provisional Patent Application No. 62/884,249, filed on Aug. 8, 2019. The entirety of each of the aforementioned applications is incorporated herein by reference.

STATEMENT REGARDING FEDERALLY SPONSORED RESEARCH

This invention was made with government support under R01 CA232591 awarded by the National Institutes of Health. The government has certain rights in the invention.

BACKGROUND

Current methods of treating cancers have numerous limitations, including limited specificity to cancer and non-responsiveness to further therapy. As such, a need exists for more specific and effective therapeutics and methods for treating cancer. Embodiments of the present disclosure address the aforementioned need.

SUMMARY

In some embodiments, the present disclosure pertains to methods of treating a cancer in a subject by administering to the subject a compound. In some embodiments, the compound inhibits interaction between octamer-binding transcription factor 4 (OCT4) and Mitogen-activated protein kinase-activated protein kinase 2 (MAPKAPK2), OCT4 and DNA-dependent protein kinase catalytic subunit (DNA-PKcs), or combinations thereof. In some embodiments, the compound includes, without limitation, one or more of the following:

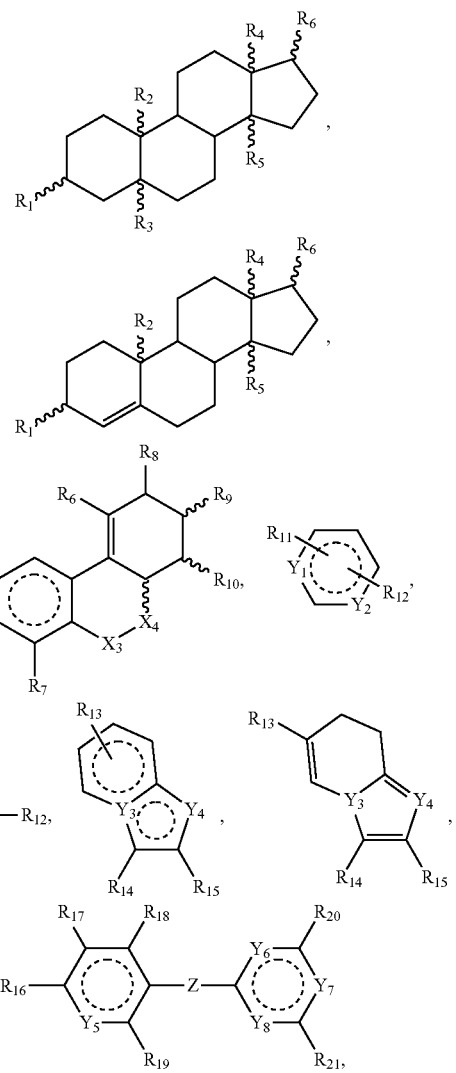

DNA protein kinase inhibitors, derivatives thereof, and combinations thereof.

In some embodiments, the compound includes, without limitation, one or more of the following structures:

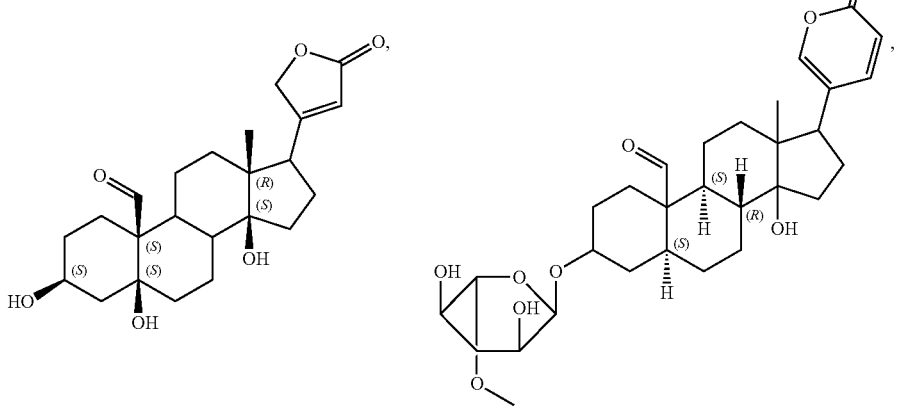

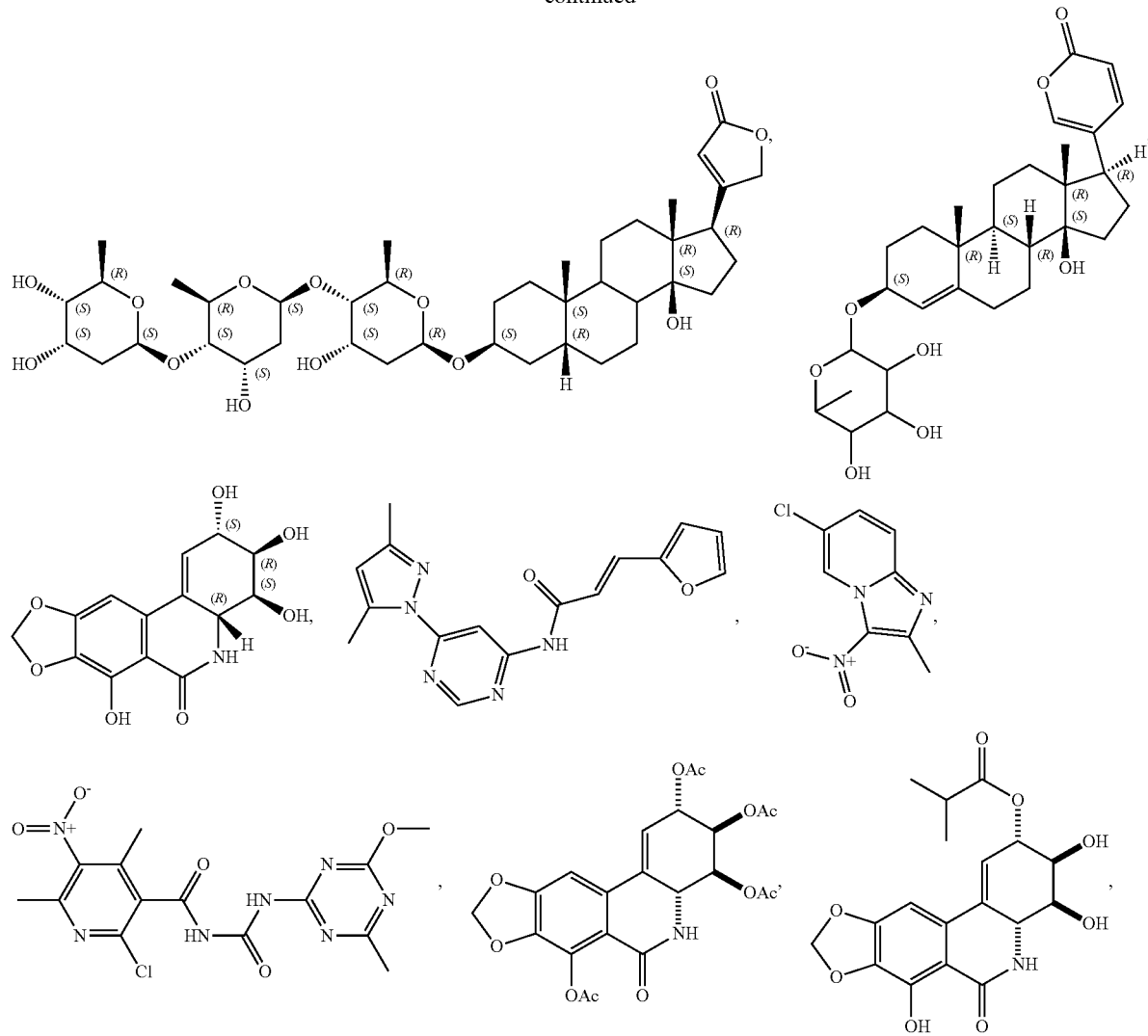

derivatives thereof, and combinations thereof.

In some embodiments, the compound includes a DNA protein kinase inhibitor. In some embodiments, the DNA protein kinase inhibitor includes, without limitation, narciclasine, M3814, NU7441, CC-115, AZD 7648, derivatives thereof, or combinations thereof.

In some embodiments, the compound also includes a BCL-2 inhibitor. In some embodiments, the BCL-2 inhibitor includes, without limitation, ABT-737, ABT-263, ABT-199, derivatives thereof, or combinations thereof.

In some embodiments, the compound includes a DNA protein kinase inhibitor and a BCL-2 inhibitor. In some embodiments, the DNA protein kinase inhibitor includes narciclasine and the BCL-2 inhibitor includes ABT-737. In some embodiments, the DNA protein kinase inhibitor includes narciclasine, and the BCL-2 inhibitor includes ABT-199. In some embodiments, the DNA protein kinase inhibitor includes M3814, and the BCL-2 inhibitor includes ABT-737. In some embodiments, the DNA protein kinase inhibitor includes M3814, and the BCL-2 inhibitor includes ABT-263.

In some embodiments, the compounds of the present disclosure inhibit c-MYC activation. In some embodiments, the compounds of the present disclosure are in a composition that includes at least one pharmaceutically acceptable carrier, such as at least one excipient.

Additional embodiments of the present disclosure pertain to the compounds of the present disclosure. The compounds and methods of the present disclosure can be utilized to treat various types of cancers. For instance, in some embodiments, the cancers include, without limitation, cancers associated with c-MYC overexpression, cancers where the c-MYC oncogene is activated via OCT4, neuroblastomas, small cell lung cancers, leukemia, acute myelogenous leukemia (AML), and combinations thereof.

Additional embodiments of the present disclosure pertain to methods of inhibiting interaction between OCT4 and MAPKAPK2, OCT4 and DNA-PKcs, or combinations thereof. The methods of the present disclosure generally include exposing protein complexes to the compounds of the present disclosure. In some embodiments, the exposure occurs in a solution containing purified proteins or cell lysates. In some embodiments, the exposure occurs in vitro in isolated live cells.

Additional embodiments of the present disclosure pertain to methods of screening potential inhibitors of protein-protein interaction between a first protein and a second protein by (1) co-expressing the first protein and the second protein in cells, where the first protein and the second protein are expressed from the same promoter, where the first protein is labeled with a first label, where the second protein is labeled with a second label, and where the protein-protein interaction results in a luminescence or fluorescence as a result of the proximity of the first label to the second label; (2) adding a potential inhibitor of the protein-protein interaction to the cells; (3) detecting for the presence, absence or reduction of the luminescence or fluorescence; and (4) classifying the potential inhibitor as an inhibitor or non-inhibitor of the protein-protein interaction based on the detected luminescence or fluorescence. For instance, the presence of the luminescence or fluorescence results in the classification of the potential inhibitor as a non-inhibitor of the protein-protein interaction. Likewise, the absence or reduction of the luminescence or fluorescence results in the classification of the potential inhibitor as an inhibitor of the protein-protein interaction.

DESCRIPTION OF THE DRAWINGS

FIGS. 3A1, 3A2 and 3B provide schematics of initial screening and a two-step hit validation for the identification of interaction inhibitors. FIGS. 3A1 and 3A2 provide summaries of an initial screening that was done after co-transfection of wild-type POU5F1 tagged with LgBit and fragment 6 of MAPKAPK2 or PRKDC tagged with SmBit. Once stable clones were established, cells were seeded in a 96-well plate and were treated with an inhibitor. Decreased luminescence indicated a positive hit. FIG. 3B provides a two-step hit validation. Hit validation #1 determined the expression of pOCT4-S111 or pOCT4-S93 in NCI-H82 cells. Compounds that were deemed hits from the first validation were then further analyzed to determine their effect on the interaction between OCT4 and endogenously-expressed MK2 or DNA-PKcs (Hit validation #2).

FIGS. 4A, 4B, 4C1, 4C2, 4D, 4E, 4F, and 4G provide data indicating that expression of c-MYC is increased in patient-derived neuroblastoma cell lines of PD and confers resistance to 13-cisRA. FIGS. 4A and 4B provide data showing that protein expression of c-MYC and MYCN in patient-derived neuroblastoma cell lines established from clinical samples collected at diagnosis (Dx) (FIG. 4A) and progressive disease 5 (PD) (FIG. 4B). CHLA-20 and SK—N-BE(2) were used as the positive controls for c-MYC and MYCN. FIG. 4C1 and FIG. 4C2 show dot plots quantitating immunoblotting (IB) data in FIGS. 4A and 4B. The values were normalized in two ways by the intensity of specific proteins in CHLA-20 for c-MYC or SK—N-BE(2) for MYCN and GAPDH. FIG. 4D shows the morphology of SMS-LHN (LHN) cells that were treated with vehicle control or 5 µM 13-10 cisRA for 14 days and SMS-LHN-R (LHN-R, selected for resistance to 13-cisRA) cells. Cells were treated with 5 µM 13-cisRA for 14 days. FIG. 4E shows cell cycle analyses of LHN and LHN-R cells treated with vehicle control or 5 µM 13-cisRA for 14 days. Triplicate samples of 10,000 events were collected as single cells for the analyses. FIG. 4F shows basal mRNA levels of MYC and MYCN in LHN and LHN-R cells. Relative quantitation ($2^{-\Delta\Delta CT}$) was used for the analyses of mRNA expression. In LHN-R relative to LHN, MYCN expression was significantly decreased while MYC expression was increased (p<0.05). FIG. 4G shows the expression of c-MYC and MYCN in subcellular fractions (C: cytosolic, N: nuclear) of LHN and LHN-R cells. LDH (cytosolic protein) and Lamin A/C (nuclear protein) were used as fractionation quality controls.

FIG. 5A shows confirmation of OCT4 and TCF3 increase that was observed in a combo protein/DNA array in LHN and LHN-R by IB. FIG. 5B shows expression of pluripotency factors (Nanog, SOX2, FGF4, UTF1) in subcellular fractions of LHN and LHN-R cells by IB. FIG. 5C shows transcription activation of MYC by OCT4 and TCF3. TCF3 and OCT4 were evaluated in inducing MYC transcription activity using a MYC (−1/−1899) luciferase reporter gene assay in HEK293FT cells. The mLef1 and β-Catenin were used as positive controls for driving MYC transcription. FIG. 5D shows increased c-MYC protein by transiently co-transfecting transcription factors in FIG. 5C (OCT4, OCT4+TCF3, or positive controls) into HEK293FT cells. The changes in c-MYC, CDK4, and MYCN were measured by IB. FIG. 5E shows the determination of OCT4-binding sites in MYC promoter region. Top: MetLuc reporter constructs with a series of MYC genomic DNA fragments. Bottom: the MetLuc reporter constructs (4 µg) $MYC^{-1/-1899}$, $MYC^{-547/-1554}$, $MYC^{-1/-546}$, $MYC^{-946/-1554}$, $MYC^{-547/-945}$, $MYC^{-946/-1223}$, $MYC^{-15}$ were co-transfected with pCMV6-POU5F1-mycDDK (4 µg) into HEK293FT cells and MetLuc enzymatic activity was measured. CMV immediate early promoter (pCMV IE) was a positive control. FIG. 5F shows OCT4 binding to the proximal enhancer region of MYC confirmed by chromatin immunoprecipitation (ChIP) assay in LHN-R cells. Left: Locations of the four sets of amplicons (a, b, c, and d) used to detect ChIP-enriched DNA fragments in the MYC enhancer region shown relative to the transcription start site (arrow). Right: PCR results detecting enriched fragments from ChIP assays of each of the 4 amplicons using ChIP-grade OCT4-1 and OCT4-2 antibodies or control normal rabbit IgG antibody. FIG. 5G shows c-MYC and Cyclin A protein levels in stable clones of LHN-R cells transduced with shRNA targeting POU5F1 (POU5F1-shRNA-1 to -5) relative to non-targeting shRNA (NT-shRNA) measured by IB. FIG. 5H shows cell cycle analyses of LHN-R cells stably transduced with either NT-shRNA or POU5F1-shRNA-2, and then treated with either vehicle control or 13-cisRA for 14 days. FIG. 5I shows neurite outgrowth in LHN-R cells stably transduced with either NT-shRNA or POU5F1-shRNA-2, and treated with either vehicle control or 13-cisRA for 14 days. Cells were imaged by confocal microscopy. Blue: DAPI stained nucleus, Green: Phalloidin.

FIG. 6A shows Coomassie brilliant blue stained SDS-PAGE gel separating immuno-precipitated subcellular fractions of cells with exogenous OCT4 expression using anti-FLAG antibody. M: Marker, C: cytosolic, N: nuclear. For protein ID, the entire lanes were analyzed, and for PTM, the specific OCT4 band was subjected to mass spectrometry analyses. (Right) OCT4 protein sequence with PTM status identified by mass spectrometry. Underline: mass spectrometry coverage, Green: not phosphorylated or acetylated, Red: phosphorylated, acetylated, or undetermined. FIG. 6B shows predicted PTM sites in NTD and POUs domains of OCT4 interacting with MK2 ($S^{111}$) and DNA-PKcs ($S^{93}$). FIG. 6C shows direct interaction of MK2 or DNA-PKcs with OCT4 confirmed by immunoprecipitation in LHN-R cells stably transduced with the doxycycline-inducible construct of wild-type OCT4 with myc-DDK-tag (Left). The direct interaction between OCT4 and MK2 is also confirmed by Ni-NTA pull down (Middle) or immunoprecipitation by FLAG (Right) using purified proteins. FIG. 6D shows the effect of stable MAPKAPK2 knockdown on OCT4 and c-MYC protein expression in LHN-R (selected for resistance to 13-cisRA in the laboratory) and COG-N-508h (established from a PD patient sample after 13-cisRA treatment). FIG. 6E shows protein expression of OCT4, MK2, Cyclin A, and NeuN (mature neuronal marker) in LHN-R cells with MAPKAPK2 knockdown. Cells stably transduced with non-targeting NT-shRNA or MAPKAPK2-shRNA were treated with vehicle control or 13-cisRA for 14 days. FIG. 6F shows reversal of 13-cisRA resistance shown as neurite outgrowth in MAPKAPK2 knockdown LHN-R cells. Cells stably transduced with non-targeting NT-shRNA or MAPKAPK2-shRNA were treated with vehicle control or 13-cisRA for 14 days. FIG. 6G shows reversal of 13-cisRA resistance shown as cell cycle arrest in MAPKAPK2 knockdown LHN-R cells. Cells stably transduced with non-targeting NT-shRNA (20±2% vs 18±3%, 15 p=0.17) or MAPKAPK2-shRNA (19±4% vs 5±1%, p<0.01) were treated with vehicle control or 13-cisRA for 14 days.

FIGS. 7A-7J show data establishing MK2 as a biomarker for 13-cisRA resistance and prognosis of neuroblastoma patients. FIG. 7A shows a positive correlation between MYC and MAPKAPK2 in 249 neuroblastoma patients. The expression data were extracted from the neuroblastoma NCI TARGET database. FIG. 7B shows an inverse correlation between MYCN and MAPKAPK2 in 249 neuroblastoma patients. FIG. 7C shows an overall survival of patients by MAPKAPK2 mRNA expression in neuroblastoma from the NCI TARGET database. Of the total patients (n=247), only patients with MYCN non-amplification (n=175) were used for the analysis. The data was scanned to identify maximum separation of the curves, and the p value was adjusted by Bonferroni adjustment. FIG. 7D shows a comparison of MK2 protein expression by immunohistochemistry staining in neuroblastoma patient samples collected at Dx with low expression of both MYCN and c-MYC proteins (upper panel) and with high c-MYC protein (lower panel) expression. FIG. 7E shows constructs (plasmid: pGEX-4T-1) encoding a human wild-type OCT4 or OCT4 mutants (S93A and S111A) with a GST tag and thrombin cleavage site at the $NH_2$-terminus. FIG. 7F shows human recombinant OCT4 proteins expressed in BL21/DE3 strain of *E. coli* after IPTG induction, GST column purification, and thrombin cleavage subjected to SDS-PAGE and stained with Coomassie brilliant blue solution. FIG. 7G shows proteins in FIG. 7F detected by IB using anti-OCT4 antibody. FIG. 7H shows an in vitro kinase assay of MK2 on phosphorylating OCT4WT and $OCT4^{S111A}$. FIG. 7I shows specificity of anti-$pOCT4^{S111}$ antibody tested in LHN-R cells with exogenous expression of OCT4WT, $OCT4^{S111A}$, and $OCT4^{S93A}$. FIG. 7J shows specificity of anti-$pOCT4^{S111}$ antibody tested by neutralizing antibody with $pOCT4^{S111}$ peptide or $OCT4^{S111}$ peptide, and detecting $pOCT4^{S111}$ in LHN-R cells, stably expressing OCT4WT.

FIG. 8A shows c-MYC, OCT4, phosphoOCT4 ($pOCT4^{S111}$), MK2, and phosphoMK2 ($pMK2^{T334}$) expression in patient-derived neuroblastoma cell lines established from Dx clinical samples. CHLA-20 was used as the control for the two membranes. FIG. 8B shows c-MYC, OCT4, phospho-OCT4 ($pOCT4^{S111}$, MK2, and phosphoMK2 ($pMK2^{T334}$) expression in patient-derived neuroblastoma cell lines established from PD clinical samples. CHLA-20 was used as the control for the two membranes. * no 13-cisRA received. FIG. 8C shows c-MYC, OCT4, phospho-OCT4 ($pOCT4^{S111}$), MK2, and phosphoMK2 ($pMK2^{T334}$) expression in isogenic Dx-PD pairs of neuroblastoma cell lines (Dx and PD from the same patient). CHLA-20 was used as the control for the different membranes. CHLA-78 (Dx) and CHLA-95 (PD) is a pair established from patients before 13-cisRA became standard of care for high-risk neuroblastoma. * no 13-cisRA received. FIG. 8D shows dot plots quantitating IB data from FIGS. 8A and 8B. The values were normalized in two ways by the expression of specific proteins in CHLA-20 and GAPDH. FIG. 8E shows dot plots of c-MYC and pMK2 protein expression in Dx, PD treated with 13-cisRA 15 (cisRA), and PD not treated with 13-cisRA (no cisRA) cell lines. ** & *: significant, ns: not significant. FIG. 8F shows that OCT4 at S111 residue is phosphorylated in LHN-R. OCT4WT and $OCT4^{S111A}$ mutants were exogenously expressed in LHN-R cells. The expression of $pOCT4^{S111}$, OCT4, c-MYC, and Cyclin A was evaluated in subcellular fractions. FIG. 8G shows that OCT4 stability was decreased in OCT4 mutant relatively to OCT4WT, shown by cyclohexamide (CHX) treatment. The cells transduced with a doxycycline-inducible system to exogenously express OCT4WT or OCT4 S111A mutant, treated with doxycycline (Dox) for 48h followed by cycloheximide (CHX) incubation for various times. The whole cell lysates were subjected to sill immunoblotting. FIG. 8H shows decreased pOCT4, $OCT4^{S111}$, c-MYC, and Cyclin A in LHN-R, CHLA-20 (PD cell line established before 13-cisRA became standard of care), COG-N-289, COG-N-334, and COG-N-415 (the last three PD cell lines were established from patients treated with 13-cisRA) treated with an MK2 inhibitor (PF3644022).

FIG. 9A shows c-MYC, OCT4, phosphoOCT4 ($pOCT4^{S111}$), MK2, and phosphoMK2 ($pMK2^{T334}$) expression in patient-derived xenografts (PDXs) of neuroblastoma established from clinical samples of Dx and progressive disease. COG-N-603x and COG-N-623x were established from the same patient at diagnosis and at progressive disease. CHLA-20 was used as the control for the two membranes. * COG-N-603x and COG-N-623x are matched Dx-PD pair patient-derived xenografts, and their matched pair cell lines are COG-N-603h and COG-N-623h shown in FIG. 8C. FIG. 9B shows dot plots quantitating immunoblotting data from FIG. 9A. The values were normalized in two ways by the expression of specific proteins in CHLA-20 and GAPDH. FIG. 9C shows correlation between c-MYC and $pOCT4^{S111}$, c-MYC and $pMK2^{T334}$, and $pOCT4^{S111}$ and $pMK2^{T334}$. The results of linear regression analyses with 95% confidence interval (dotted line) are presented. FIG. 9D shows proposed mechanism of c-MYC transcriptional activation in progressive disease neuroblastoma. MK2 shuttles into nuclear of cells and phosphorylates OCT4 at S111 residue. There are two OCT4 binding sites in the c-MYC promoter/enhancer region between −1204 and −1140. The binding of pOCT4$^{S111}$ increases transcriptional activation of MYC. DNA-PKcs another kinase that binds to OCT4. Future investigation will define the role of DNA-PKcs in phosphorylating OCT4 and transcriptionally activating MYC.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Current methods of treating cancers have numerous limitations, including limited specificity to cancer and non-responsiveness to further therapy. For instance, neuroblastoma is the most common malignant solid tumor found in children. Approximately one in every 7,000 children is affected at some time. High-risk neuroblastoma patients fall into the following categories: (1) individuals older than 18 months old with stage 4 disease; (2) stage 3 with unfavorable histopathology; and (3) any neuroblastoma tumor with MYCN gene amplification. The five-year survival rate for patients with high-risk neuroblastoma is between 40-50%, compared to 95% five-year survival in low risk patients. Several germ line mutations have been associated with a predisposition towards neuroblastoma formations, such as ALK gene mutation, PHOX2B mutation, and germ line deletion of 1p36 or 11q14-23 loci.

Studies show that intensive myeloablative therapy along with autologous hematopoietic stem cell transplantation (ASCT) improved outcome for high-risk neuroblastoma, especially if patients received either 13-cis-retinoic acid to treat minimal residual disease or 13-cis-retinoic acid and dinutuximab +cytokines after ASCT as maintenance therapy.

Current treatment of high-risk neuroblastoma with non-myeloablative chemotherapy only also achieves positive results. However, 80-90% of patients develop progressive disease (PD) refractory to further therapy.

As such, a need exists for more effective therapeutics and methods for treating various cancers. Embodiments of the present disclosure address the aforementioned need.

Figure 1A:
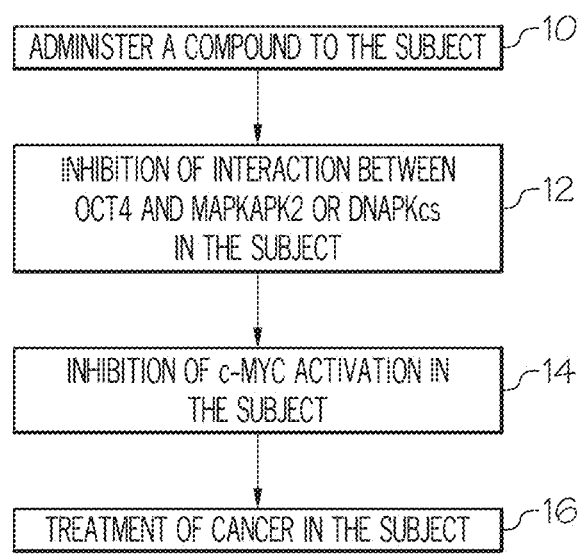
FIG. 1A provides a method of treating a cancer in a subject by administering a composition of the present disclosure to the subject.

In some embodiments, the present disclosure pertains to methods of treating a cancer in a subject. In some embodiments illustrated in FIG. 1A, the methods of the present disclosure include: administering a compound to the subject (step 10). In some embodiments, the administration of the compound inhibits interaction between octamer-binding transcription factor 4 (OCT4) and Mitogen-activated protein kinase-activated protein kinase 2 (MAPKAPK2) and/or OCT4 and DNA-dependent protein kinase catalytic subunit (DNA-PKcs) in the subject (step 12). In some embodiments, the aforementioned inhibition results in the inhibition of c-MYC activation in the subject (step 14) and the subsequent treatment of the cancer in the subject (step 16).

In additional embodiments, the present disclosure pertains to methods of inhibiting interaction between OCT4 and MAPKAPK2 and/or OCT4 and DNA-PKcs by exposing protein complexes to the compounds of the present disclosure. In further embodiments, the present disclosure pertains to the compounds of the present disclosure.

As set forth in more detail herein, the methods and compounds of the present can have numerous embodiments. In particular, the compounds of the present disclosure can include numerous compounds. Moreover, various methods may be utilized to administer the compounds of the present disclosure to various subjects in order to treat various cancers through various mechanisms. In addition, various methods may be utilized to inhibit interactions between OCT4 and MAPKAPK2 or DNA-PKcs by exposing various protein complexes in various environments to the compounds of the present disclosure.

Compounds

The present disclosure can utilize numerous compounds. For instance, in some embodiments, the compounds of the present disclosure include, without limitation, one or more of the following:

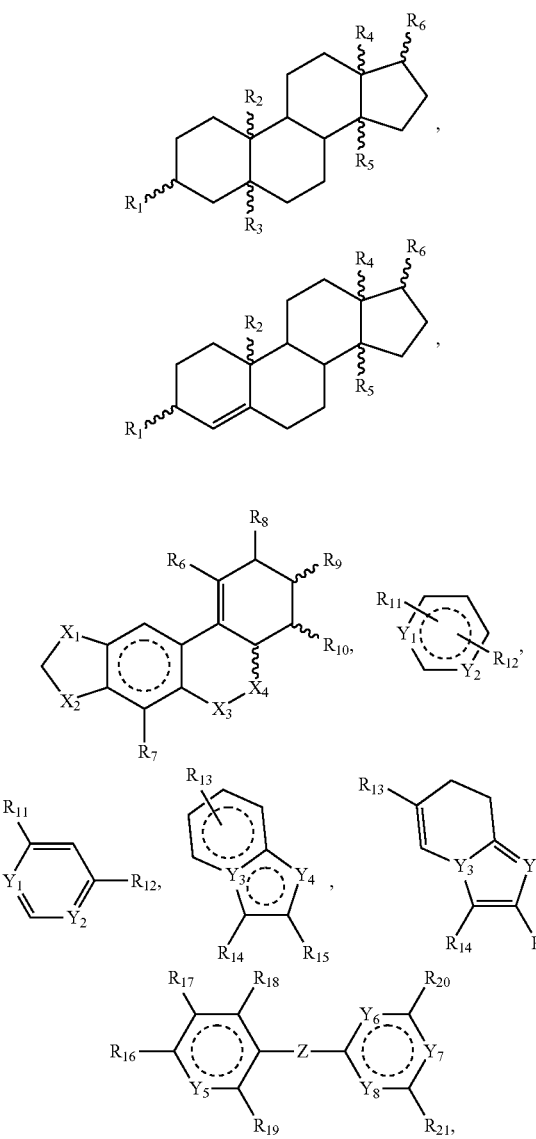

DNA protein kinase inhibitors, derivatives thereof, and combinations thereof.

The aforementioned compounds can include numerous R, X, Y and Z groups. For instance, in some embodiments, each of $R_0$ to $R_{22}$ independently includes, without limitation, H, OH, $NO_2$, Cl, an aldehyde, a carbonyl group, a ketone group, a methyl group, an alkyl group, an aryl group, a methoxy group, an alkoxyl group, a carboxyl group, an acetoxy group, an acetyl group, an ester group, a carboxylate ester group, an alkyl ester group, a furan, 2-furanone, a saccharide, a polysaccharide, a tetrahydropyran, a polytetrahydropyran, a pyrone, a pyrazole, an enamide, and a halogen.

In some embodiments, each of $X_1$ to $X_4$ in the aforementioned compounds independently include, without limitation, O, CO, NH, $NR_{22}$, SH, and $CH_2$. In some embodiments, each of $Y_1$ to $Y_8$ in the aforementioned compounds independently include, without limitation, CH, N, and S.

In some embodiments, Z in the aforementioned compounds represents a linker. In some embodiments, Z is a polyamide-based linker.

The aforementioned compounds can also have various stereochemistries. For instance, in some embodiments, each of $R_1$ to $R_6$, $R_8$ to $R_{10}$ and $X_4$ can be in an R or S configuration.

In some embodiments, the compounds of the present disclosure include the following structure:

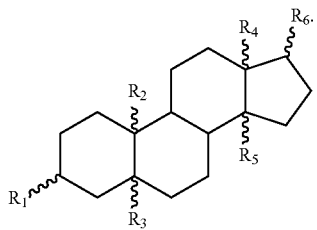

In more specific embodiments, the compounds of the present disclosure include, without limitation:

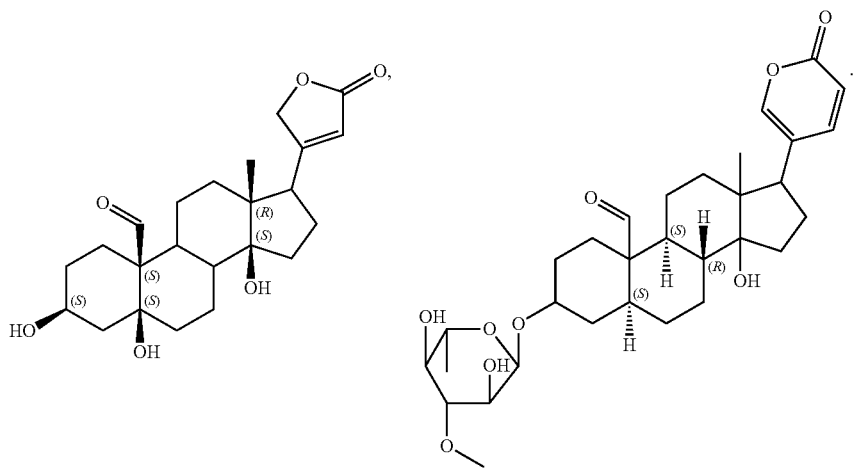

-continued

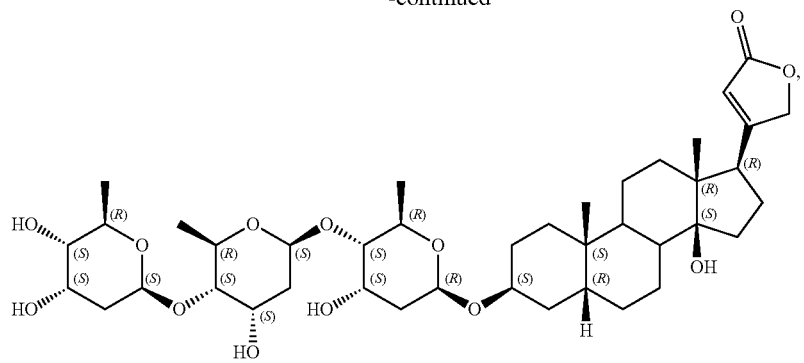

derivatives thereof, and combinations thereof.

In some embodiments, the compounds of the present disclosure include the following structure:

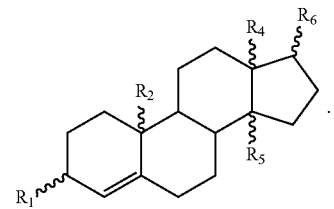

In more specific embodiments, the compounds of the present disclosure include the following structure:

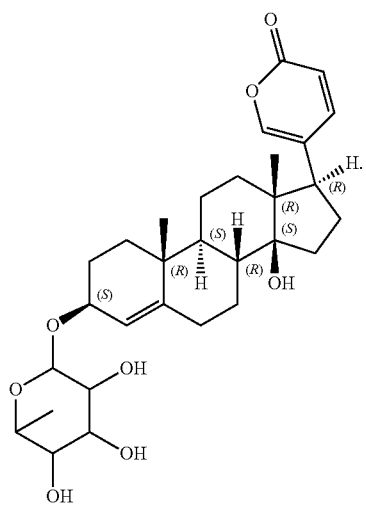

In some embodiments, the compounds of the present disclosure include the following structure:

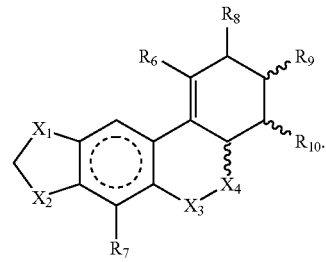

In more specific embodiments, the compounds of the present disclosure include the following structure, which is also referred to as narciclasine:

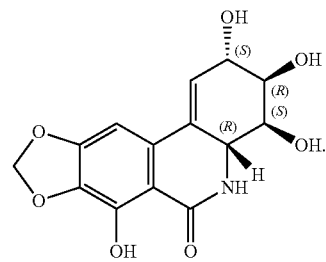

In some embodiments, the compounds of the present disclosure include the following structure:

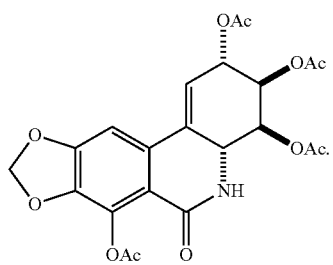

In some embodiments, the compounds of the present disclosure include the following structure:

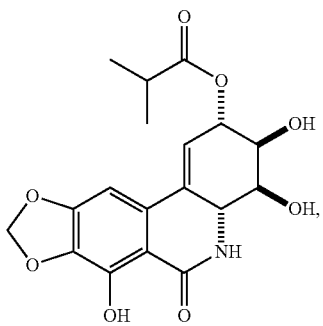

In some embodiments, the compounds of the present disclosure include, without limitation, one or more of the following structures:

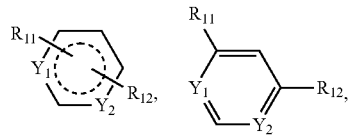

derivatives thereof, and combinations thereof.

In more specific embodiments, the compounds of the present disclosure include the following structure:

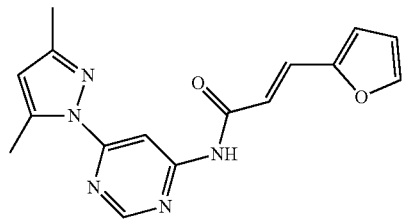

In some embodiments, the compounds of the present disclosure include, without limitation, one or more of the following structures:

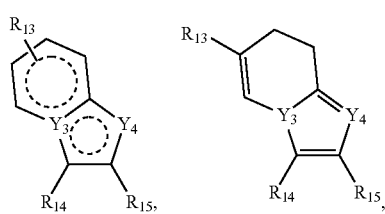

derivatives thereof, and combinations thereof.

In more specific embodiments, the compounds of the present disclosure include the following structure:

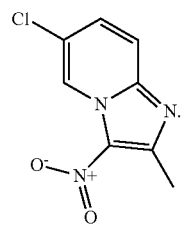

In some embodiments, the compounds of the present disclosure include the following structure:

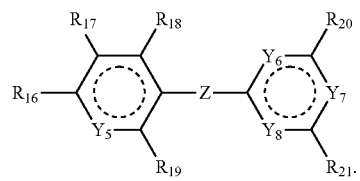

In more specific embodiments, the compounds of the present disclosure include the following structure:

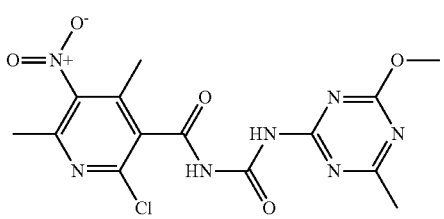

In some embodiments, the compounds of the present disclosure include a DNA protein kinase inhibitor. In some embodiments, the DNA protein kinase inhibitor includes, without limitation, narciclasine, alpha S-[2-chloro-4-fluoro-5-[7-(4-morpholinyl)-4-quinazolinyl]phenyl]-6-methoxy-3-pyridazinem ethano (M3814), 8-(4-dibenzothienyl)-2-(4-morpholinyl)-4H-1-benzopyran-4-one (NU7441), 1-ethyl-3,4-dihydro-7-[2-methyl-6-(1H-1,2,4-triazol-5-yl)-3-pyridinyl]-pyrazino[2,3-b]pyrazin-2(1H)-one (CC-115), 7,9-dihydro-7-methyl-2-[(7-methyl[1,2,4]triazolo[1,5-a]pyridin-6-yl)amino]-9-(tetrahydro-2H-pyran-4-yl)-8H-purin-8-one (AZD 7648), derivatives thereof, or combinations thereof.

In some embodiments, the compounds of the present disclosure also include a BCL-2 inhibitor. In some embodiments, the BCL-2 inhibitor includes, without limitation, 4-[4-[(4'-chloro[1,1'-biphenyl]-2-yl)methyl]-1-piperazinyl]-N-[[4-[[(1R)-3-(dimethylamino)-1-[(phen ylthio)methyl]propyl]amino]-3-nitrophenyl]sulfonyl]-benzamide (ABT-737), (R)-4-(4-((4'-chloro-4,4-dimethyl-3,4,5,6-tetrahydro-[1,1'-biphenyl]-2-yl)methyl)piperazin-1-yl)-N-((4-((4-morpholino-1-(phenylthio)butan-2-yl)amino)-3 ((trifluoromethyl)sulfonyl)phenyl)sulfonyl)benzamide (ABT-263), 4-[4-[[2-(4-chlorophenyl)-4,4-dimethyl-1-cyclohexen-1-yl]methyl]-1-piperazinyl]-N-[[3-nitro-4-[[(tetrahydro-2H-pyran-4-yl)methyl]amino]phenyl]sulfonyl]-2-(1H-pyrrolo[2,3-b]pyridin-5-yloxy) (ABT-199), derivatives thereof, or combinations thereof.

In some embodiments, the compounds of the present disclosure include a DNA protein kinase inhibitor and a BCL-2 inhibitor. In some embodiments, the DNA protein kinase inhibitor includes narciclasine and the BCL-2 inhibitor includes ABT-737. In some embodiments, the DNA protein kinase inhibitor includes narciclasine, and the BCL-2 inhibitor includes ABT-199. In some embodiments, the DNA protein kinase inhibitor includes M3814, and the BCL-2 inhibitor includes ABT-737. In some embodiments, the DNA protein kinase inhibitor includes M3814, and the BCL-2 inhibitor includes ABT-263.

Mechanism of Action

Without being bound by theory, the compounds of the present disclosure can have therapeutic effects through various mechanisms of action. For instance, in some embodiments, the compounds of the present disclosure inhibit interaction between OCT4 and MAPKAPK2 in the cells of the subject. In some embodiments, the compounds of the present disclosure inhibit interaction between OCT4 and DNA-PKcs in the cells of the subject. In some embodiments, the compounds of the present disclosure inhibit interaction between OCT4 and MAPKAPK and OCT4 and DNA-PKcs in the cells of the subject. In some embodiments, the compounds of the present disclosure inhibit c-MYC activation in the cells of the subject.

In more specific embodiments, the compounds of the present disclosure inhibit interaction between OCT 4 and MAPKAPK2. In some embodiments, such compounds include, without limitation:

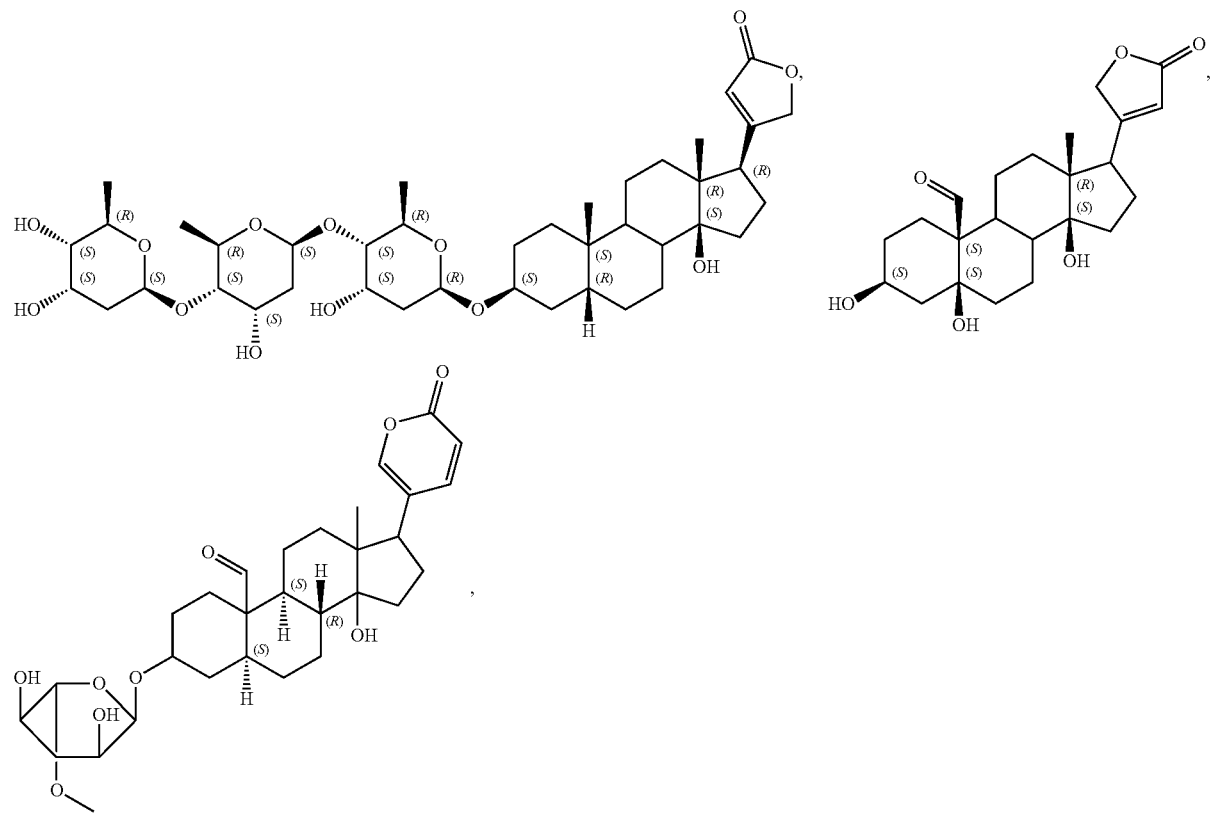

derivatives thereof, and combinations thereof.

In some embodiments, the compounds of the present disclosure inhibit interaction between OCT4 and DNA-PKcs. In some embodiments, such compounds include, without limitation, one or more of the following structures:

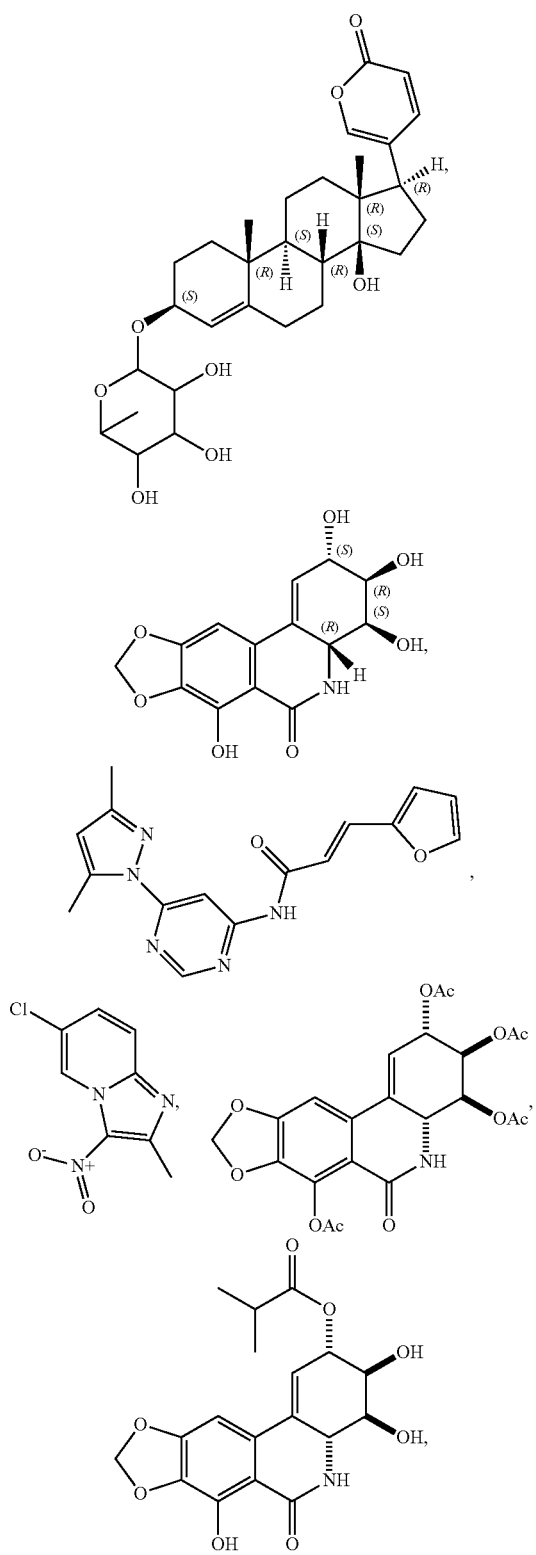

derivatives thereof, and combinations thereof.

Compositions

The compounds of the present disclosure can be in various compositions. For instance, in some embodiments, the compositions of the present disclosure include at least one pharmaceutically acceptable carrier. In some embodiments, the at least one pharmaceutically acceptable carrier includes at least one excipient.

Administration of Compounds to Subjects

Various methods may be utilized to administer the compounds of the present disclosure to a subject. For instance, in some embodiments, the administration occurs by a method that includes, without limitation, intravenous administration, oral administration, intramuscular administration, intranasal administration, subcutaneous administration, intra-dermal administration, intra-bladder administration, trans-dermal administration, and combinations thereof. In some embodiments, the administration occurs by intravenous administration.

Treatment of Cancers

The compounds of the present disclosure can be utilized to treat various cancers in a subject. For instance, in some embodiments, the cancer to be treated is associated with c-MYC overexpression. In some embodiments, the cancer to be treated includes cancers where the c-MYC oncogene is activated via OCT4. In some embodiments, the cancer includes, without limitation, neuroblastomas, small cell lung cancers, leukemia, acute myelogenous leukemia (AML), and combinations thereof. In some embodiments, the cancer includes small cell lung cancers. In some embodiments, the cancer includes neuroblastomas. In some embodiments, the cancer includes leukemia. In some embodiments, the cancer includes AML.

Subjects

The compounds of the present disclosure can be utilized to treat various subjects, including humans and animals. For instance, in some embodiments, the subject is a human being. In some embodiments, the subject is a human being suffering from a cancer to be treated. In some embodiments, the subject is an animal, such as a pet animal.

Inhibition of Interaction Between OCT4 and MAPKAPK2 or OCT4 and DNA-PKcs

Additional embodiments of the present disclosure pertain to methods of inhibiting interaction between OCT4 and MAPKAPK2 or OCT4 and DNA-PKcs. Such methods involve exposing protein complexes to the compounds of the present disclosure.

In some embodiments, the exposing can occur in a solution containing purified proteins or cell lysates. In some embodiments, the exposing can occur in vitro by exposing the compounds of the present disclosure to isolated live cells. In some embodiments, the exposing occurs by incubating the live cells with the compounds of the present disclosure. In some embodiments, the compounds of the present disclosure become associated with cells by contacting the cells with the compounds of the present disclosure.

Mechanism of Action

The compounds of the present disclosure can inhibit interaction between OCT4 and MAPKAPK2 or DNAPKcs in various manners. For instance, in some embodiments, the compound inhibits interaction between one or more phosphorylation sites of OCT4 and MAPKAPK2 or DNAPKcs. In some embodiments, the one or more phosphorylation sites include, without limitation, phosphorylate S111, phosphorylate S93, and combinations thereof.

Methods of Screening Potential Inhibitors of Protein-Protein Interaction

Figure 1B:
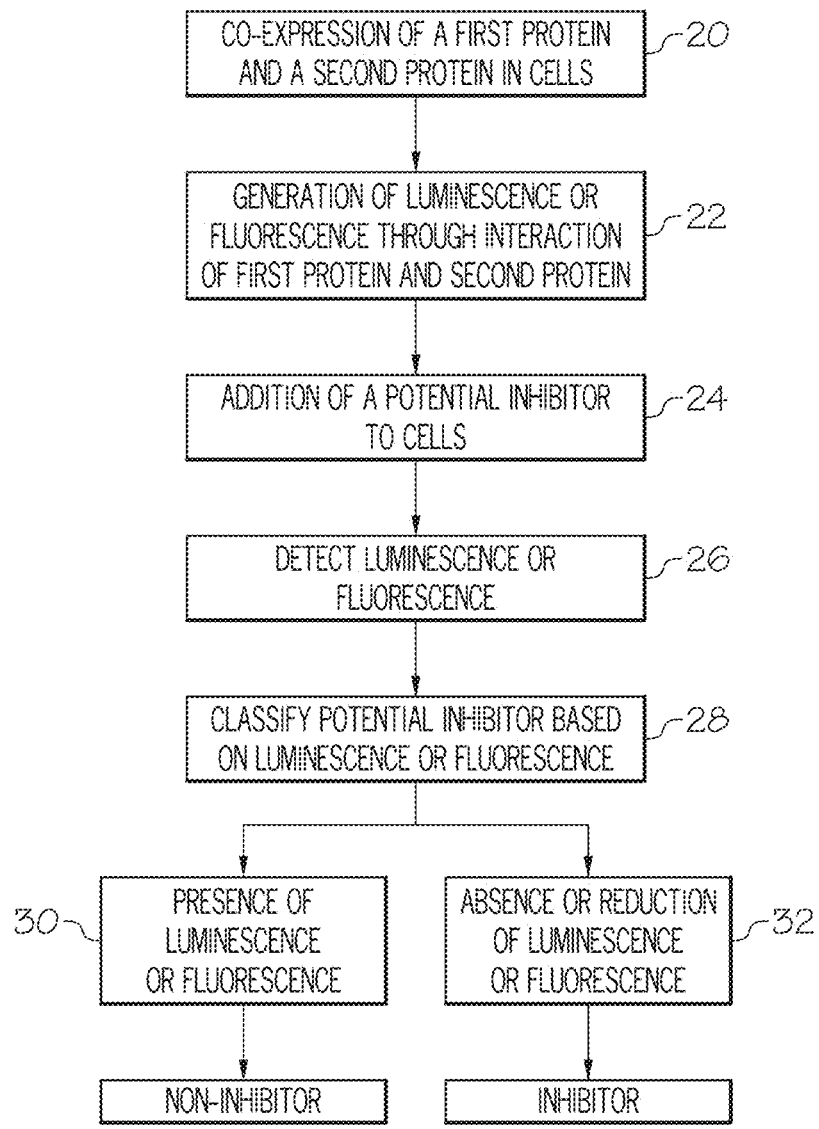
FIG. 1B provides a method of screening potential inhibitors of protein-protein interaction.

Additional embodiments of the present disclosure pertain to methods of screening potential inhibitors of protein-protein interaction between a first protein and a second protein. In some embodiments illustrated in FIG. 1B, the methods of the present disclosure include co-expressing the first protein and the second protein in cells, where the first protein and the second protein are expressed from the same promoter, where the first protein is labeled with a first label, and where the second protein is labeled with a second label (step 20). Upon expression, the protein-protein interaction between the first protein and the second protein results in a luminescence or fluorescence as a result of the proximity of the first label to the second label (step 22). Thereafter, a potential inhibitor of the protein-protein interaction is added to the cells (step 24). Next, the presence, absence or reduction of the luminescence or fluorescence is detected (step 26). As a result of the detection, the potential inhibitor is classified as an inhibitor or non-inhibitor of the protein-protein interaction (step 28). In particular, the presence of the luminescence or fluorescence results in the classification of the potential inhibitor as a non-inhibitor of the protein-protein interaction (step 30). On the other hand, the absence or reduction of the luminescence or fluorescence results in the classification of the potential inhibitor as an inhibitor of the protein-protein interaction (step 32). As set forth in more detail herein, the screening methods of the present disclosure can have numerous embodiments.

For instance, various methods may be utilized to co-express the first protein and the second protein in cells. For instance, in some embodiments, a single expression vector that expresses the first protein and the second protein (e.g., with fluorescence probes connected with P2A peptide) from the same promoter is introduced into cells. In some embodiments, a first expression vector that expresses the first protein from a promoter and a second expression vector that expresses the second protein from the same promoter are introduced into cells. In some embodiments, the first protein and the second protein are expressed in equal amounts.

The first protein and the second protein can be co-expressed in various cells. For instance, in some embodiments, the co-expression occurs in bacterial cells. In some embodiments, the co-expression occurs in mammalian cells.

The screening methods of the present disclosure can be utilized to screen various types of potential inhibitors. For instance, in some embodiments, the potential inhibitors include, without limitation, small molecules, peptides, aptamers, nucleotides, and combinations thereof. In some embodiments, the potential inhibitors include small molecules, such as small molecules derived from a combinatorial library. In some embodiments, the small molecules include peptides, such as peptides derived from a phage display library.

The screening methods of the present disclosure can be utilized to screen potential inhibitors against various types of proteins. For instance, in some embodiments, the first and second proteins are full length proteins. In some embodiments, the first and second proteins are protein fragments. In some embodiments, the first protein is OCT 4. In some embodiments, the second protein is MAPKAPK2 or DNA-PKcs.

The first and second proteins of the present disclosure can have various types of labels. For instance, in some embodiments, the first and the second label can each include, without limitation, LgBiT, smBiT, and combinations thereof. In some embodiments, the first and the second label can be different labels. In some embodiments, the first and the second labels can be the same labels. In some embodiments, the first and second labels include fluorescence labels.

Various methods may also be utilized to detect luminescence or fluorescence associated with protein-protein interaction. For instance, in some embodiments, the detection occurs visually. In some embodiments, the detection occurs through the utilization of a spectrophotometer or flourometer.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Compounds that Inhibit the Interaction of OCT4 with MAPKAPK2 or DNA-PKcs As set forth in more detail in Example 2, Applicants found that the interaction between OCT4 and MAPKAPK2 or OCT4 and DNA-PKcs is important in activating c-MYC oncogenes in cancer. Thus, Applicants screened a library of chemicals and identified three compounds that inhibited the interaction of OCT4 with MAPKAPK2 and five compounds that inhibited the interaction of OCT4 with DNA-PKcs.

Applicants discovered that c-MYC, not MYCN, is consistently increased in the majority of neuroblastoma cell lines and patient-derived xenografts established from progressive disease (PD) relative to those established from patients at diagnosis. The studies demonstrate that activation of the OCT4/c-MYC axis via kinases induction is a major cause of PD and thus, successful targeting of the OCT4/c-MYC axis could improve survival of neuroblastoma patients with PD.

The kinases that activate c-MYC were identified in the course of reduction of this invention to practice as MAPKAPK2 (MK2) and DNA-PKcs. MK2 and DNA-PKcs phosphorylate S111 and S93 residues of OCT4, which is a critical step in transcriptionally activating c-MYC. Based on the data, and without being bound by theory, Applicants hypothesize that targeting protein-protein interaction between MK2 or DNA-PKcs and OCT4 will provide specific inhibition of OCT4/c-MYC activation pathway.

Applicants developed assays to screen for inhibitors detecting protein-protein interactions between MK2/DNA-PKcs and OCT4 using a lentiviral vector system. Each protein was labeled with a luminescence probe (Large BiT: LgBiT or Small BiT: SmBiT included in NanoBiT System®, Promega) and were combined with P2A (a self-cleaving peptide). Puromycin was used as a selection marker. When the two luminescence probes (LgBiT and SmBiT) come to close proximity in the presence of a luminescence substrate (furimazine, Promega), luminescence will be generated that is sustained for up to 2 hours. Furimazine is a long-acting cell-permeable luminescence substrate which makes it appropriate for the cell-based assay to detect protein-protein interactions. A graphic overview of the luminescence that is generated by OCT4-MK2 protein-protein interaction is provided in FIG. 2. An illustration of the assay is provided in FIGS. 3A1, 3A2, and 3B.

The following are the chemical compounds that Applicants identified as MK2-OCT4 inhibitors:
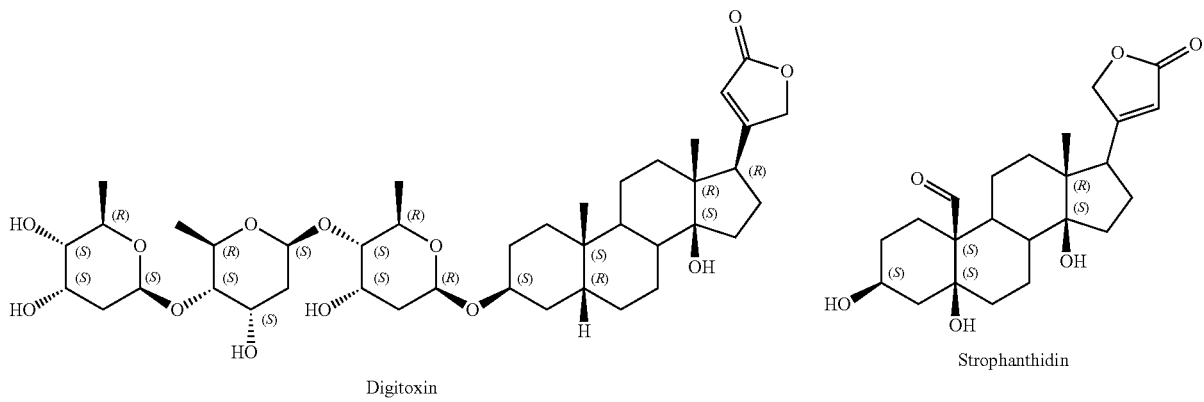
Digitoxin
Strophanthidin
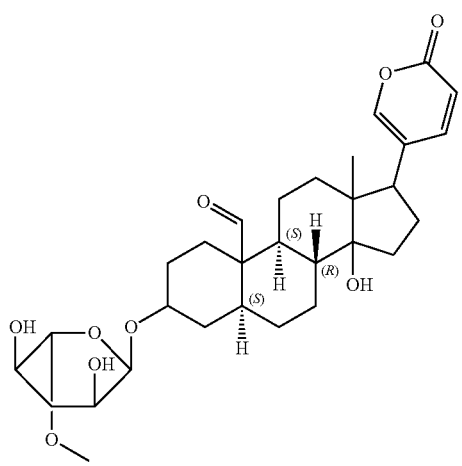
Chemdiv Diverse 0049-0153
The following are the chemical compounds that Applicants identified as DNA-PKcs-OCT4 inhibitors:
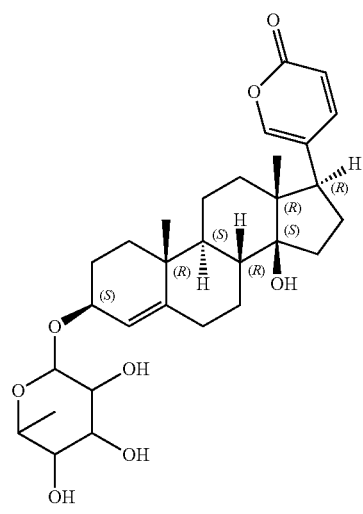
NSC 7521
-continued
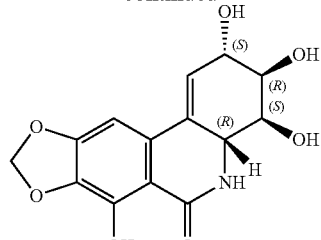
NSC 266535
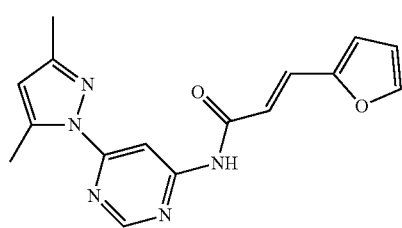
F6430-0731

-continued

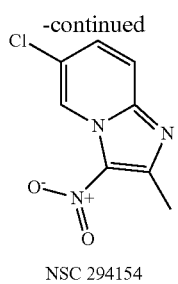

NSC 294154

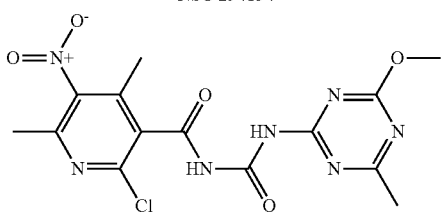

Chemdiv Div I8012-0544

Example 2 provides experimental results relating to MYC transcriptional activation mediated by OCT4 as a mechanism of progressive disease neuroblastoma. In particular, the experimental results in Example 2 pertain to the investigation of MYC activation in progressive neuroblastoma that led to the discovery of a novel and previously undescribed method of MYC activation that is a potential therapeutic target.

Example 2. MYC Transcriptional Activation Mediated by OCT4 as a Mechanism of Progressive Disease Neuroblastoma Although MYCN genomic amplification represents highly aggressive tumors in neuroblastoma, the most common solid tumor in infants, this is limited to diagnosis. To identify the mechanism of relapse neuroblastoma, Applicants investigated 19 diagnosis and 16 relapse cell lines at low passages, seven matched-pair (established from the same patients at diagnosis and relapse) cell lines, and 5 eight diagnosis and nine relapse patient-derived xenografts.

OCT4-mediated MYC transcriptional activation, which functionally replaces MYCN, is noted as the key mechanism of drug resistance in progressive disease. Subsequently, Applicants identified novel OCT4-binding sites in the MYC promoter/enhancer region, and then OCT4 phosphorylation by MAPKAPK2.

Example 2.1. Role of 13-Cis-Retinoic Acid in Neuroblastoma

Neuroblastoma is a cancer of the sympathetic nervous system mostly occurring in young children. High-risk patients are over 18 months old with stage 4 disease, stage 3 with unfavorable histopathology, or any tumor with MYCN gene amplification. Treatment of high-risk neuroblastoma with non-myeloablative (conventional) chemotherapy alone achieves an initial response in most patients. However, 80-90% of patients develop progressive disease (PD) 5 refractory to further therapy.

Neuroblastoma can spontaneously mature to a benign tumor known as ganglioneuroma. A variety of agents have been shown to induce growth arrest and morphological differentiation (neurite outgrowth) of human neuroblastoma cell lines. All-trans retinoic acid (ATRA) and also isot-retinoin (13-cis-retinoic acid=13-cisRA) induced morphological differentiation of neuroblastoma and markedly decreased MYCN expression and cell proliferation in both MYCN gene-amplified and non-amplified human neuroblastoma cells in vitro.

A randomized Phase III clinical trial showed that intensive myeloablative therapy supported by autologous hematopoietic stem cell transplantation (ASCT) improved outcome for high-risk neuroblastoma relative to conventional chemotherapy and that outcome was further improved using 13-cisRA to treat minimal residual disease after ASCT. A subsequent trial further improved survival by adding dinutuximab (a chimeric anti-GD2 antibody) and cytokines to post-ASCT maintenance therapy. However, many high-risk neuroblastoma patients still ultimately die from progressive disease (PD).

In this Example, Applicants sought to define molecular mechanisms of 13-cisRA resistance in neuroblastoma and found that c-MYC, not MYCN, is consistently increased in the majority of PD models relative to diagnosis models. In particular, the major pathway of c-MYC activation in PD neuroblastoma that may serve a therapeutic target in patients.

Example 2.2. MYC is Transcriptionally Activated in 13-cisRA-Resistant Neuroblastoma Cells Tumor biopsies are infrequently obtained at time of PD, limiting the availability of pre- and post-therapy tumor samples from the same patient. Bone marrow and blood samples are frequently obtained at time of PD and the COG Childhood Cancer Repository has banked low-passage patient-derived cell lines and patient-derived xenografts (PDX) established from diagnosis (Dx) and PD samples, including lines established from patients who were treated with 13-cisRA.

Figure 2:
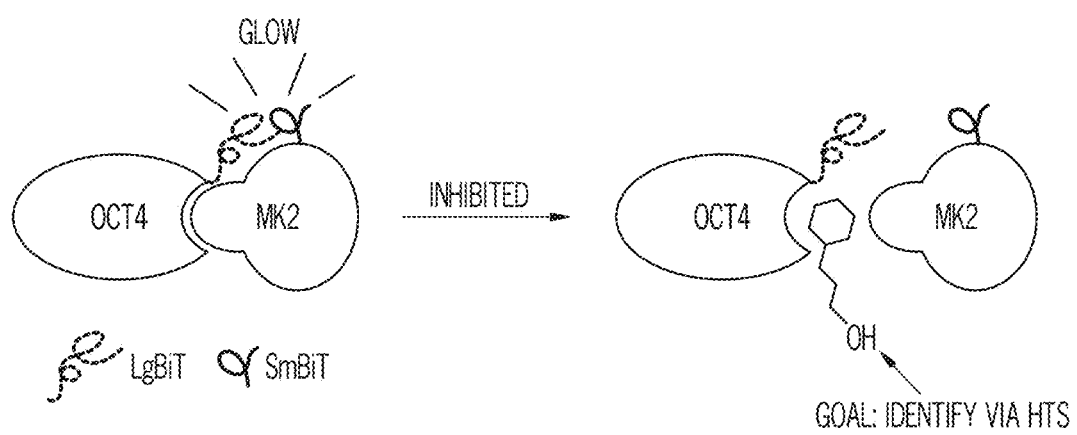
FIG. 2 provides an illustration of a luminescence screening assay of a chemical library to identify inhibitors of octamer-binding transcription factor 4 (OCT4) and mitogen-activated protein kinase-activated protein kinase 2 (MAPKAPK2 or MK2) protein-protein interaction, or OCT4 and DNA-dependent protein kinase catalytic subunit (DNA-PKcs) protein-protein interaction by high-throughput screening. The assays are also used to confirm the interaction inhibition.
Figure 3B:
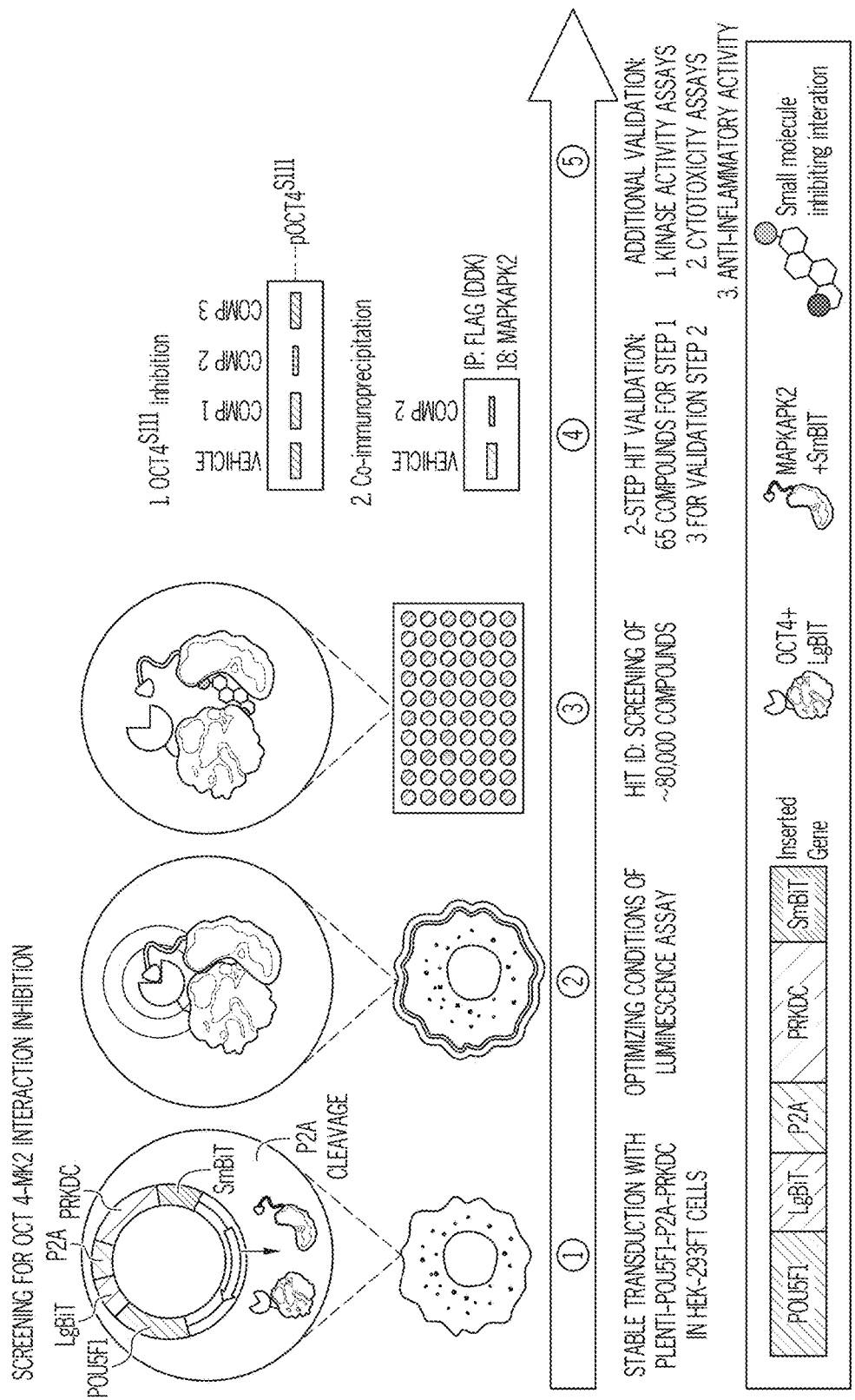
Figure 4A:
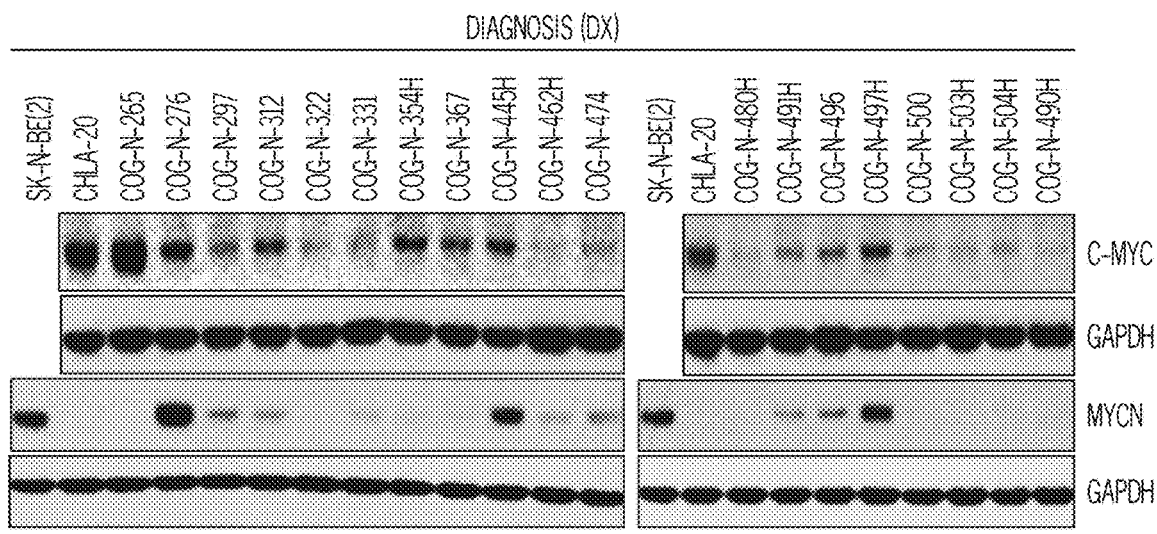
Figure 4B:
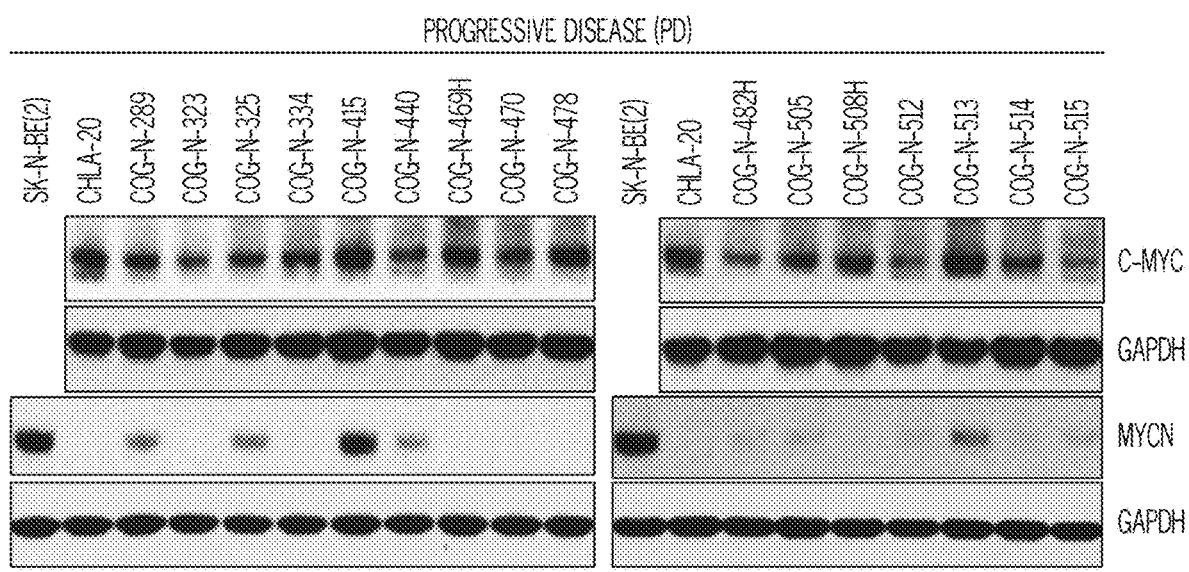
Figure 4D:
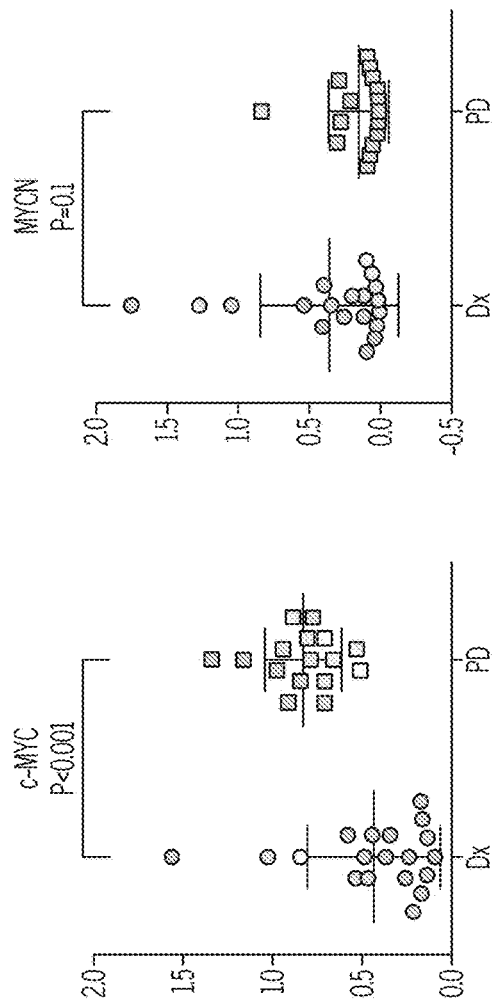
Figure 4D:
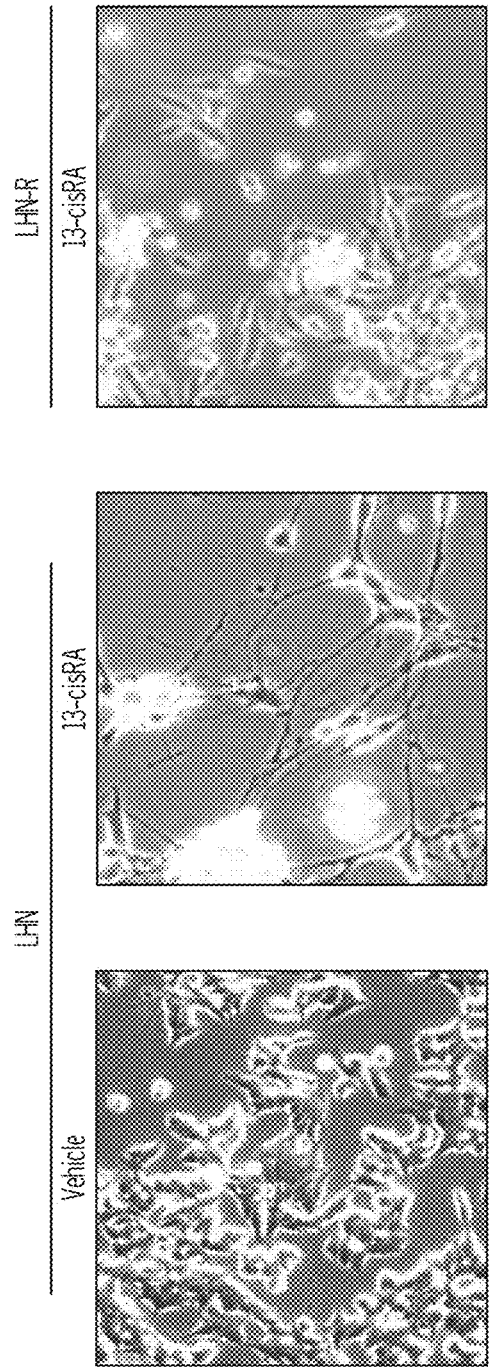

MYCN and c-MYC protein levels were compared in 19 Dx (FIG. 4A) and 16 PD (FIG. 4B) cell lines. c-MYC protein levels were significantly higher in PD models compared with Dx models (FIGS. 4C1 and 4C2). To determine whether increased c-MYC in PD cell lines might be due to 13-cisRA treatment, the SMS-LHN (LHN) human neuroblastoma cell line (MYCN expression without genomic amplification) was treated with a clinically achievable concentration of 13-cisRA (5 µM), following the clinical dosing schedule used in high-risk patients (2 wks on, 2 wks off, x 6 cycles). LHN responded initially to 13-cisRA with arrested proliferation, neurite outgrowth and decreased MYCN protein (FIG. 4D).

After six cycles of 13-cisRA, a resistant variant cell line (LHN-R) did not show neurite outgrowth (FIG. 4D) and cell cycle arrest (FIG. 4E) after 10 days of 13-cisRA treatment. In LHN-R treated with 13-cisRA, mRNA and protein expression of c-MYC was increased while MYCN remained suppressed (FIGS. 4F and 4G).

High c-MYC protein is seen in 11% of neuroblastoma at diagnosis (MYC genomic amplification: 1%) and has been associated with a poor clinical outcome. Enhancer hijacking and focal enhancer amplification are suggested as mechanisms of MYC activation expression in neuroblastoma. However, the incidence of MYC transcriptional activation at PD and its molecular mechanisms are not known.

Since c-MYC was elevated in PD neuroblastoma cell lines as well as neuroblastoma cells selected for resistance to 13-cisRA, Applicants sought to demonstrate that c-MYC overexpression confers resistance to 13-cisRA. Stable clones expressing wild-type c-MYC with 439 or 454 amino acids (AUG- and CUG-initiated) as well as deletion (Δ121-158 and 472-209, encompassing MYC box 2) or point mutations (V409D, functionally critical in MAX dimerization) were created by transducing 4-hydroxytamoxifen (4-OHT)-inducible estrogen receptor (ER)-fusion constructs using lentiviral vectors into SMS-LHN cells. Twenty-four hours of 4-OHT treatment resulted in increased accumulation of exogenous protein levels for wild-types (439 and 454) and mutant (4121-158, 472-209, V409D) c-MYC in the nucleus. Cyclin A, a c-MYC downstream target serving as an indicator of c-MYC functionality, was detected in the nucleus of cells expressing c-MYC.

Example 2.3. OCT4 Induces Transcriptional Activation of MYC

Having demonstrated that functional c-MYC overexpression results in resistance to 13-cisRA, Applicants sought to identify transcription factors that drive MYC overexpression. To identify transcription factors (TF) binding to the MYC gene promoter/enhancer region, a Combo Protein/DNA Array was used to evaluate 345 specific TF 439, c-MYC 454, and the V409D mutant after 14 days of exposure to 13-cisRA. LHN cells expressing wild-type MYC did not respond to 13-cisRA treatment, while the deletion mutants showed significant cell cycle arrest by 13-cisRA ($p<0.01$).

To show the direct functional connection between c-MYC and Cyclin A expression, Applicants used CRISPR/Cas-9 to knock out MYC in LHN-R. MYC double knock-out was lethal to LHN-R cells, and thus the experiments were conducted in MYC single knock-out (KO) cells as MYC KO was lethal to LHN-R. In the MYC KO cells, Cyclin A was decreased and neurite outgrowth was apparent in response to 13-cisRA. These data show that c-MYC overexpression drives resistance to 13-cisRA in neuroblastoma cell lines.

Figure 5A:
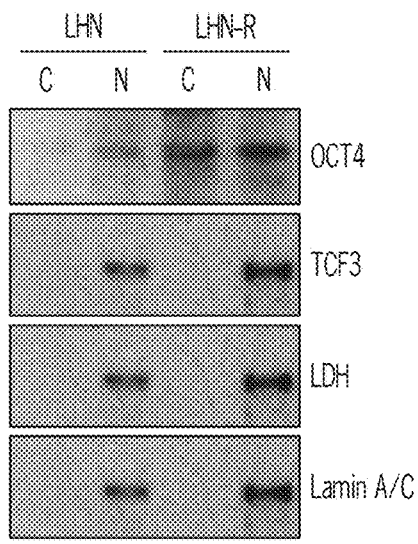
FIGS. 5A-5I demonstrate that OCT4 and TCF3 regulate MYC transcription in 13-cisRA-resistant LHN-R cells.
Figure 5B:
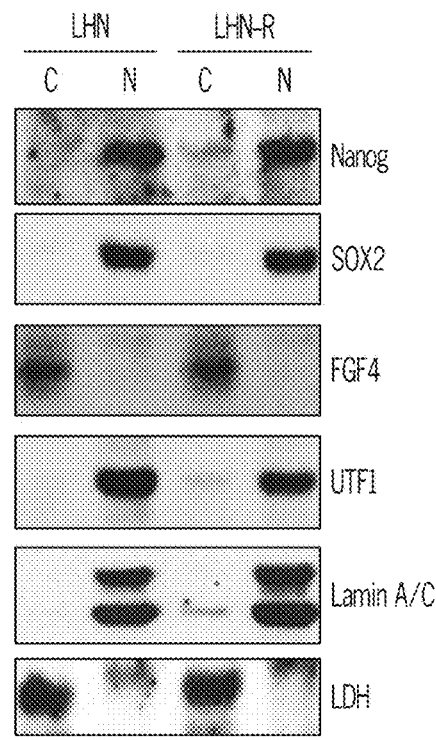

Of the transcription factors (TFs) increased, two sternness markers, TCF3 (encoded by the TCF3 gene) and OCT4 (encoded by the POU5F1 gene) were noted. Both mRNA and protein expression of TCF3 and OCT4 were higher in LHN-R relative to LHN cells (FIG. 5A), but other stem cell factors did not increase in LHN-R compared with LHN 5 (FIG. 5B).

Figure 5C:
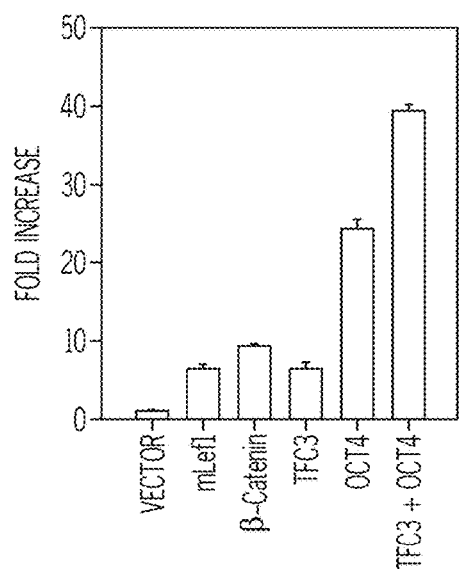
Figure 5D:
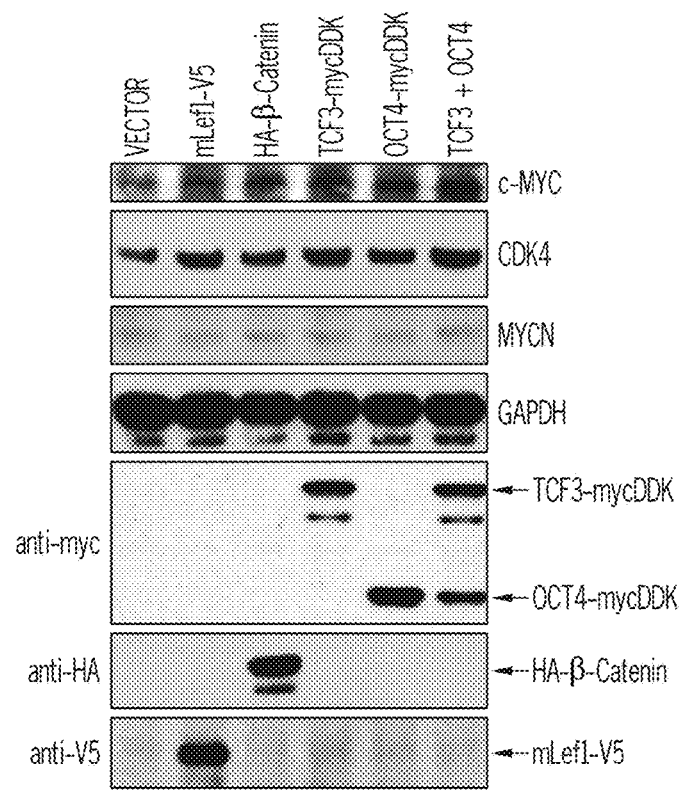

Activation of MYC gene transcription by OCT4 and/or TCF3 was determined by a luciferase reporter gene assay using a 1.9-kb genomic fragment of the MYC promoter/enhancer cloned from LHN-R cells. The MYC reporter gene showed significant activation by mLef1 (6.5-fold), β-Catenin (9.3-fold), TCF3 (6.2-fold), OCT4 (24.4-fold), and TCF3+OCT4 (39.5-fold) compared with vector control (FIG. 5C). Transfection of the indicated constructs showed that TCF3 and OCT4 increased endogenous c-MYC protein and its downstream target CDK4 while MYCN levels were not affected (FIG. 5D). These data demonstrate that OCT4 and TCF3 individually and cooperatively regulate MYC.

Figure 5E:
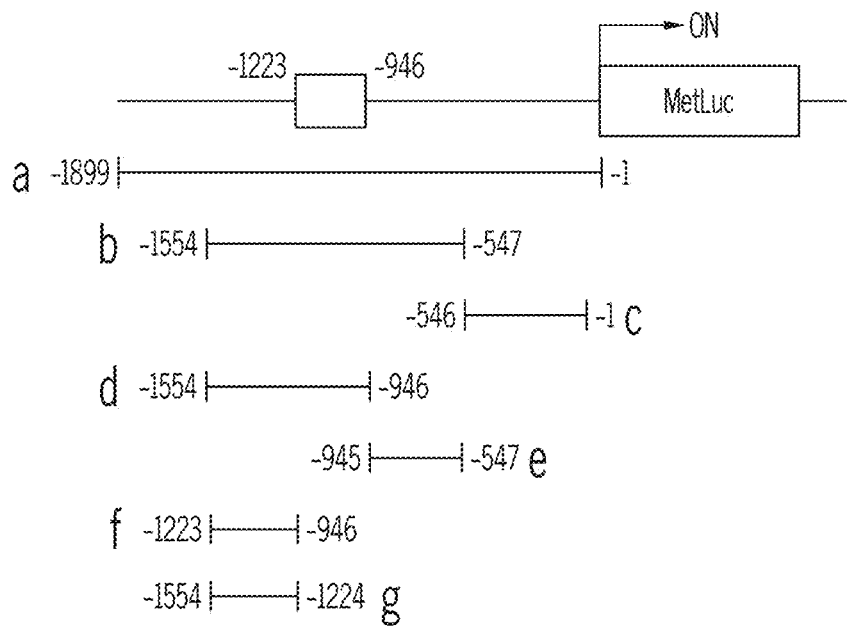
Figure 5E:
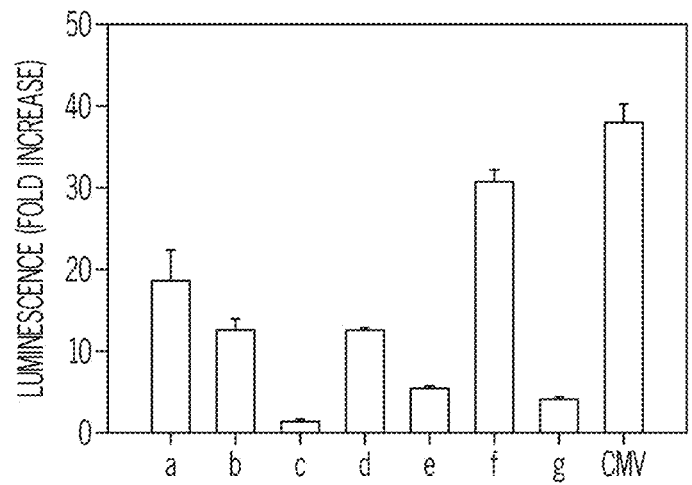

Next, Applicants identified OCT4-binding sites in the MYC promoter/enhancer region. Transfac®, a database of TF's and their DNA binding sites, identified several potential OCT4 binding sites from −1 base to −1.9 kb of the promoter/enhancer region of MYC. Using various promoter constructs in FIG. 5E, Applicants confirmed binding of OCT4 to the region between 946 and −1223 of the MYC promoter/enhancer.

Figure 5F:
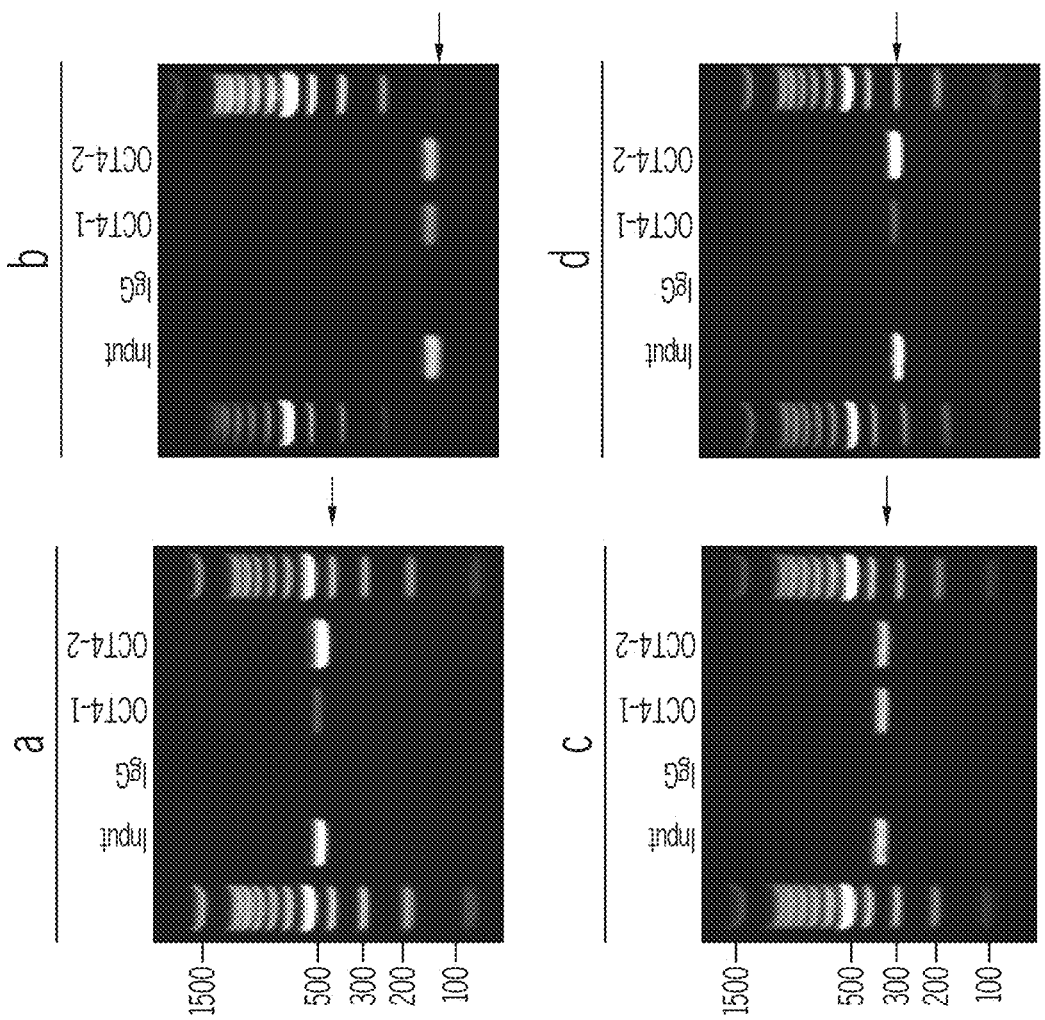
Figure 5F:
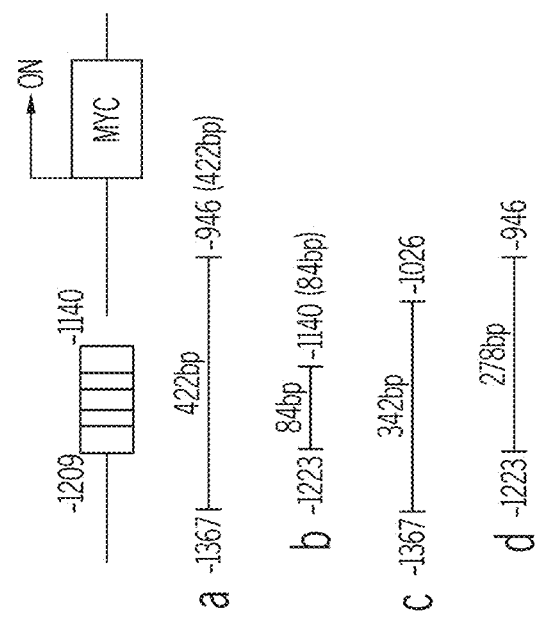

OCT4 binding was further narrowed down to a 70-bp region located between −1209 and −1140 using a MYC reporter gene. Within the 70-bp sequence, two OCT4 binding regions were identified from −1204 to −1182 and from −1159 to −1145. To corroborate the direct binding of OCT4 to the binding sites within the MYC proximal enhancer region, ChIP experiments were conducted using two ChIP-grade OCT4 antibodies and nuclear extracts of LHN-R. Four different amplicons (84-422 bp in size) spanning the −1209/−1140 region of MYC promoter were confirmed to have ChIP-enriched OCT4-binding (FIG. 5F). The direct binding of OCT4 to the enhancer of MYC was also verified by electrophoretic mobility shift assay (EMSA), streptavidin (SA) pull-down assays, mass spectrometry, and immunoblotting using a 70-bp biotin-labeled MYC. The reporter assay showed that OBS1 or OBS2 as single-site constructs were 60% and 40% of transcription activity, respectively, when compared with both OBS1 and OBS2 together.

In a parallel study, the efficient binding of OCT4, but not its mutants, to the Biotin-MYC$^{-1209/-1140}$ dsDNA probe was also verified by SA pull-down assays and immunoblotting. The functionality of the two OCT4 binding sites 1&2 (OBS1 and OBS2) on c-MYC expression was confirmed by co-transfecting cells with various MYC reporter constructs along with either control vector (pCMV6-mycDDK, DDK is the same as FLAG®, a trademark of Sigma Aldrich) or POU5F1 WT. As compared with OBS1 or OBS1+mutant OBS2, DDK-MYC-ER fusion protein was increased in cells transfected with wild-type OBS1 & 2 15 constructs. There was no significant induction of the DDK-MYC-ER in cells without exogenous OCT4. These data showed that OCT4 binding to the OBS1 & OBS2 sites in the MYC enhancer region contributes to MYC transcriptional activation and increased c-MYC protein.

Figures 5G, 5H:
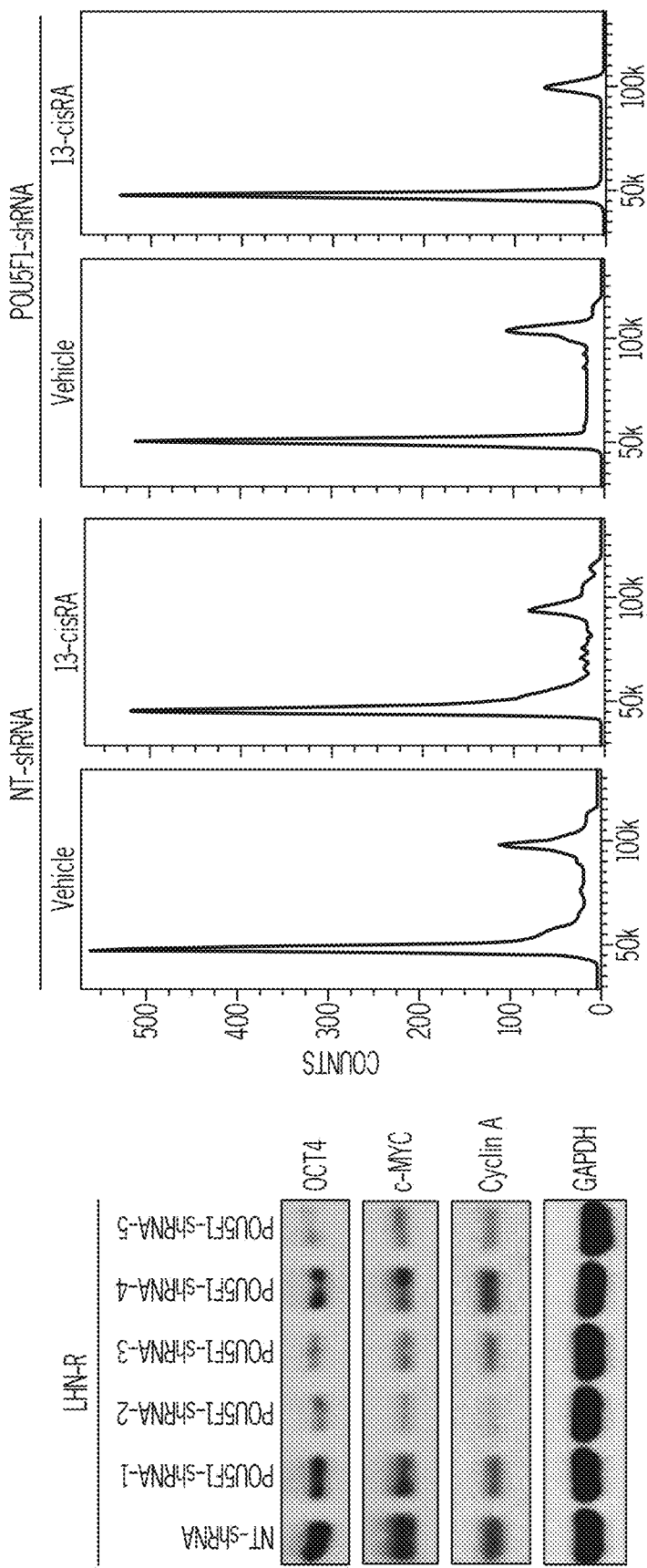

Example 2.4. OCT4-Induced MYC Transcription Activation Mediates 13-cisRA Resistance To demonstrate that OCT4 and TCF3 drives MYC activation in neuroblastoma, POU5F1 (gene encoding OCT4) was transiently knocked down using siRNA in LHN-R cells. As anticipated, POU5F1 or TCF3 knockdown reduced c-MYC protein expression in LHN-R cells (FIG. 5G). TCF3 on MYC transcriptional activation has been reported in colon cancer, and OCT4 plays a greater role in c-MYC transcription (FIG. 5C).

Figure 5I:
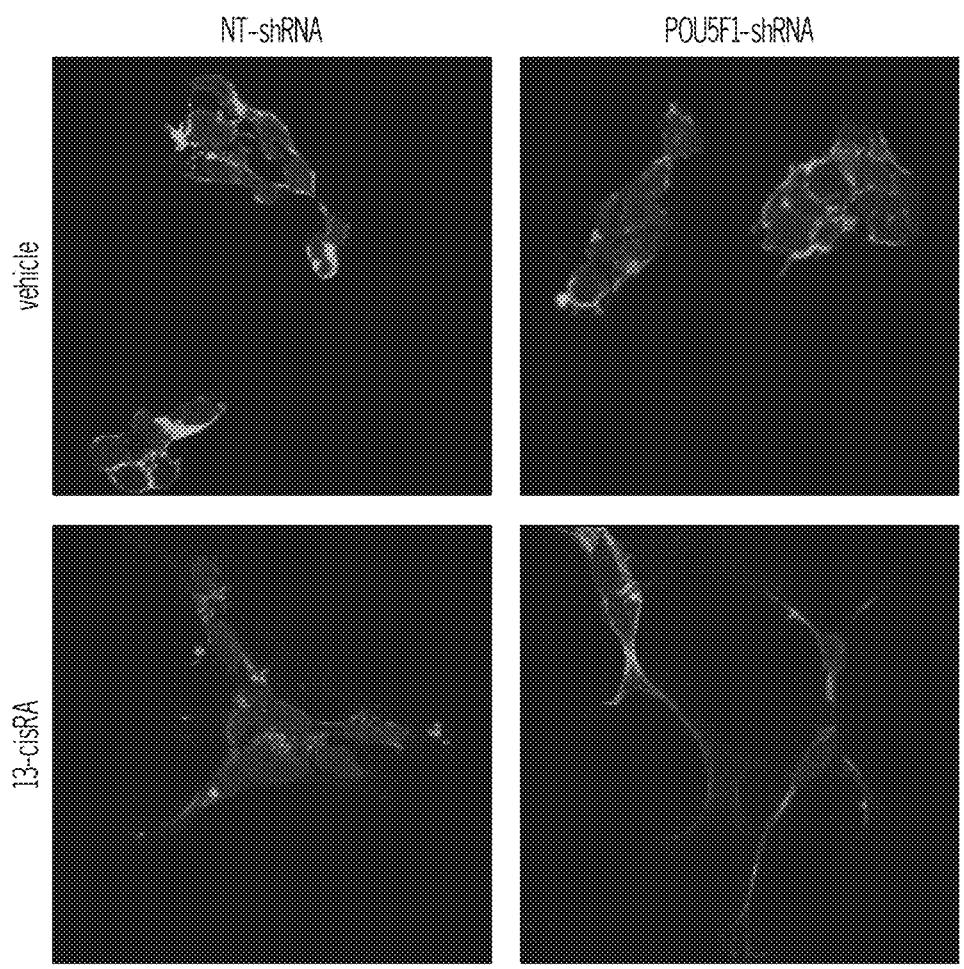

Thus, Applicants focused on OCT4 and generated a stable clone of LHN-R with POU5F1 knockdown using a lentiviral vector system by transducing five different short hairpin RNA sequences (POU5F1-shRNA-1 to -5) to evaluate the effect of OCT4 on 13-cisRA resistance in neuroblastoma cells. POU5F1 knockdown decreased c-MYC and Cyclin A protein expression in LHN-R cells (FIG. 5G) relative to a non-targeted control shRNA (NT-shRNA). While NT-shRNA-transduced LHN-R cells did not show changes in S-phase content when treated with 13-cisRA for 14 days ($26\pm3\%$ vs $28\pm5\%$, $p=0.58$), the proliferation of POU5F1 knockdown cells was significantly reduced by 13-cisRA ($23\pm4\%$ vs $11\pm1\%$, $p<0.01$) (FIG. 5H). Moreover, neurite outgrowth by confocal microscopy (FIG. 5I) and the increase of 10 NeuN, a mature neuronal marker, were observed in POU5F1 shRNA-transduced cells treated with 13-cisRA. These results suggest that a reduction in OCT4 restores 13-cisRA sensitivity to 13-cisRA-resistant neuroblastoma.

Example 2.5. MYC Activation by OCT4 is Distinct from Stemness Factor Activation OCT4 comprises three 15 domains, a central POU domain flanked by an NH$_2$-terminal domain (NTD) and a COOHterminal domain (CTD). The POU domain is highly conserved through evolution and is a bipartite DNA-binding unit composed of two structurally independent DNA-binding domains, POU-specific domain (POUs) and POU homeodomain ($POU_{HD}$), tethered by a flexible linker. It was shown that residues on $POU_{HD}$ are critical for activation of downstream target gene transcription. Applicants aimed to determine whether the binding of OCT4 protein in the MYC enhancer region activated MYC transcription. First, Applicants generated a series of deletion mutants of OCT4. OCT4 structural analysis followed by protein binding experiments showed that loss of the POUs domain at amino acid residues 138 to 212 ($OCT4^{\Delta138-212}$) resulted in a failure of OCT4 binding to the $MYC^{-1209/-1140}$ enhancer and subsequent abrogation of DDK-MYC-ER expression. Similar results were also seen with the deletion mutants of both POUs and $POU_{HD}$, $OCT4^{\Delta4138-212/231-289}$ and $OCT4^{\Delta144-205/231-289}$.

It is noteworthy that the OCT4 deletion mutant of residues 231 to 289 ($OCT4^{\Delta231-289}$) in the $POU_{HD}$ domain retains the capacity to interact with the $MYC^{-1209/-1140}$ enhancer to drive c-MYC expression, indicating OCT4 $POU_{HD}$ is not necessary for MYC transcriptional activation. Truncated proteins lacking the NTD were able to interact with the $MYC^{-1209/-1140}$ enhancer but lost their abilities to activate MYC expression. Taken together, the NTD and POUs domains of OCT4 were 10 indispensable for binding to the $MYC^{-1209/-1140}$ enhancer and activating its gene expression.

To define roles of specific residues in the domains, mutants were designed to contain base substitutions in four amino acid residues of the POUs domain [$Arg^{157}$ ($R^{157}$), $Gln^{164}$ ($Q^{167}$), $Gln^{181}$ ($Q^{181}$), and $Glu^{188}$ ($E^{188}$)] in OCT4 corresponding to the residues at $R^{20}$, $Q^{27}$, $Q^{44}$, and $E^{51}$ in OCT1. Each of these residues has been identified as a contact site for binding to DNA.

In addition, 15 mutants at multiple residues in $POU_S$ as well as a mutant at $Thr^{235}$ ($T^{235A}$ or $T^{235D}$) in $POU_{HD}$, the site for AKT-mediated self-renewal and survival of embryonal carcinoma cells, were constructed. All mutations at POUs, but not T235A in $POU_{HD}$, showed reduced or abolished binding to the $MYC^{-1209/-1140}$ enhancer sequence. Also, the binding of OCT4 to the MYC enhancer region as well as MYC transcriptional activation by OCT4 was abolished when any of the residues in POUs were substituted.

Similar to single mutants of OCT4, mutants on multiple residues ($OCT4^{R157V/Q164L}$, $OCT4^{Q181H/E188V}$, and $OCT4^{R157V/Q164L/Q181H/E188V}$) also failed to induce MYC transcription. Δ138-212) resulted in a failure of OCT4 binding to the $MYC^{-1209/-1140}$ enhancer and subsequent abrogation of DDK-MYC-ER expression. Similar results were also seen with the deletion mutants of both POUs and $POU_{HD}$, $OCT4^{\Delta138-212/231-289}$ and $OCT4^{\Delta144-205/231-289}$. It is noteworthy that the OCT4 deletion mutant of residues 231 to 289 ($OCT4^{\Delta231-289}$) in the $POU_{HD}$ domain retains the capacity to interact with the $MYC^{-1209/-1140}$ enhancer to drive c-MYC expression, indicating OCT4 $POU_{HD}$ is not necessary for MYC transcriptional activation. Truncated proteins lacking the NTD were able to interact with the $MYC^{-1209/-1140}$ enhancer but lost their abilities to activate MYC expression. Taken together, the NTD and POUs domains of OCT4 were indispensable for binding to the $MYC^{-1209/-1140}$ enhancer and activating its gene expression.

As anticipated, OCT4 binding to the $MYC^{-1209/-1140}$ enhancer and consequent OCT4-induced MYC expression were not affected when the residue Thr235 in $POU_{HD}$ was substituted. To verify these data in neuroblastoma, OCT4 wild-type or OCT4 mutants ($OCT4^{4M}$: $R^{157V}$ $Q^{164L}$ $Q^{181H}$ $E^{188V}$ or $OCT4^{T235A}$) were stably transduced using a Dox-inducible system to generate myc-DDK-tagged OCT4 fusion protein in LHN-R cells. Doxycycline treatment induced FLAG-tagged OCT4, c-MYC, and cyclin A in OCT4 WT and $OCT4^{T235A}$, but not in $OCT4^{4M}$ transduced cells. These data support the docking of the POUs domain of OCT4 against the sequences of the MYC enhancer region as being key to MYC transcriptional activation.

Figure 6A:
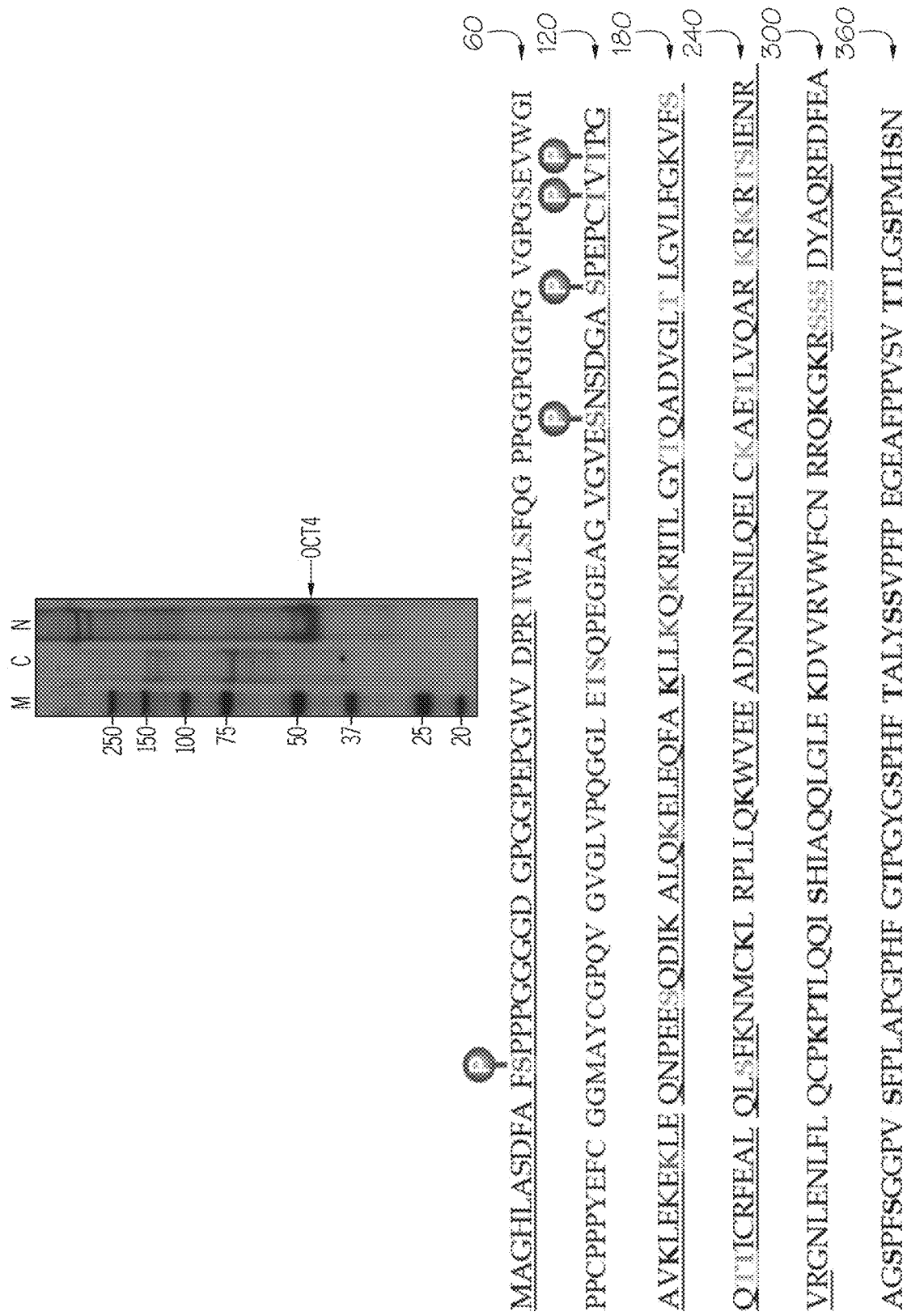
FIGS. 6A-6G show OCT4 interacting proteins by protein identification (ID) and post-translational modification (PTM) and verification of the protein expression and the role of the interacting MK2 protein in 13-cisRA resistance.
Figure 6B:
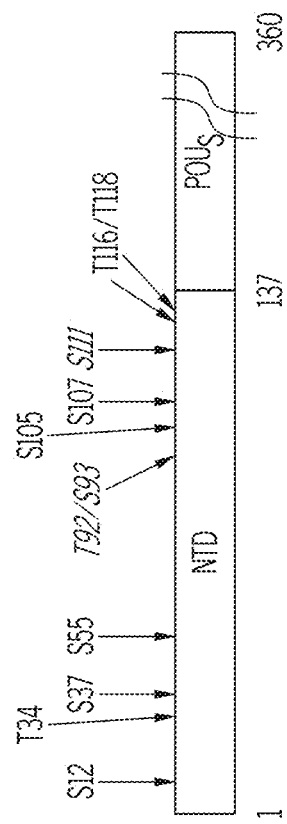
Figure 6C:
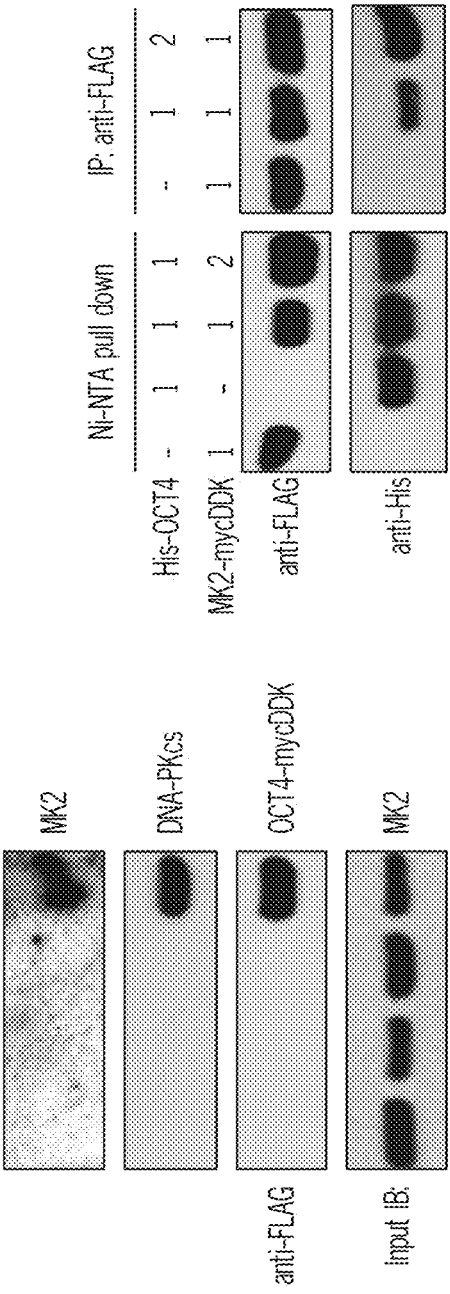

Example 2.6. OCT4/MYC Activation by MAPKAPK2 (MK2) Causes 13-cisRA Resistance and MK2 is Associated with Poor Clinical Outcome Mass spectrometry analyses identified OCT4-binding proteins and also determined post-translational modification of OCT4 in LHN-R cells transduced with myc-DDK-tagged OCT4 (FIG. 6A). The mass spectrometry and the prediction of kinase interactions with OCT4 generated from Phospho-Motif Finder identified two kinases, MAPKAPK2 (MK2) and DNA-PKcs which bind OCT4 and phosphorylate at S93 (DNA-PKcs) 15 and S111 (MK2) (FIG. 6B), and this direct nuclear binding was confirmed by subcellular fractionation co-IP (FIG. 6C).

Figure 6E:
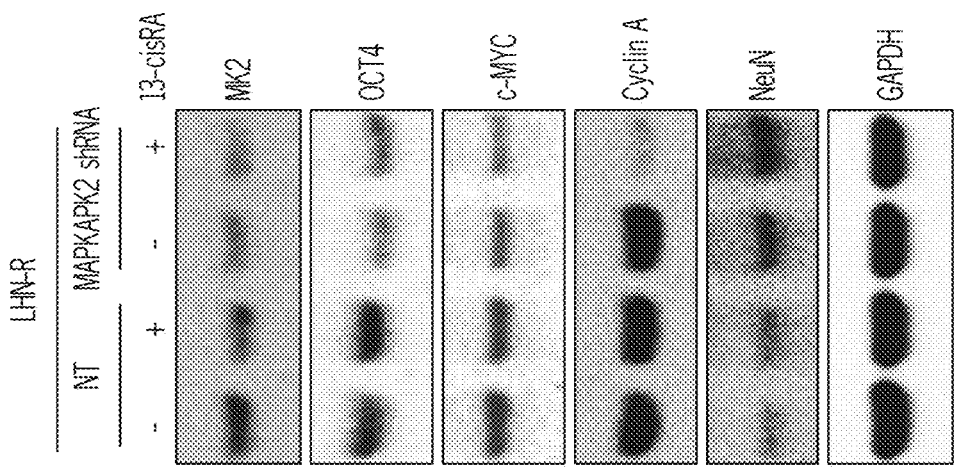
Figure 6D:
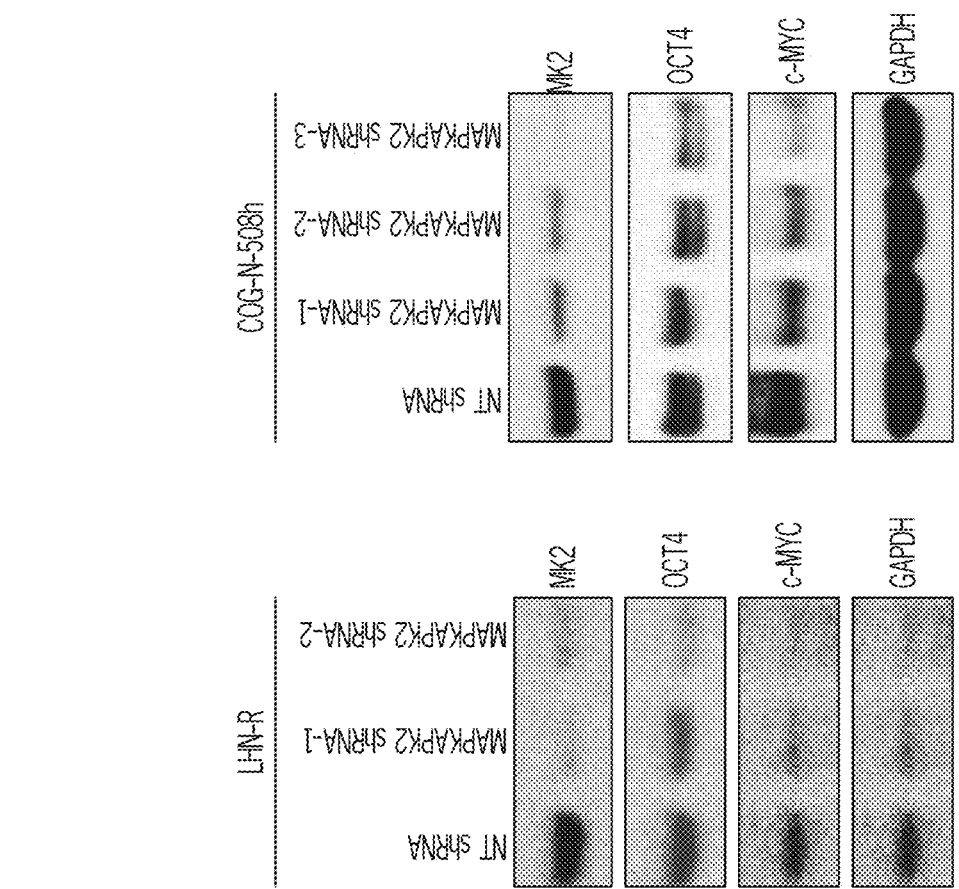
Figure 6F:
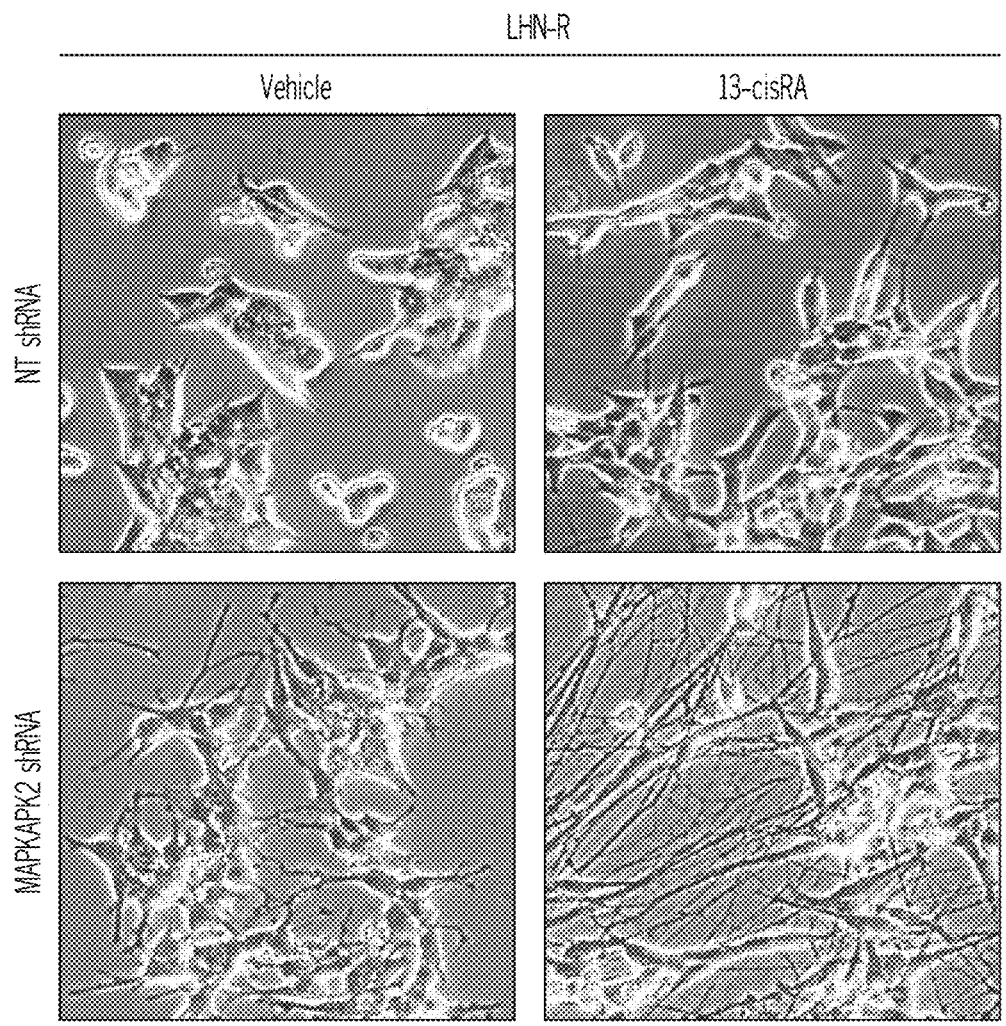
Figure 6G:
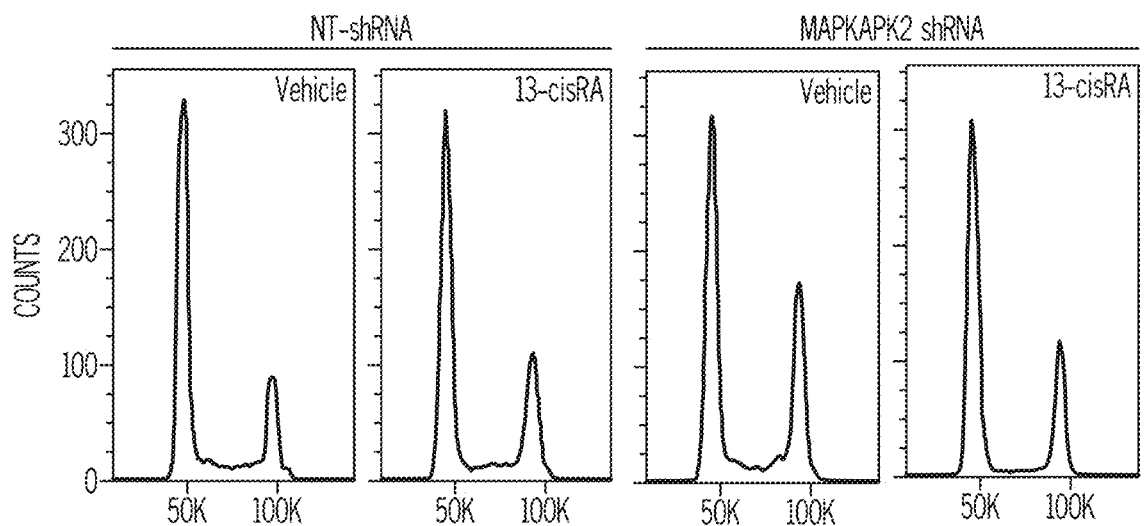

Given that pMK2 is higher in PD samples relative to Dx, the role of MK2 in OCT4 activation was studied by stably knocking down MAPKAPK2 in several neuroblastoma cell lines, including COG-N-508h a cell line established from a patient that progressed after 13-cisRA treatment. MAPKAPK2 knockdown resulted in reduced OCT4 and c-MYC (FIG. 6D), and the MAPKAPK2 knockdown cells treated with 13-cisRA showed reduced Cyclin A and increased expression of NeuN, a mature neuronal marker (FIG. 6E). MAPKAPK2 knockdown cells treated with 13-cisRA showed increased neurite outgrowth (FIG. 6F), and arrested cell cycle (FIG. 6G), indicating the restoration of sensitivity to 13-cisRA. Neurite outgrowth in response to 13-cisRA in MAPKAPK2 knockdown cells was similarly seen in the PD neuroblastoma cell line COG-N-443h.

Figure 7A:
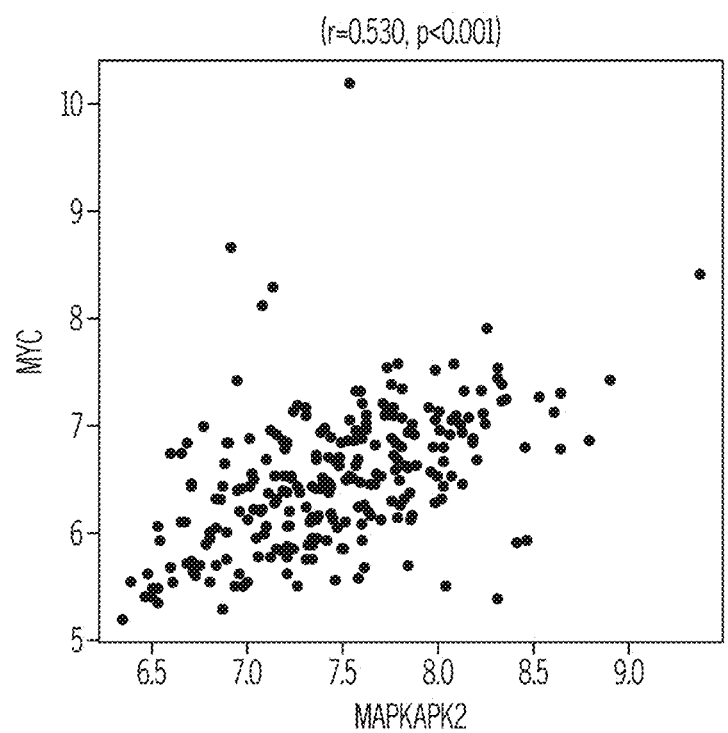
Figure 7B:
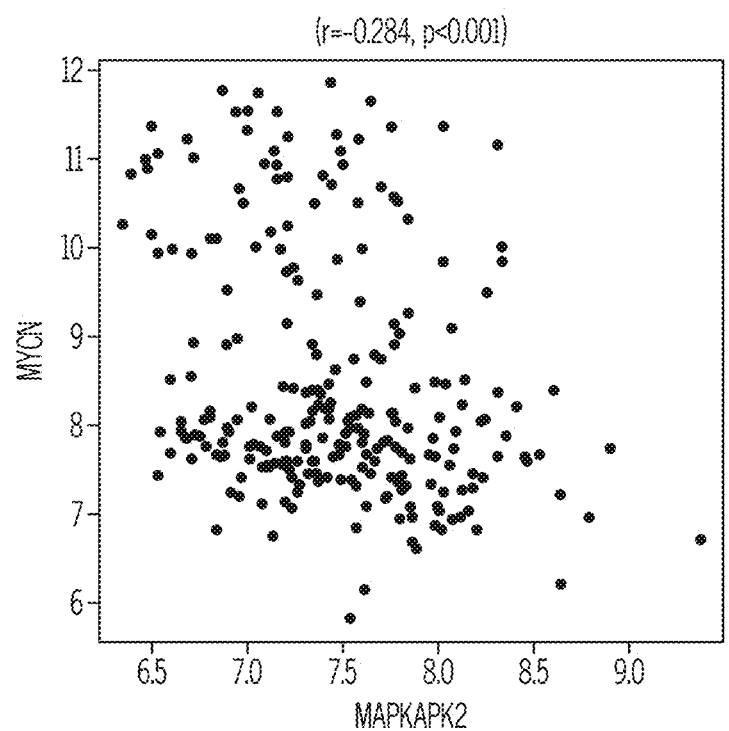
Figure 7C:
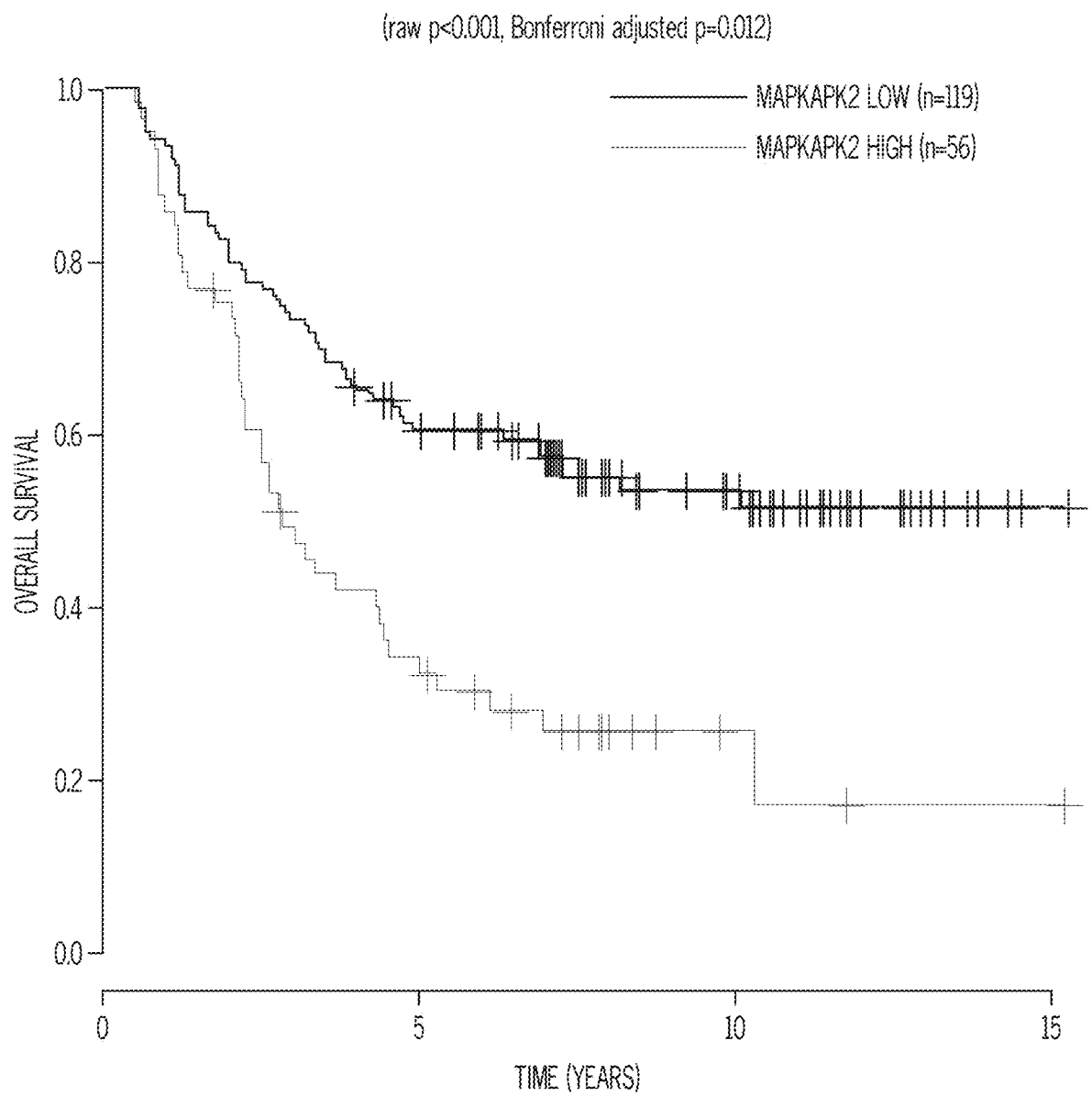
Figure 7D:
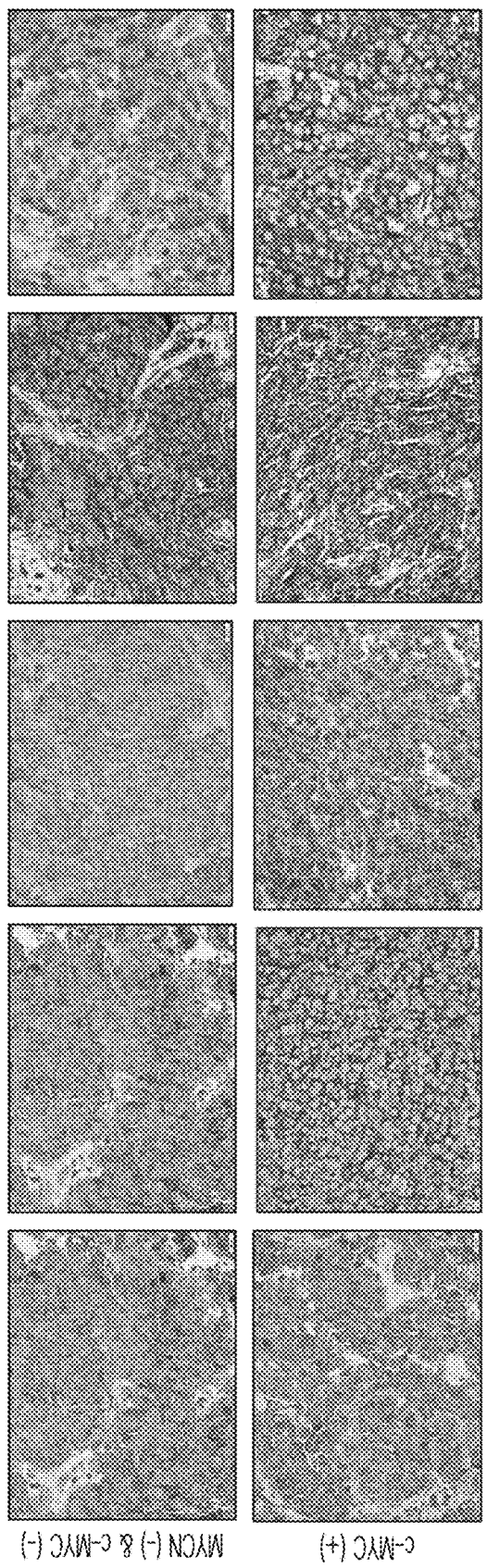

Based on these data, the correlation of MAPKAPK2 vs MYC or MYCN and patient survival by MAPKAPK2 expression were evaluated in the TARGET neuroblastoma database containing data on mRNA expression by microarray for 175 MYCN non-amplified primary tumors. Applicants observed MAPKAPK2 expression strongly positively correlated with MYC expression, but inversely correlated with MYCN expression (FIGS. 7A-7B, p<0.001). Notably, exogenous expression of WT MYC suppressed MYCN protein, and POU5F1 transfection did not increase MYCN expression by the addition of the POU5F1 plasmid DNA. In addition, high MAPKAPK2 expression at Dx was associated with poor survival (FIG. 7C, adjusted p=0.012), suggesting that MAPKAPK2 may serve as a biomarker at Dx for 13-cisRA sensitivity in neuroblastoma. In neuroblastoma clinical samples collected at Dx, MK2 protein expression was evaluated in five with low MYCN and c-MYC proteins and in five with high c-15 MYC protein (FIG. 7D). Although it is not conclusive, immunohistochemistry showed that the samples with high c-MYC protein express higher MK2 relative to those with low MYCN and c-MYC proteins.

Figure 7E:
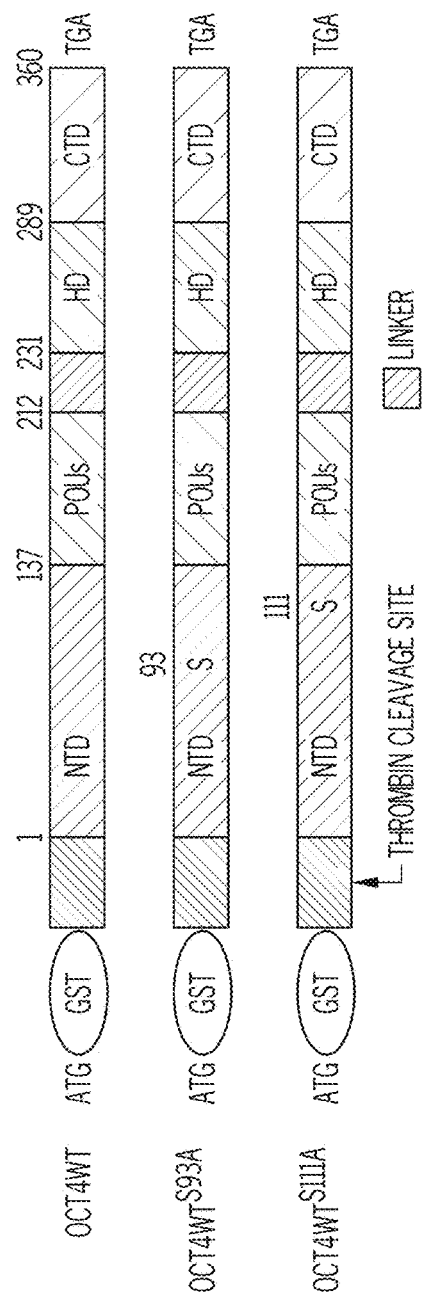
Figure 7F:
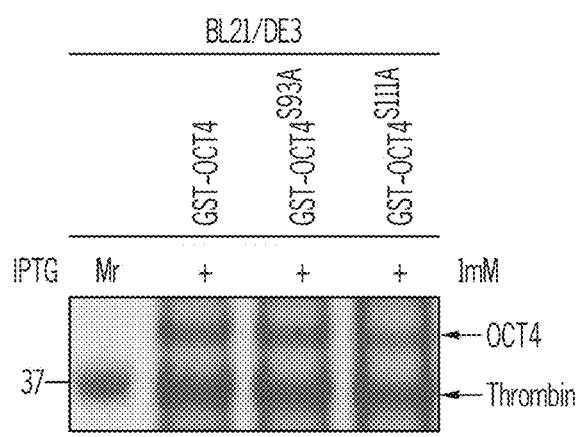
Figure 7G:
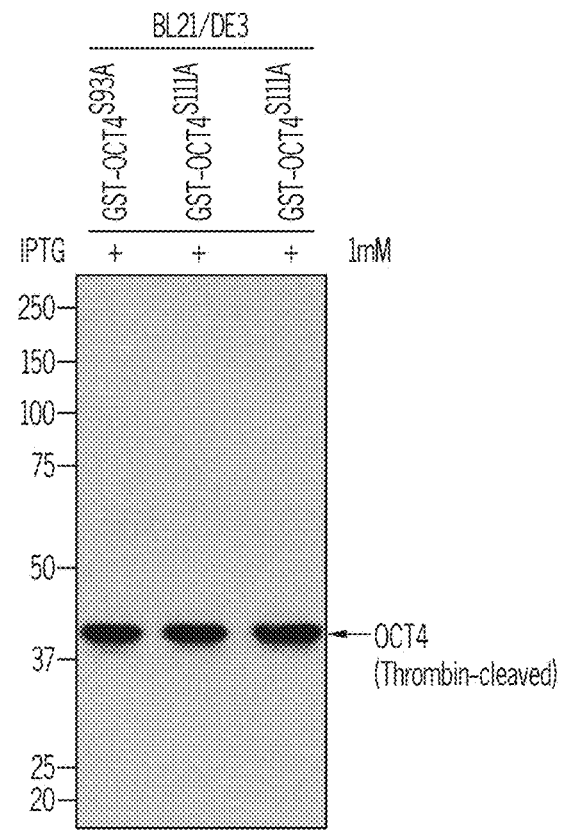

Example 2.7. pMK2 and pOCT4 Expression as Biomarker for Prognosis in Neuroblastoma Next, Applicants bacterially expressed the human recombinant proteins of wild-type OCT4 and OCT4 mutants (S93A and S111A, constructs shown in FIG. 7E), and purified them followed by thrombin cleavage (FIGS. 7F and 7G). An in vitro MK2 kinase assay using the recombinant proteins showed that MK2 did not phosphorylate OCT4 (FIG. 7H).

Figure 8A:
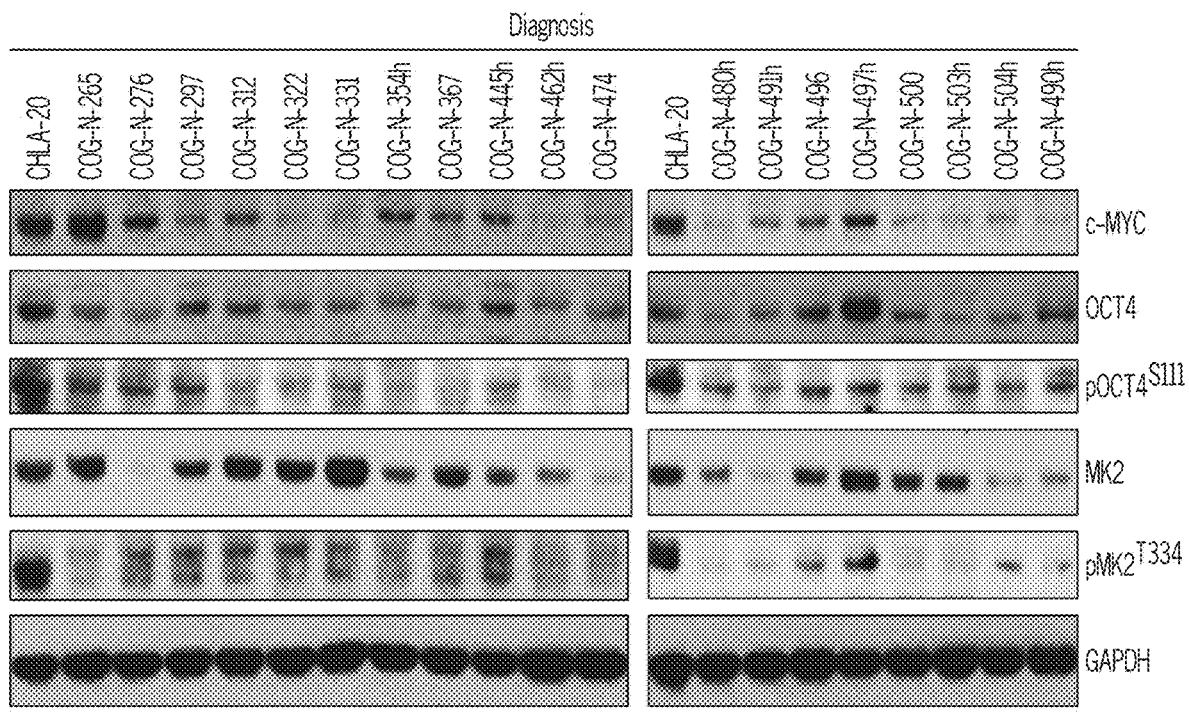
FIGS. 8A-8H show higher pMK2 and $pOCT4^{S111}$ in PD with high c-MYC.
Figure 8B:
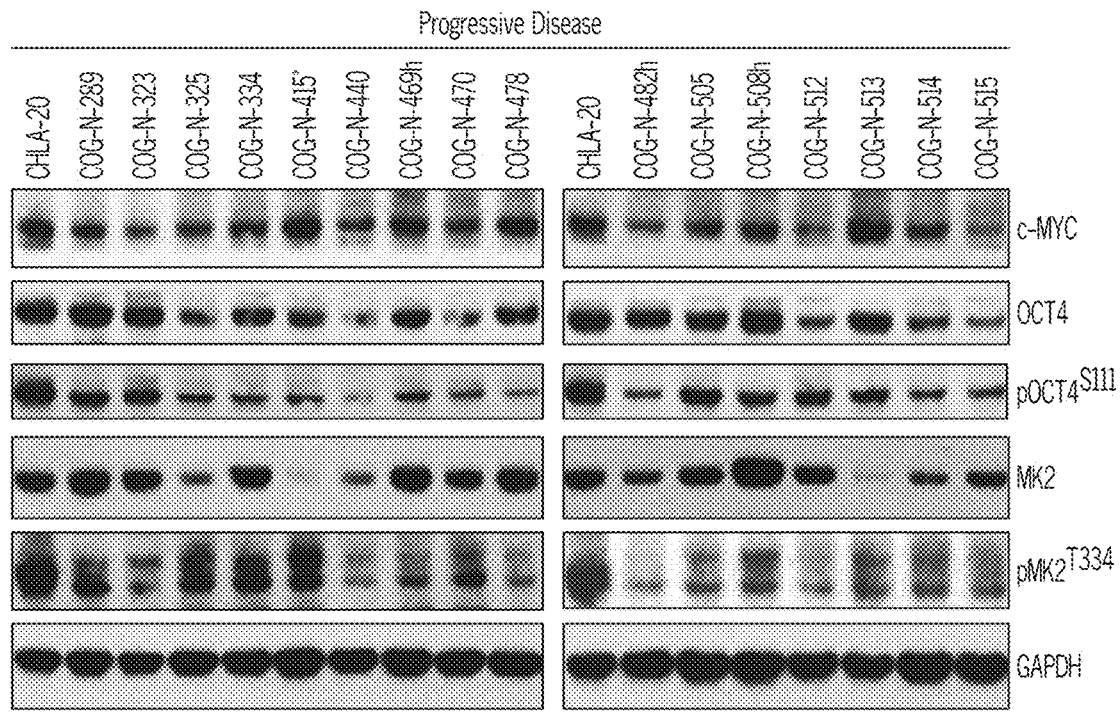
Figure 8C:
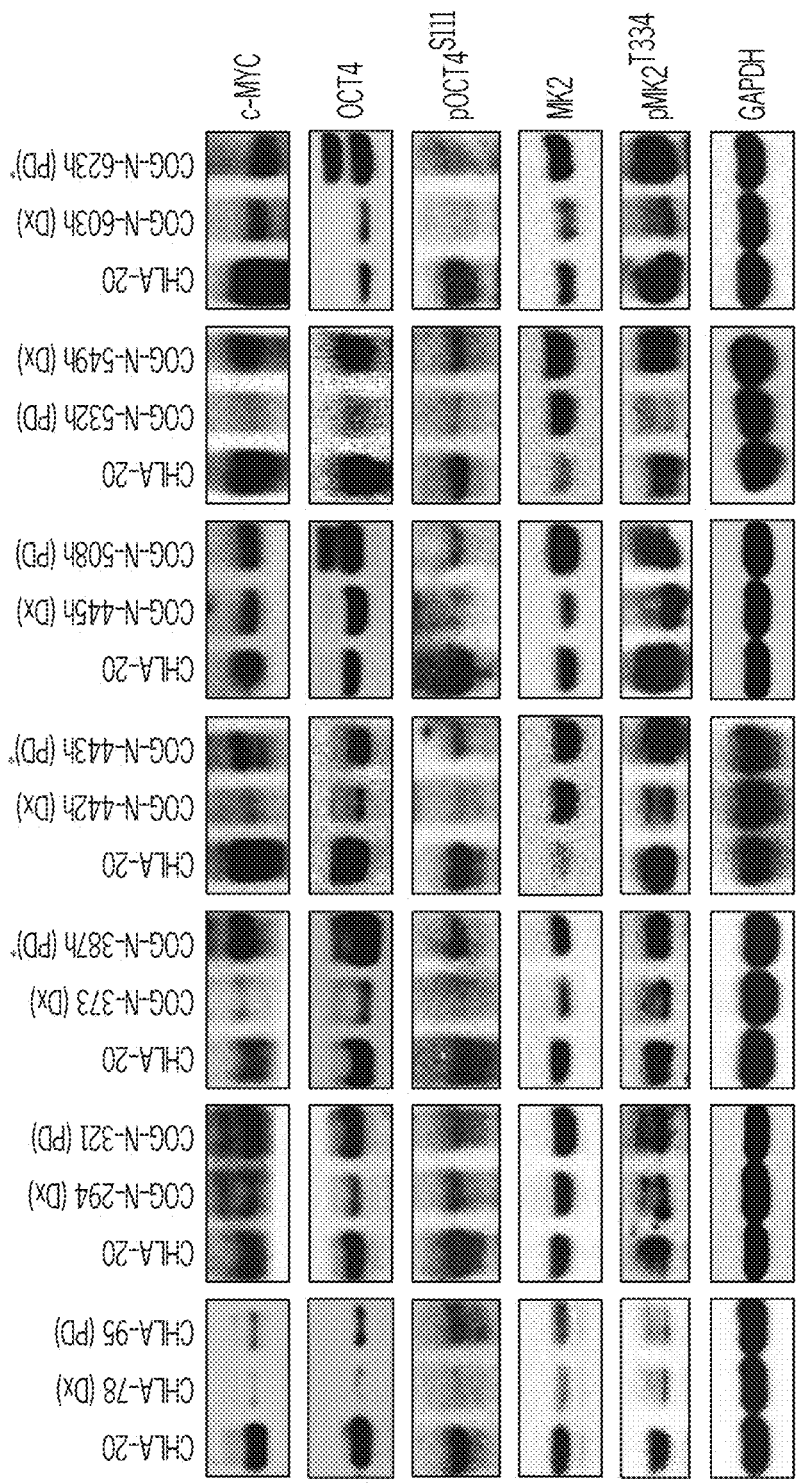
Figure 8D:
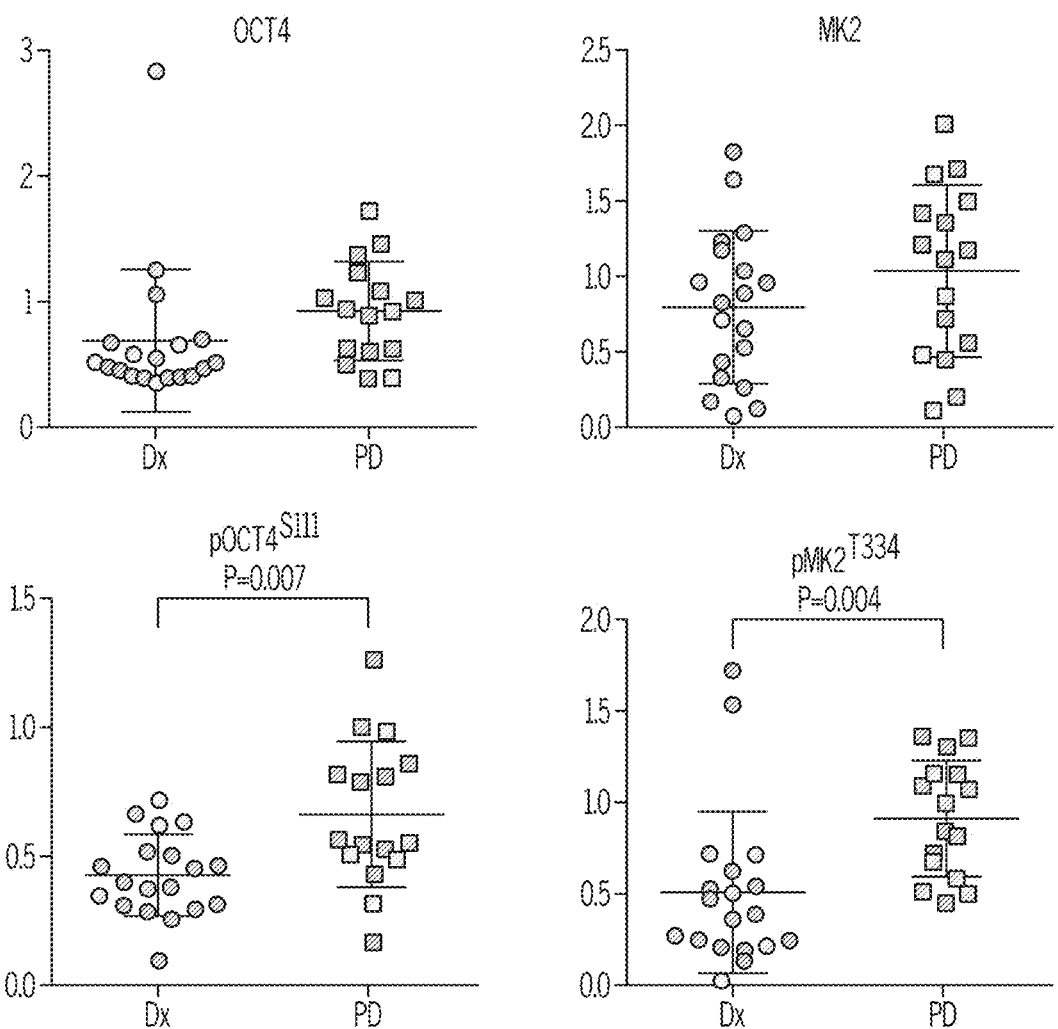

The constitutive protein expression of c-MYC, OCT4, pOCT4$^{S111}$, MK2 and pMK2 was compared between Dx (FIG. 8A) and PD (FIG. 8B) in non-paired as well as paired (Dx and PD established from the same patient) cell lines (FIG. 8C). The c-MYC protein levels are repeated in this figure from FIGS. 4A and 4B to show the association between c-MYC and OCT4/pOCT4$^{S111}$/MK2/pMK2. Immunoblot quantitation is shown in FIG. 8D. The levels of c-MYC, pOCT4$^{S111}$, and pMK2 were significantly higher in PD cell lines compared with unmatched Dx cell lines (p<0.01). OCT4 levels were not significantly different due to one outlier (COG-N-497h). In matched-pair cell lines, the six PD samples showed higher expression of c-MYC, OCT4, and pMK2 relative to their matched Dx samples.

Figure 8E:
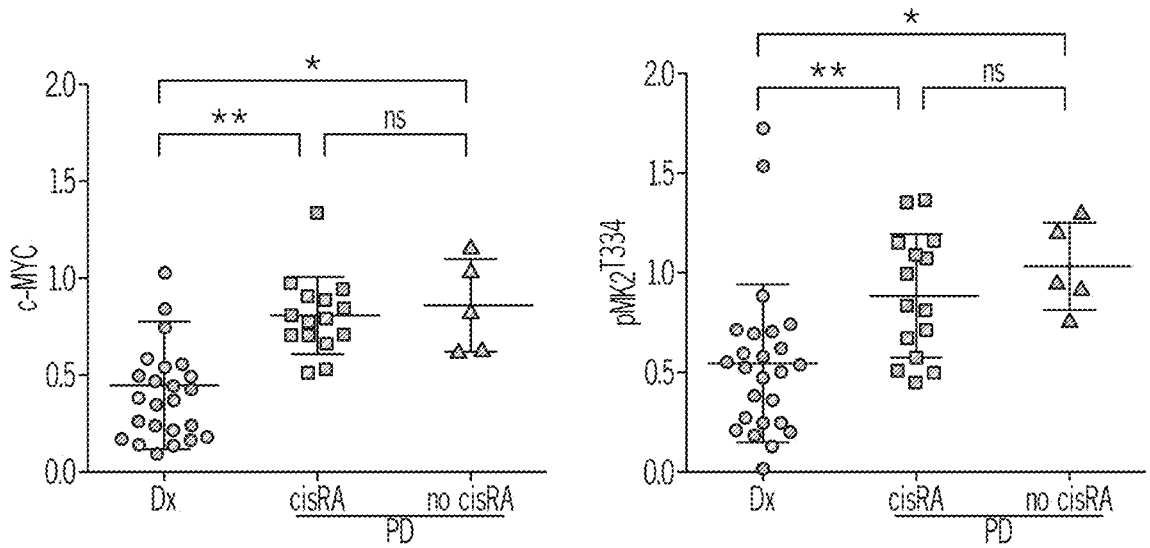

Applicants compared cell lines established from patients who progressed prior to 13-cisRA treatment to lines from patients treated with 13-cisRA (FIG. 8E). The c-MYC and pMK2 were significantly increased in PD cell lines with no prior 13-cisRA exposure relative to Dx while no significant differences were seen between PD with 13-cisRA and PD without 13-cisRA. Thus, pMK2-mediated increased c-MYC expression is not limited to tumors exposed to 13-cisRA.

Figure 7H:
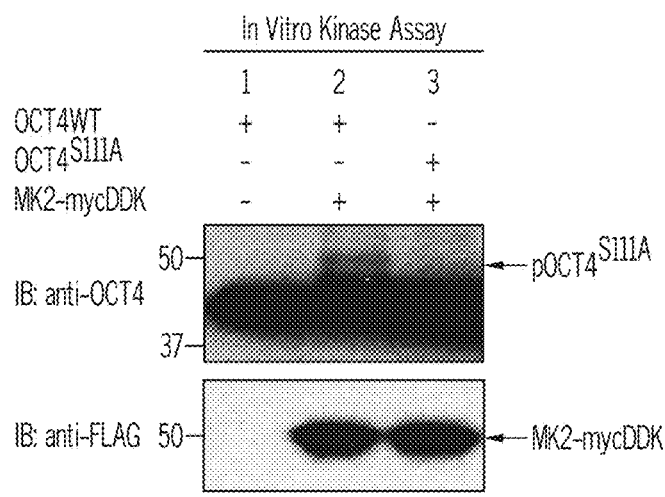

When S111 residue of OCT4 was mutated, pOCT4$^{S111}$ were not detected by S111A while OCT4 WT was phosphorylated (FIG. 7H). To demonstrate that S111 residue of OCT4 is phosphorylated in cell lines established from PD patients as well as LHN-R cells, a custom antibody of pOCT4$^{S111}$ was produced. The specificity was confirmed in LHN-R cells exogenously expressing OCT4WT and two mutants.

Anti-pOCT4$^{S111}$ antibody did not recognize the S111A mutant OCT4 but it reacted with OCT4$^{WT}$ and the S93A mutant while all three proteins were detected by anti-OCT4 antibody (FIG. 7I). The neutralized antibody by depleting the epitope with an excess of pOCT4$^{S111}$ peptide did not detect pOCT4$^{S111}$ while the antibody pre-incubated with OCT4$^{S111}$ peptide was able to detect pOCT4$^{S111}$ (FIG. 7J), confirming specificity of the anti-pOCT4$^{S1111}$ antibody.

The constitutive protein expression of c-MYC, OCT4, pOCT4$^{S111}$, MK2 and pMK2 was compared between Dx (FIG. 8A) and PD (FIG. 8B) in non-paired as well as paired (Dx and PD established from the same patient) cell lines (FIG. 8C). The c-MYC protein levels are repeated in this figure from FIGS. 4A and 4B to show the association between c-MYC and OCT4/pOCT4$^{S111}$/MK2/pMK2. The immunoblot quantitation is shown in FIG. 8D.

The levels of c-MYC, pOCT4$^{S111}$, and pMK2 were significantly higher in PD cell lines compared with unmatched Dx cell lines (p<0.01). OCT4 levels were not significantly different due to one outlier (COG-N-497h). In matched-pair cell lines, the six PD samples showed higher expression of c-MYC, OCT4, and pMK2 relative to their matched Dx samples. Applicants compared cell lines established from patients who progressed prior to 13-cisRA treatment to lines from patients treated with 13-cisRA (FIG. 8E) c-MYC and pMK2 were significantly increased in PD cell lines with no prior 13-cisRA exposure relative to Dx while no significant differences were seen between PD with 13-cisRA and PD without 13-cisRA.

Figure 8F:
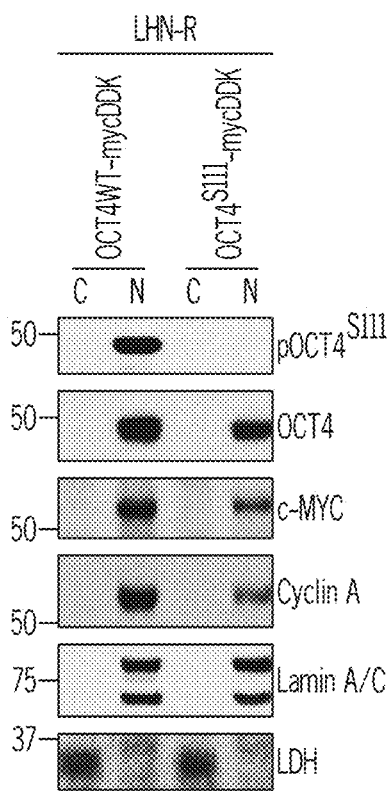
Figure 8G:
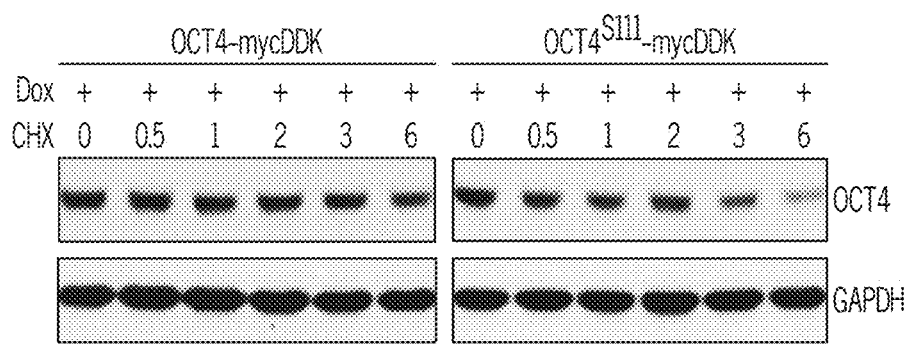
Figure 8H:
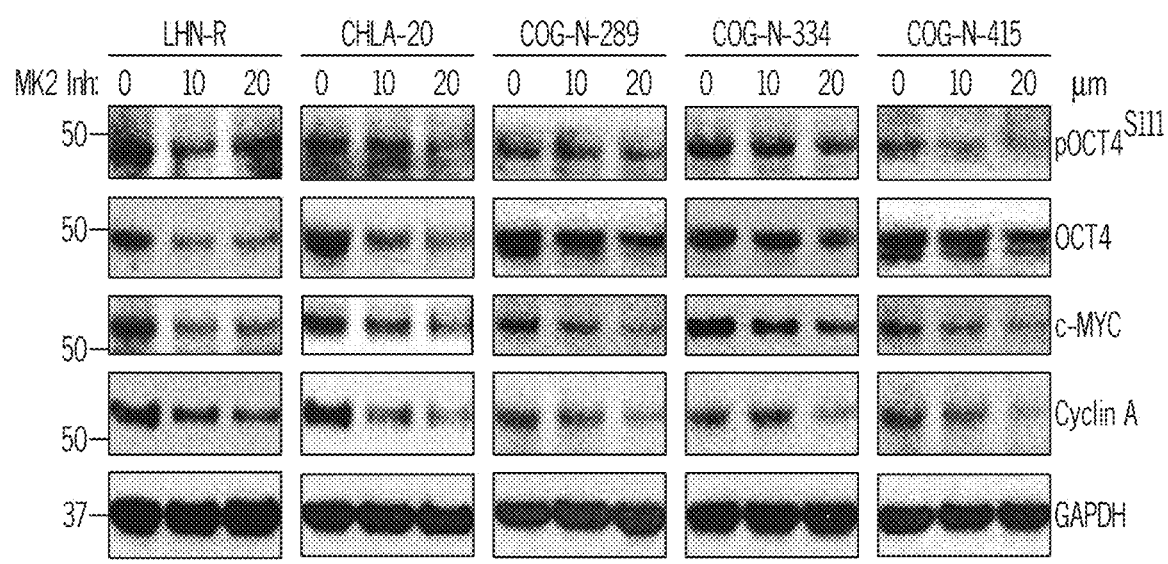

Thus, pMK2-mediated increased c-MYC expression is not limited to tumors exposed to 13-cisRA. When S111 residue of OCT4 was mutated pOCT4$^{S111}$ were not detected by immunoblotting (FIG. 8G). Although S111 mutation did not affect the nuclear translocation of the protein, c-MYC and Cyclin A protein levels were decreased and OCT4 protein stability was decreased (FIGS. 8F, 8G and 8H). MK2 inhibition by a small molecule MK2 inhibitor results in decreased pOCT4.

Figure 9A:
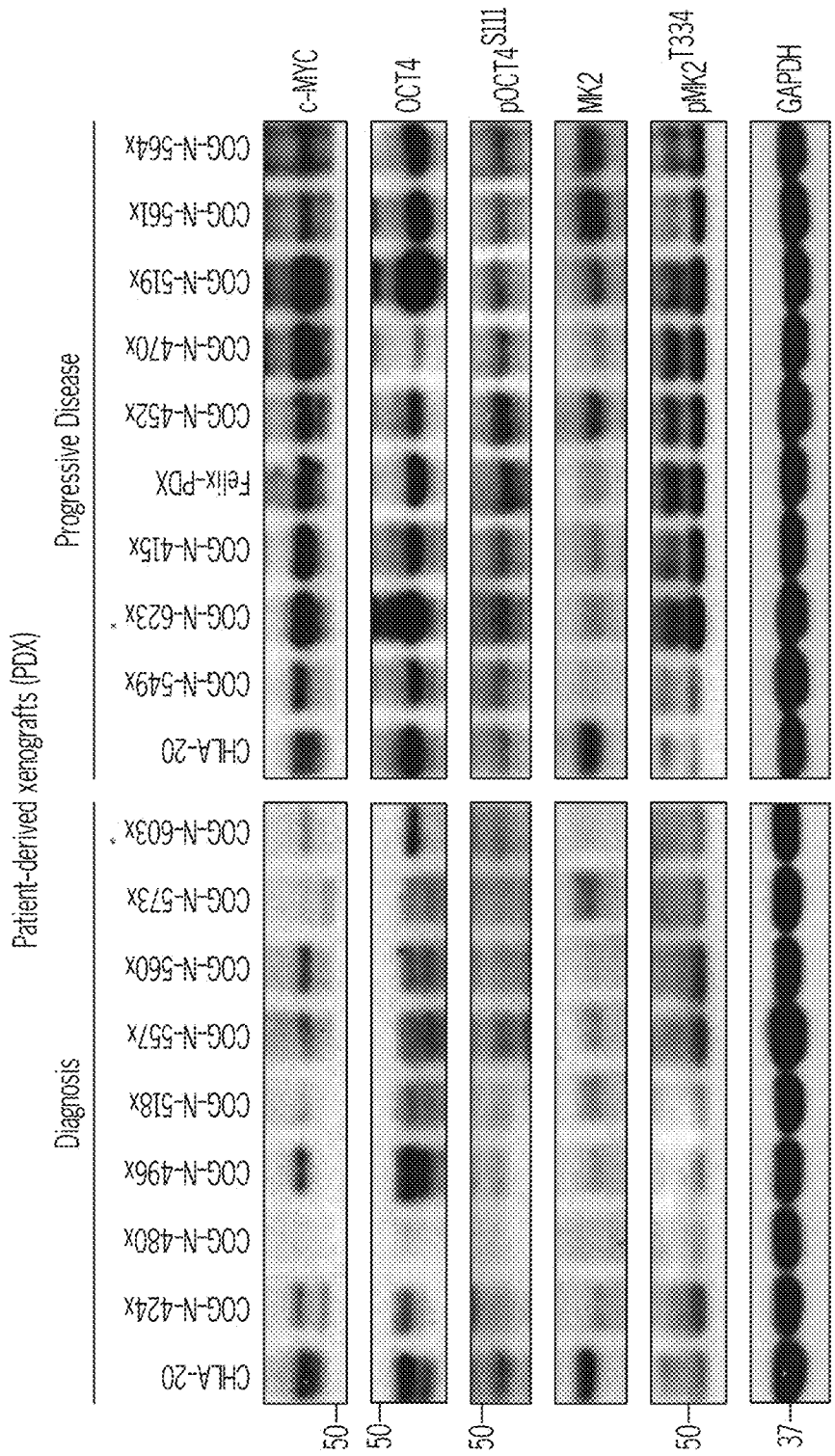
FIGS. 9A-9D show a novel transcriptional activation pathway of c-MYC by OCT4 phosphorylated by MK2.
Figure 9B:
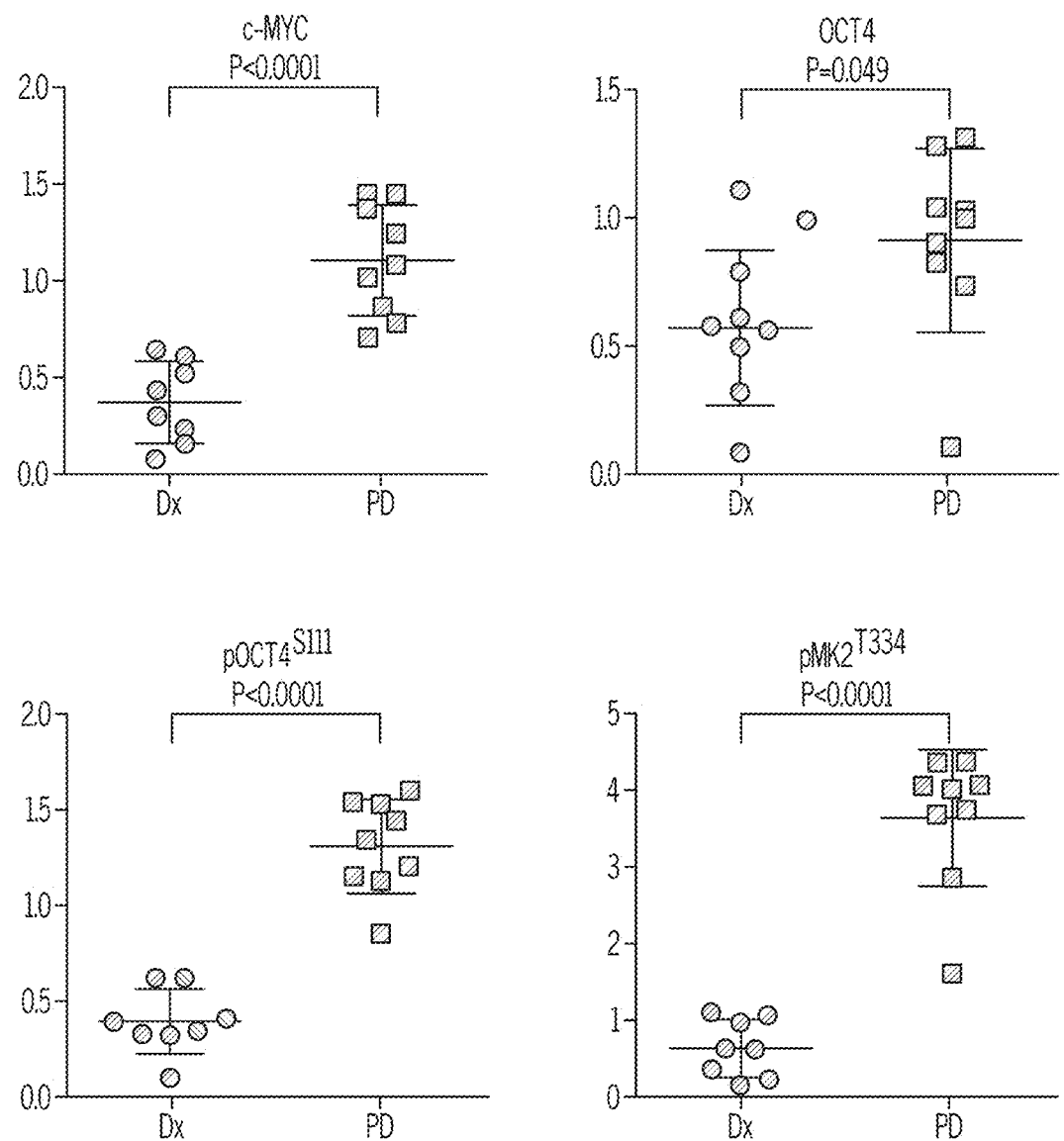
Figure 9C:
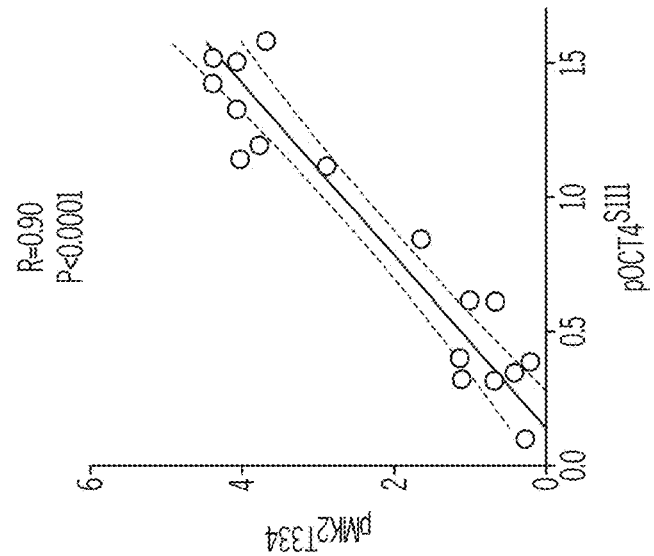
Figure 9C:
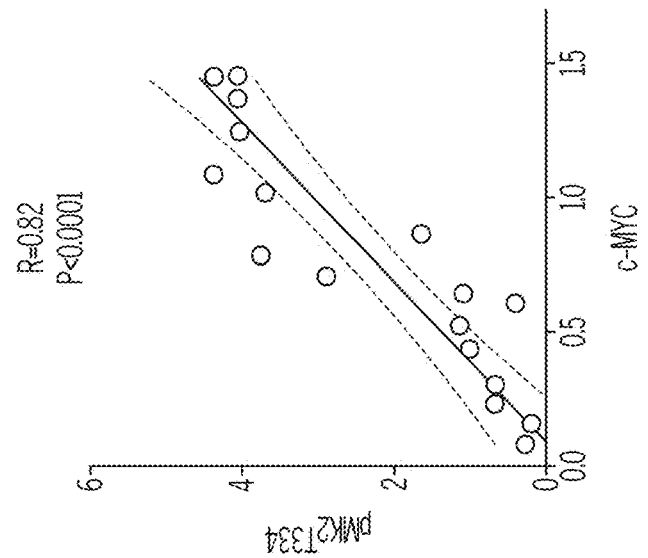
Figure 9C:
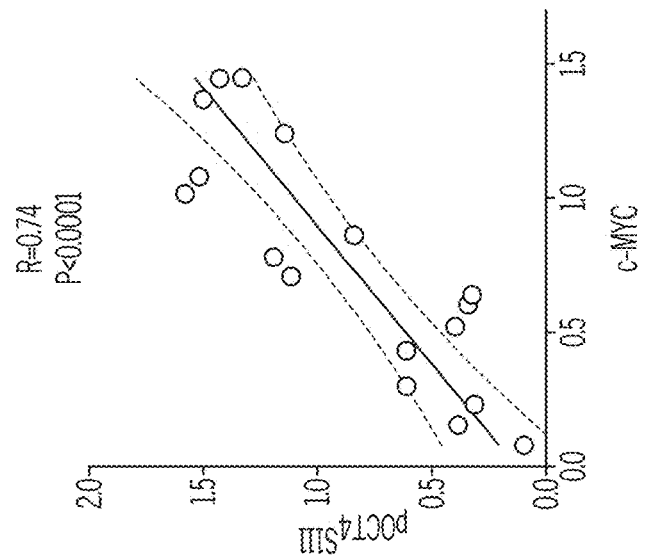
Figure 9D:
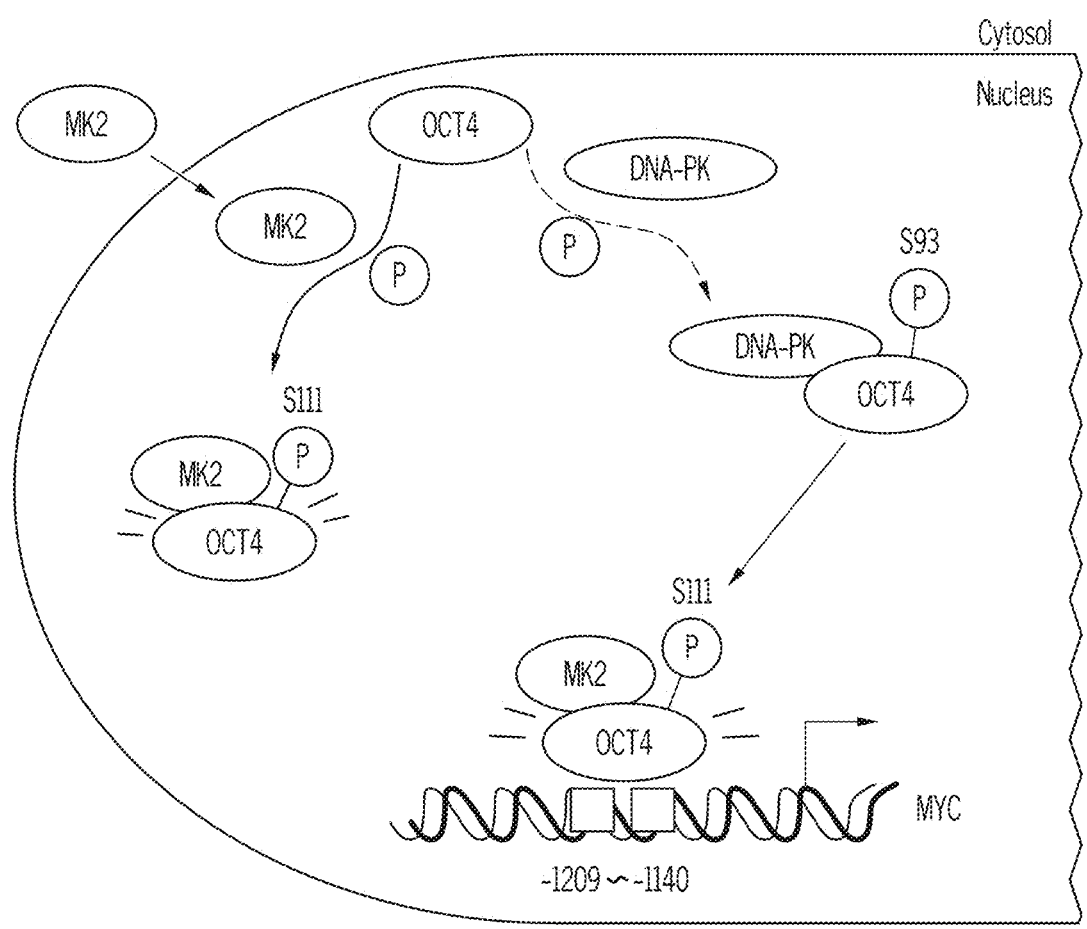
Figure 10A:
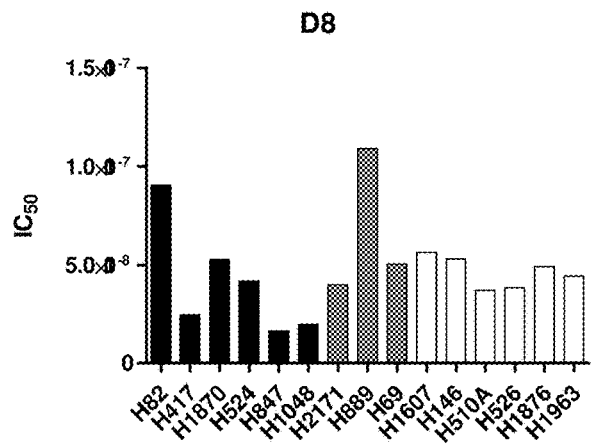
FIGS. 10A-10E show cytotoxicity of D8 (i.e., narciclasine) and several DNA-PK inhibitors (NU7441, M3814, CC-115, AZD7648) in 16 small cell lung cancer cell lines with high (black and gray bars) or low (white bars) c-MYC expression.
Figure 10B:
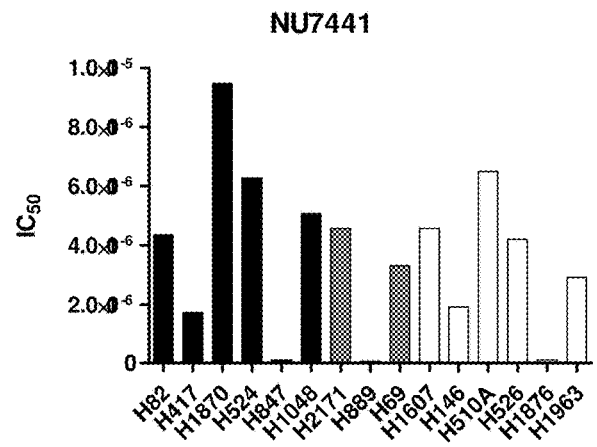
Figure 10C:
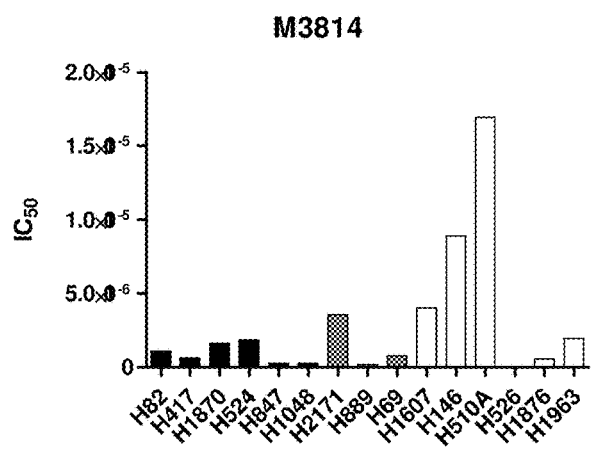
Figure 10D:
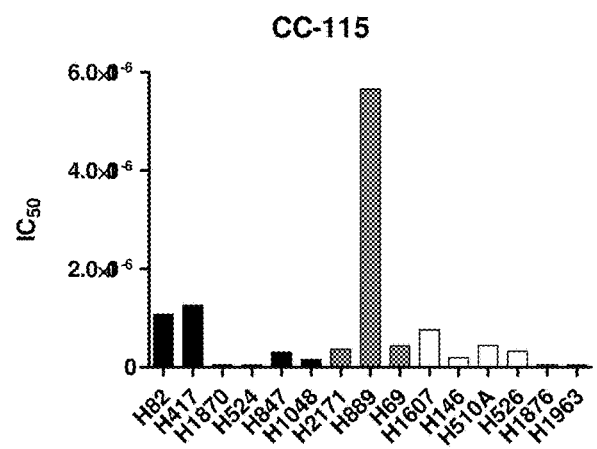
Figure 10E:
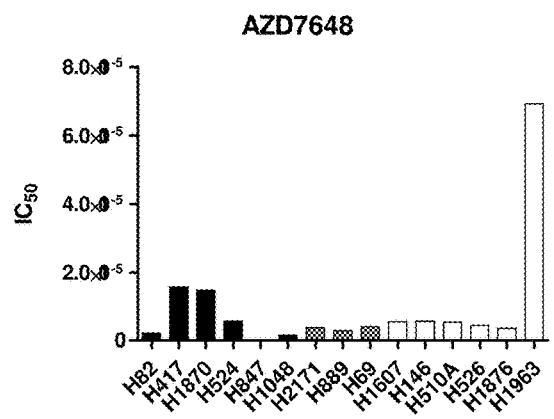

Although more tumor biopsy samples are becoming available for PD patients recently as testing for targeted agents is now more common, historically it has been uncommon to obtain tumor biopsies both pre- and post-therapy from the same patient. In the panel of patient-derived xenografts (PDXs), the protein expression of c-MYC, pOCT4$^{S111}$ and pMK2$^{T234}$ was significantly higher in progressive disease compared with diagnosis (FIGS. 9A and 9B). Although the PDX sample size was small, strong correlation was seen between c-MYC and pOCT4$^{S111}$ as well as c-MYC and pMK2$^{T234}$ (FIG. 9C). The expression of protein and phospho-protein in a matched pair cell lines (603h/623h, FIG. 8C) was consistent in matched patient-derived xenografts (603x/623x) established from the same patient (FIG. 9A).

Example 2.8. Discussion

MYCN genomic amplification has been well established as one of the prognostic markers in neuroblastoma. More recently, the prognostic significance of c-MYC has been reported in a small group, and then in a large cohort of neuroblastoma patients with undifferentiated/poorly differentiated tumors.

Although MYC amplification is rare in neuroblastoma, high c-MYC protein in patients with undifferentiated tumors was as frequent as 11% at diagnosis, suggesting that MYC transcriptional activation rather than gene amplification determines the prognosis of the patients. Since tumor biopsies at PD infrequently obtained from children with neuroblastoma, Applicants have instead utilized low-passage cell lines and patient-derived xenografts established from bone marrow and blood of PD patients. Applicants' discovery of c-MYC mediating resistance to 13-cisRA and being highly expressed in PD suggests that MYC transcriptional activation occurs both in a subset of patients at diagnosis and likely more frequently in tumors at time of PD.

Tumors that recurred after PIK3CA inactivation acquired focal amplification of MET or MYC in an in vivo mouse breast cancer model expressing PIK3CA$^{H1047R}$. Also, the MYC/eIF4E axis is a mediator of drug resistance to BEZ-235 in breast cancer cells. In leukemia, MYC activation compromised tyrosine kinase inhibitor sensitivity and functional inhibition of MYC overcame resistance by promoting differentiation.

In Applicants' experiments, MYCN regulation by 13-cisRA was not attenuated by repeated exposure to the drug in neuroblastoma cells, but escape from sustained suppression of MYCN occurred via MYC transcriptional activation. MYC and MYCN are structurally and functionally homologous, and Mycn can functionally replace Myc in murine development, cell growth and differentiation. Applicants showed that MYC knockdown increased MYCN protein, but the cells did not regain their proliferative properties, suggesting that 13-cisRA-resistant cells are addicted to MYC and that c-MYC functionally replaces MYCN in 13-cisRA-resistant neuroblastoma.

Given that four of the seven matched pair cell line and xenograft models were established from patients who did not receive 13-cisRA due to rapid progression of the disease, and that the four pairs along with one non-paired PD cell line showed elevated pMK2 and c-MYC, the OCT4/c-MYC axis Applicants discovered could apply to progressive disease beyond 13-cisRA resistance. OCT4-induced MYC activation with MK2 as an upstream kinase has been defined as a new neuroblastoma oncogenic pathway in the current study (FIG. 9G).

Oct4 is one of the most important transcription factors that controls self-renewal and pluripotency in the early stages of mammalian embryogenesis, and it cannot be replaced by any other POU family members in reprogramming somatic cells into induced pluripotent stem cells (iPSC). Ectopic expression of OCT4 blocks progenitor-cell differentiation and causes dysplasia in epithelial tissues. Not only is OCT4 required to maintain the pluripotency of human embryonic stem cells, but it is also involved in lineage specification.

For reprogramming somatic cells, OCT4 along with c-MYC, KLF4, and SOX2 are required to induce pluripotency in both human and mouse somatic cells in vitro. Other studies demonstrated that higher expression of OCT4 occurs in embryonic or cancer stem cells. One study showed Oct4 as the upstream of mych, a Myc family member, in the development of zebrafish. Applicants' study is the first to show OCT4 as an upstream regulator of c-MYC in human cancer. Previous studies in embryonic stem cells showed that phosphorylation sites in OCT4 $POU_{HD}$ (T235, S236 and S229) are important for pluripotency. This is especially important since Applicants' data suggest that the function of OCT4 in cancer may be distinguished from its role in pluripotency. The downstream activation, in cancer or in pluripotency, by OCT4 will depend on kinase-specific phosphorylation of residues.

Applicants' data establish the MK2/OCT4/c-MYC axis as a mechanism of progressive disease neuroblastoma regardless of prior 13-cisRA exposure. This mechanism of MYC transcriptional activation may be operative in other cancer types and could potentially be an important therapeutic target. The p38 MAPK (p38) kinase, upstream of MK2, has been investigated as a therapeutic target in inflammatory diseases due to its role in the regulation of the mRNA stability of TNF-α, along with several other mediators with unknown immune responses.

Many p38 inhibitors were tested in clinical trials but none progressed to phase III mainly due to systemic toxicities (hepato-, cardiac toxicities, and CNS disorders), possibly due to p38 being involved in the regulation of more than 60 substrates with various physiological roles. For that reason, MK2 (the first substrate of p38) is being tested as an alternative target to p38 in inflammatory diseases.

In summary, Applicants' data show that MK2 is a potential target to modulate c-MYC expression. Additionally, Applicants' studies define the MK2/OCT4/c-MYC axis as a novel mechanism of MYC transcriptional activation in neuroblastoma that mediates resistance to 13-cisRA by rescuing 13-cisRA induced MYCN depletion. OCT4 binding on the newly identified binding sites in the promoter/enhancer region of MYC, and MK2 may provide a novel molecular target for regulating the MYC oncogene.

Example 3. Evaluation of the Activity of Narciclasine (D8) in Small Cell Lung Cancer In this Example, Applicants examined the cytotoxic activity of narciclasine (i.e., D8) in comparison to DNA-PK inhibitors that are commercially available (including NU7441, M3814, CC-115, and AZD7648) in 16 small cell lung cancer cell lines. The experimental results are summarized in FIGS. 10A-10E. Of the agents tested, narciclasine demonstrated the highest potency in cytotoxicity against small cell lung cancer cell lines. The $IC_{50}$ values for narciclasine was less than 100 nM in all cell lines except NCI-H889.

Figure 11:
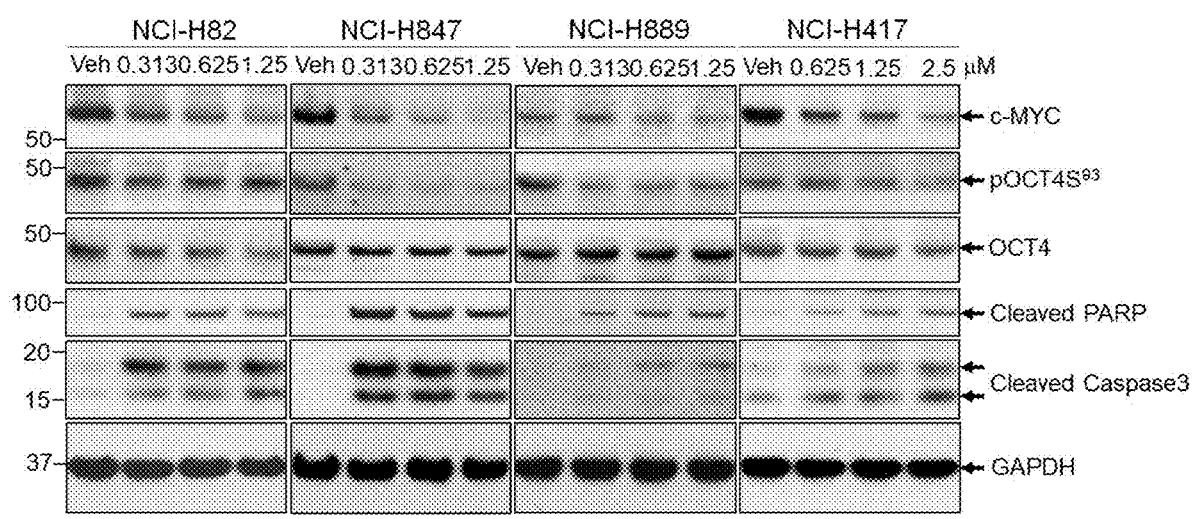
FIG. 11 illustrates the effect of narciclasine in c-MYC protein expression. Narciclasine's effect on pOCT4S93 and OCT4 as well as apoptosis (measured by caspase and PARP cleavage) are also assessed in four small cell lung cancer cell lines with high c-MYC expression.

Compared to vehicle control, narciclasine reduced c-MYC and pOCT4S93 and cleaved PARP and caspase 3 in four small cell lung cancer cell lines (NCI-H82, NCI-H847, NCI-H889, NCI-H417) at the concentration range between 0.3 and 2.5 µM. These experimental results, which are summarized in FIG. 11, indicate that narciclasine induces apoptosis as a cell death mechanism in small cell lung cancer cells.

Figure 12A:
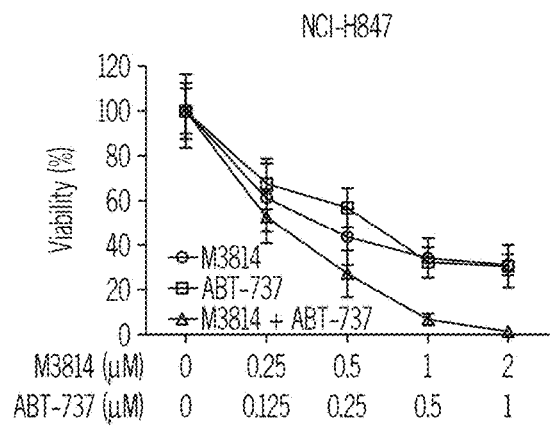
FIGS. 12A-12F illustrate the combination cytotoxic activity of D8 (i.e., narciclasine) and ABT-737 (a BCL-2 inhibitor) in two small cell lung cancer cell lines. The effect of the combination on c-MYC, pOCT4, OCT4, cyclin A, BCL-2 family of proteins, the cleavage of and caspase-3 and PARP were evaluated.
Figure 12B:
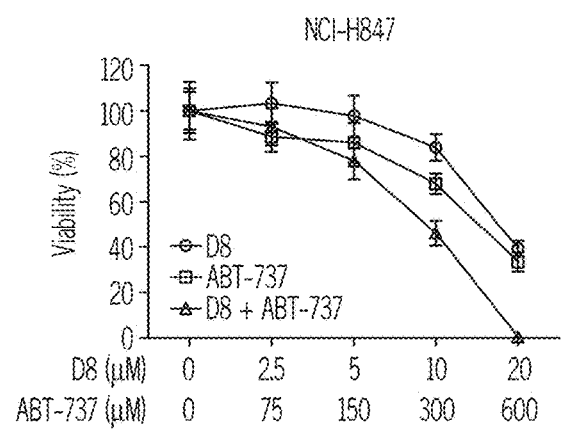
Figure 12C:
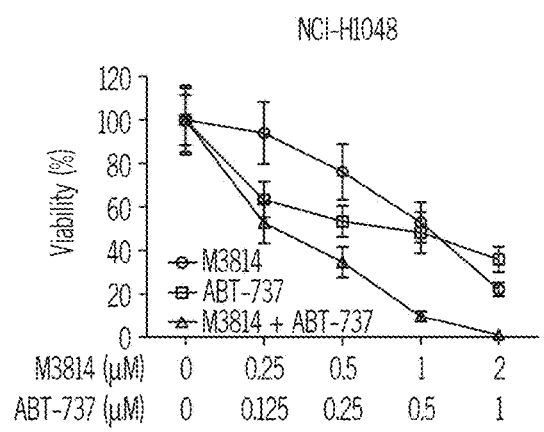
Figure 12D:
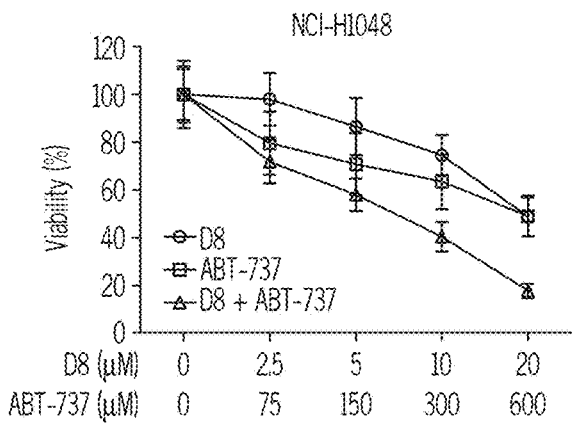
Figure 12E:
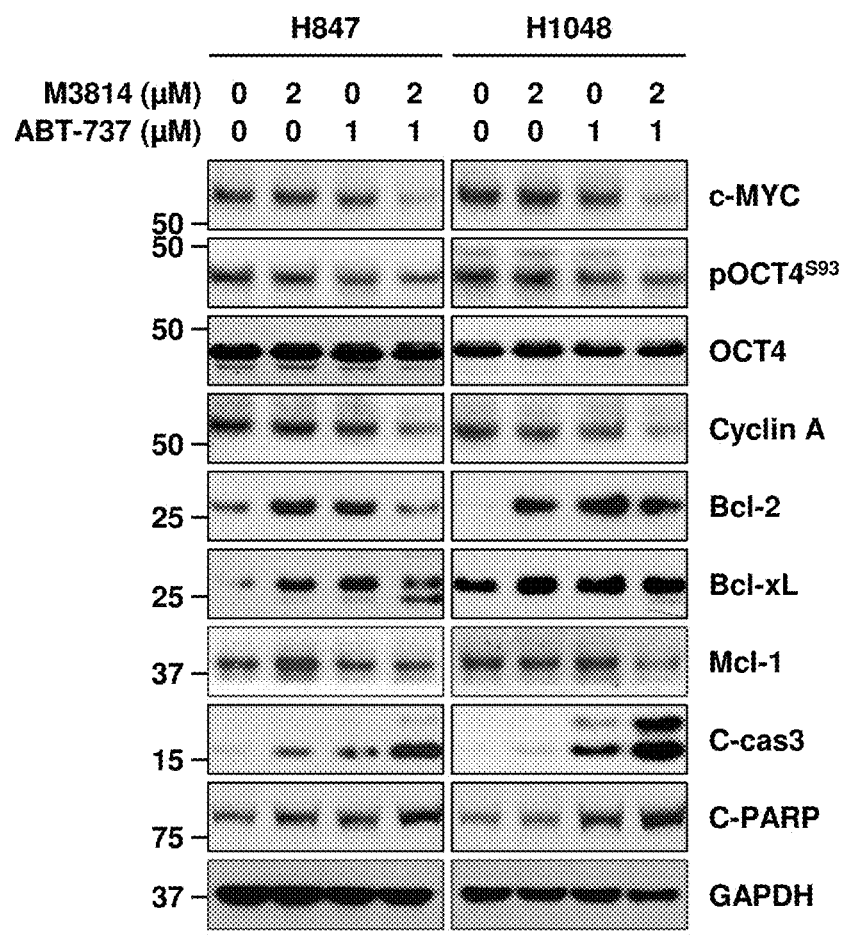
Figure 12F:
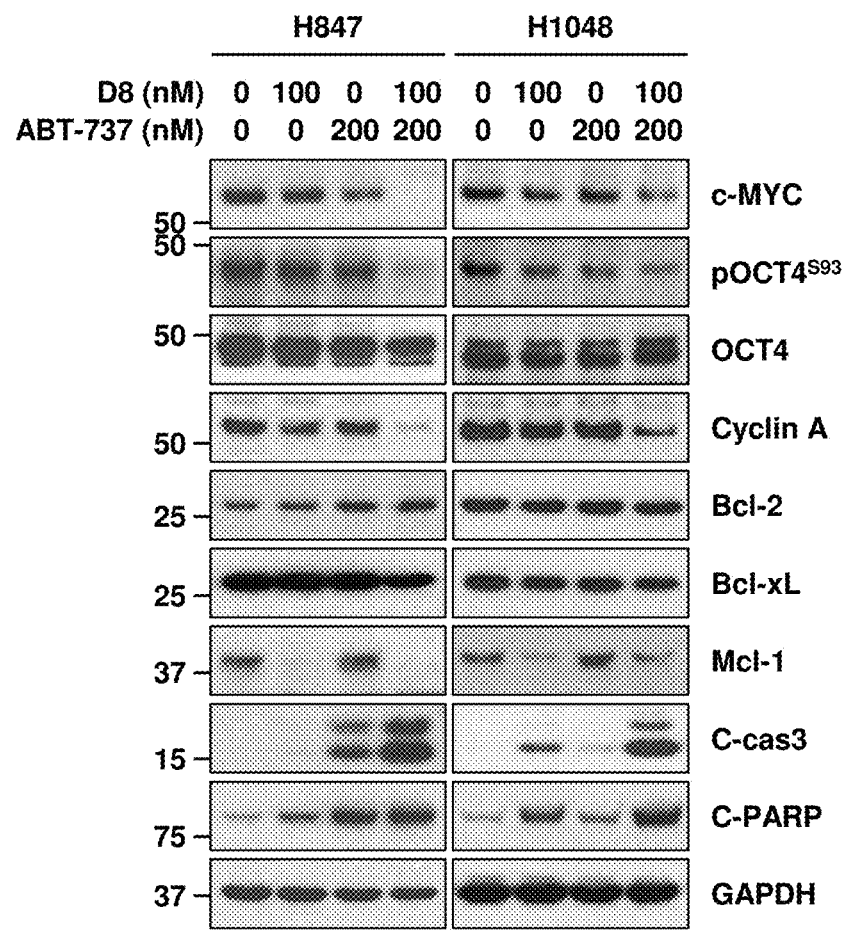
Figure 13A:
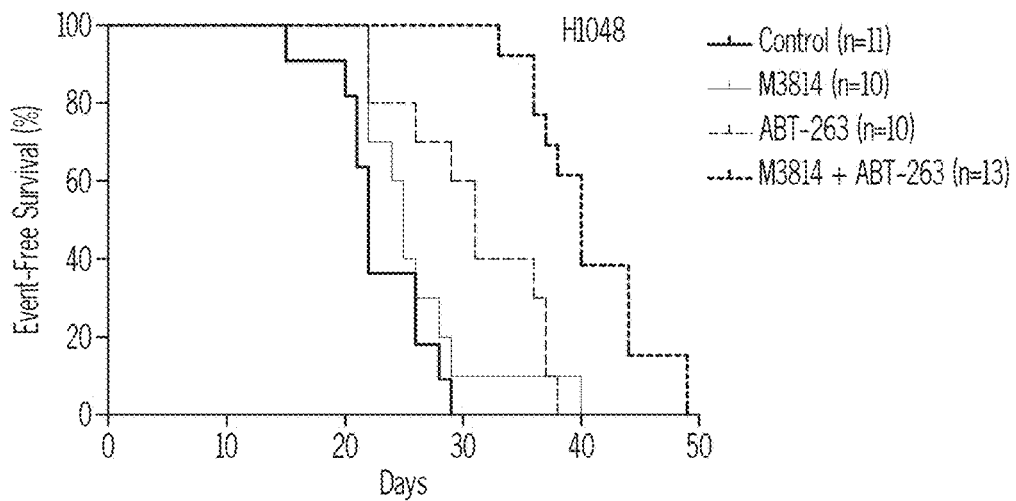
FIGS. 13A-13I show in vivo xenograft activity of M3814, a DNA-PK inhibitor, and ABT-263, a BCL-2 inhibitor, in mice carrying H1048, a human small cell lung cancer cell line.
Figure 13B:
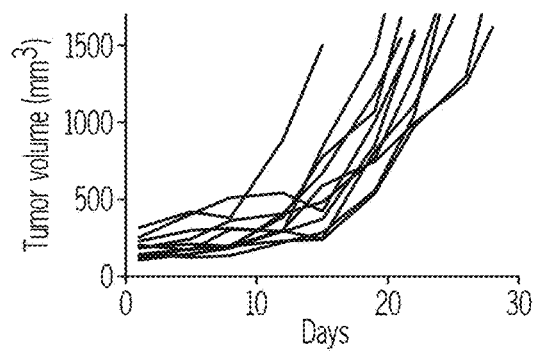
Figure 13C:
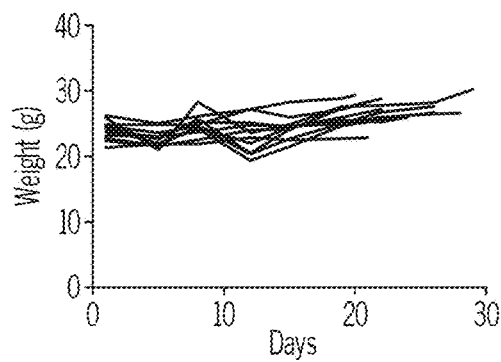
Figure 13D:
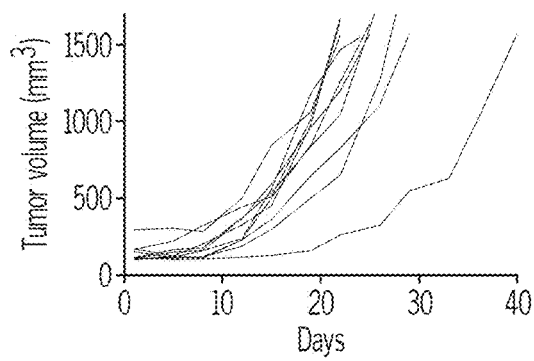
Figure 13E:
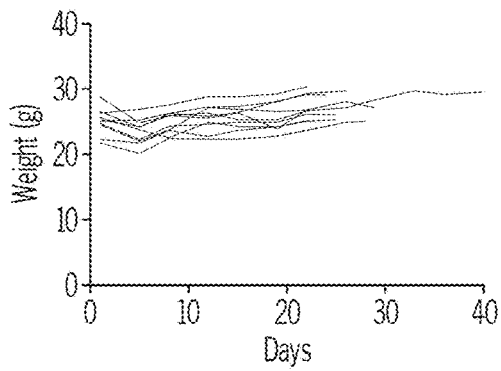
Figure 13F:
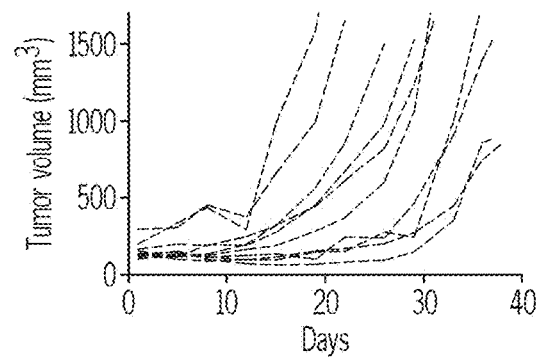
Figure 13G:
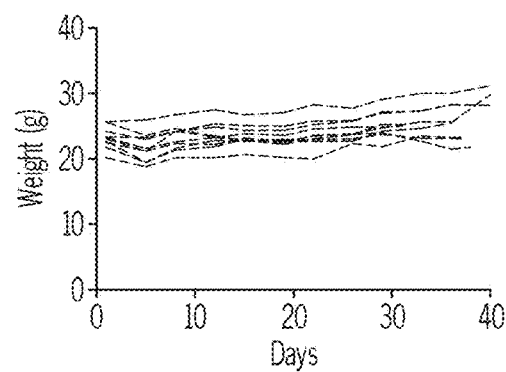
Figure 13H:
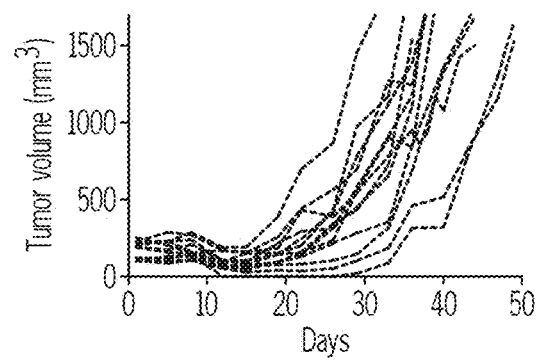
Figure 13I:
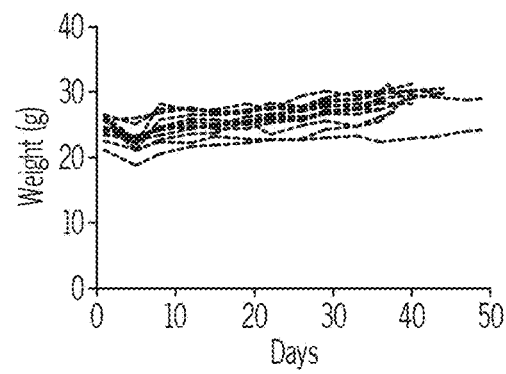
Figure 14A:
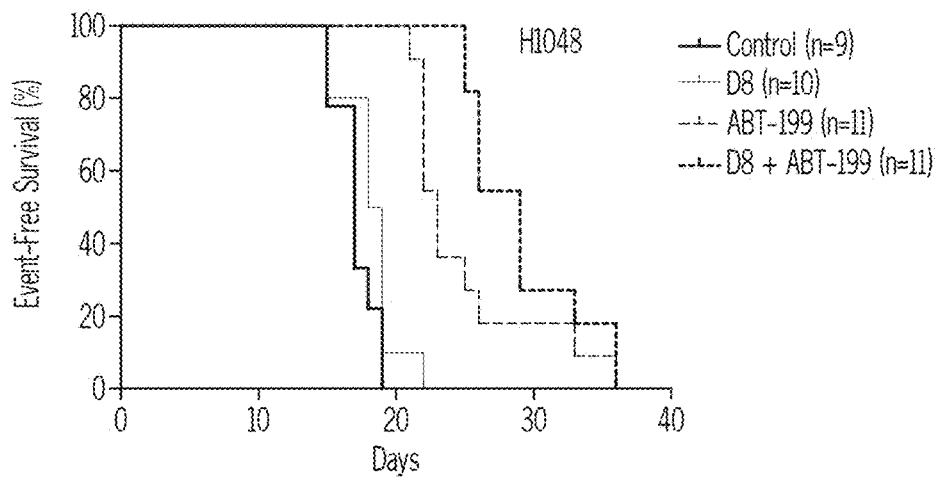
FIGS. 14A-14I show in vivo xenograft activity of D8 (narciclasine), a DNA-PK interaction inhibitor, and ABT-199, a BCL-2 inhibitor, in mice carrying H1048, a human small cell lung cancer cell line.
Figure 14B:
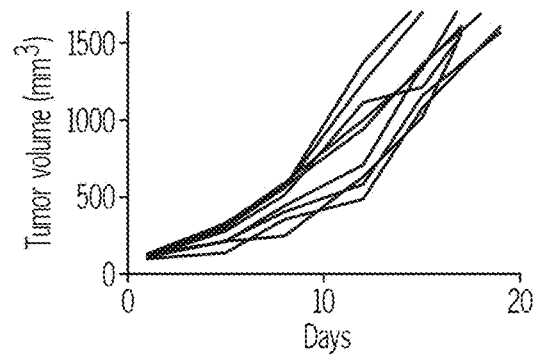
Figure 14C:
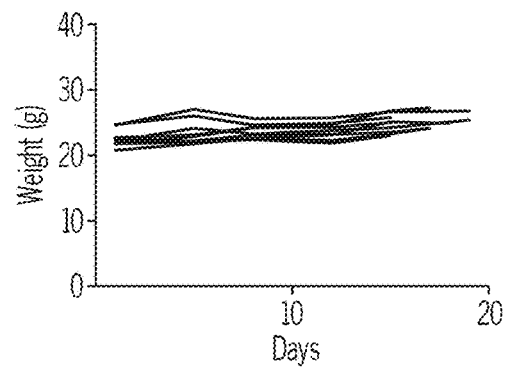
Figure 14D:
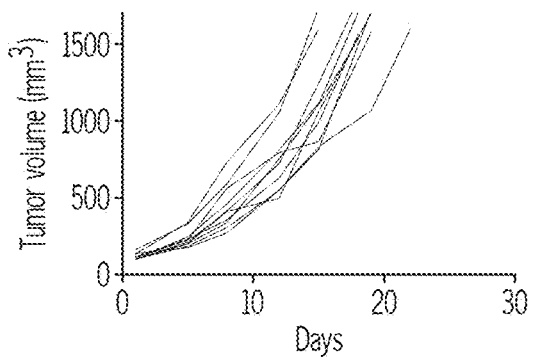
Figure 14E:
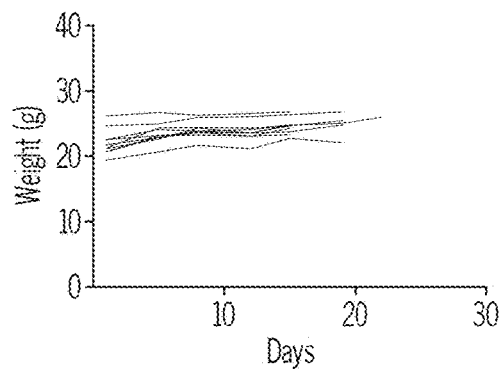
Figure 14F:
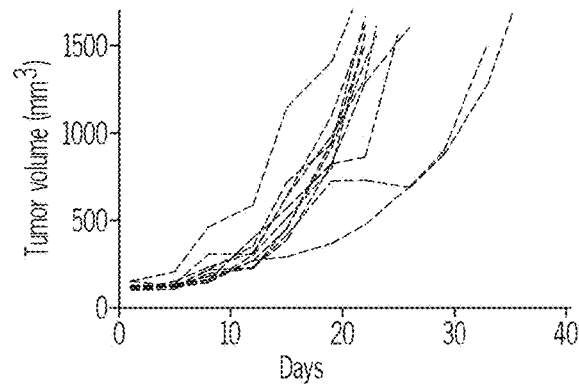
Figure 14G:
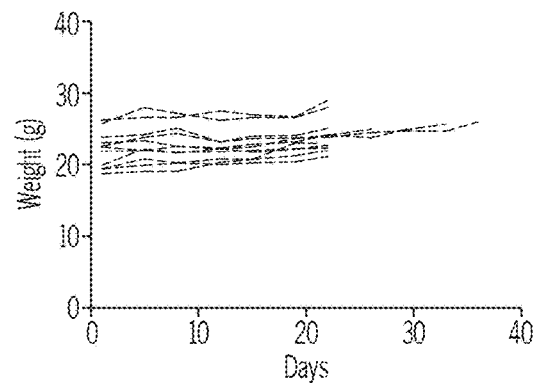
Figure 14H:
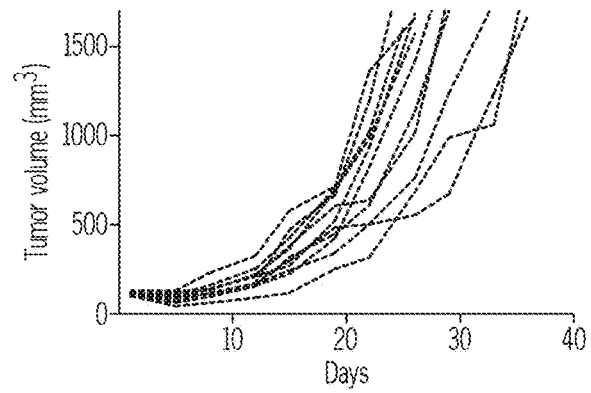
Figure 14I:
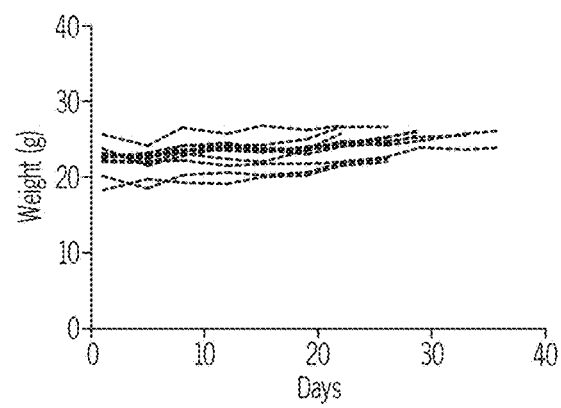
Figure 15A:
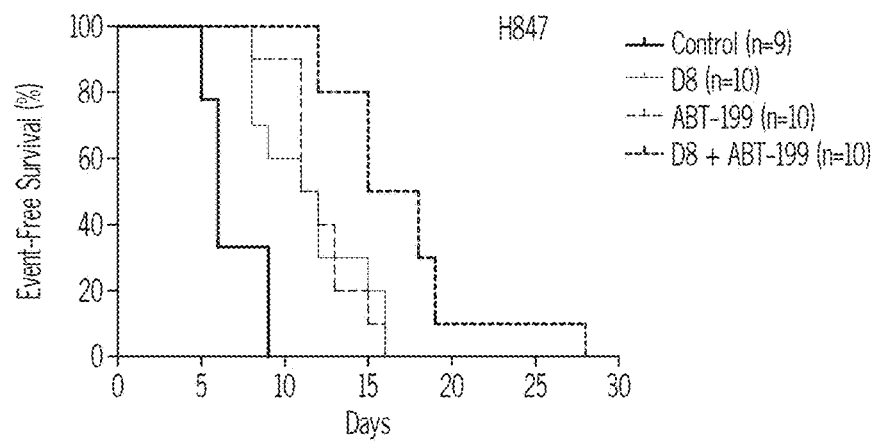
FIGS. 15A-15I show in vivo xenograft activity of D8 (narciclasine), a DNA-PK interaction inhibitor, and ABT-263, a BCL-2 inhibitor, in mice carrying H847, a human small cell lung cancer cell line.
Figure 15B:
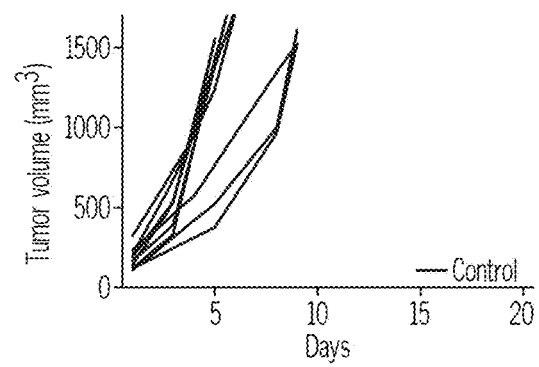
Figure 15C:
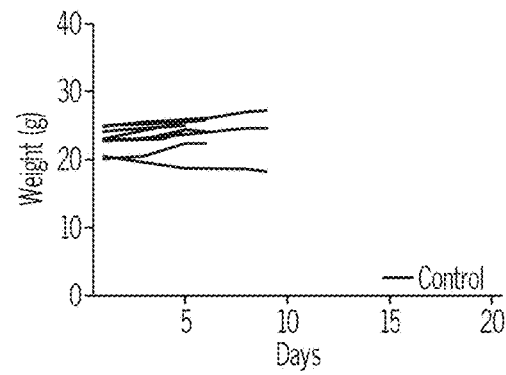
Figure 15D:
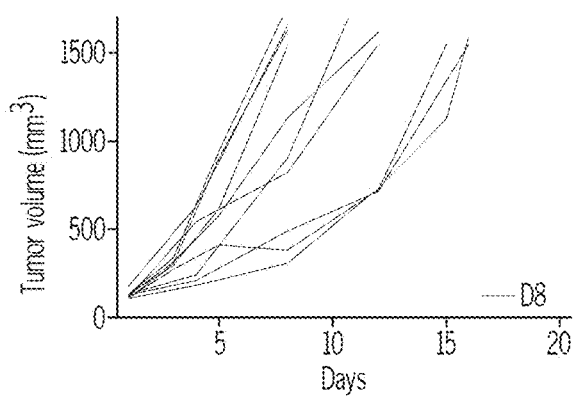
Figure 15E:
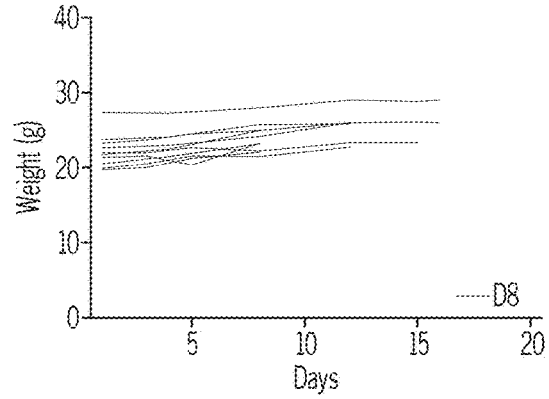
Figure 15F:
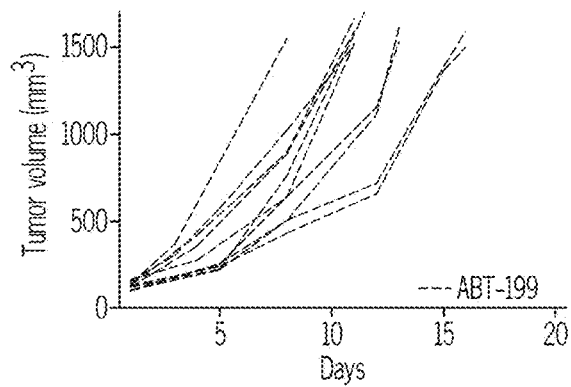
Figure 15G:
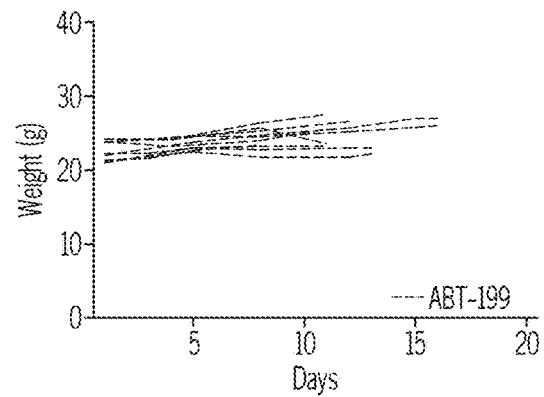
Figure 15H:
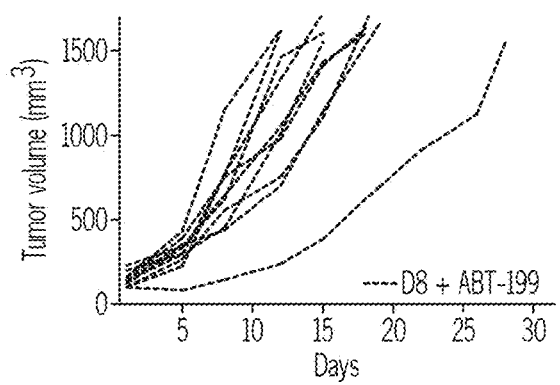
Figure 15I:
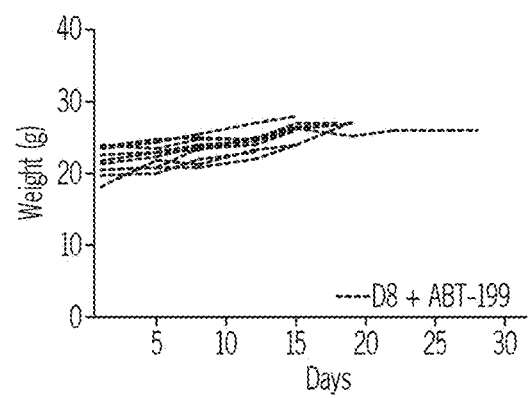
Figure 16A:
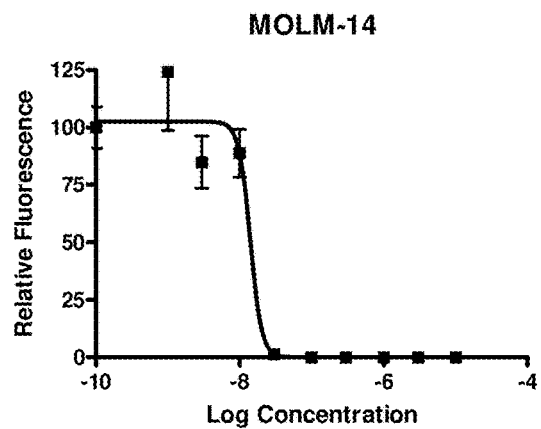
FIGS. 16A-16F provide data illustrating the in vitro cytotoxic activity of D8 (narciclasine) in six human acute myelogenous leukemia cell lines.
Figure 16B:
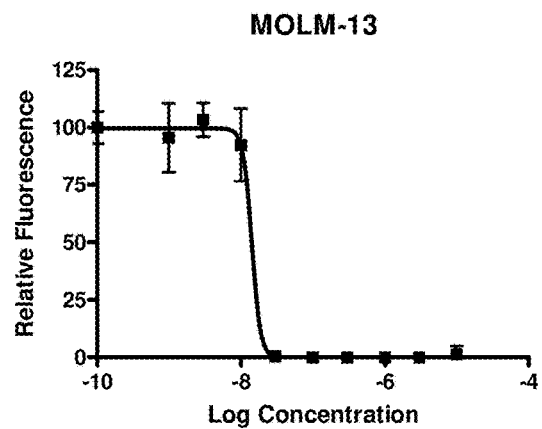
Figure 16C:
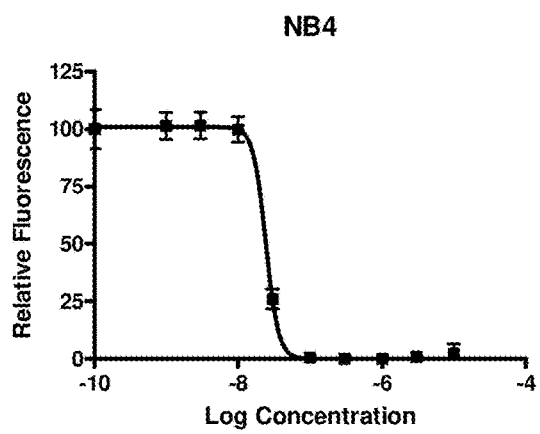
Figure 16D:
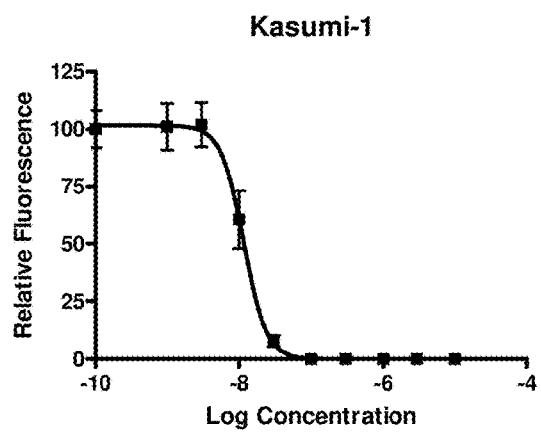
Figure 16E:
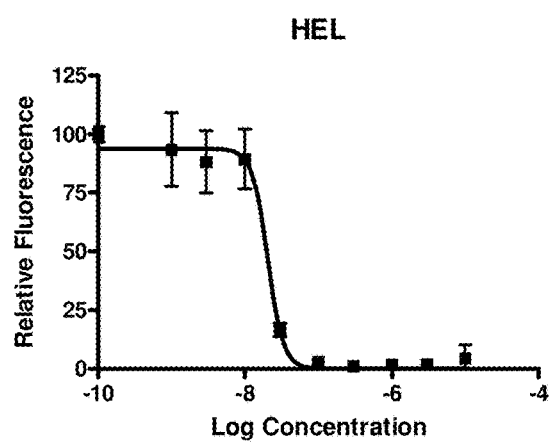
Figure 16F:
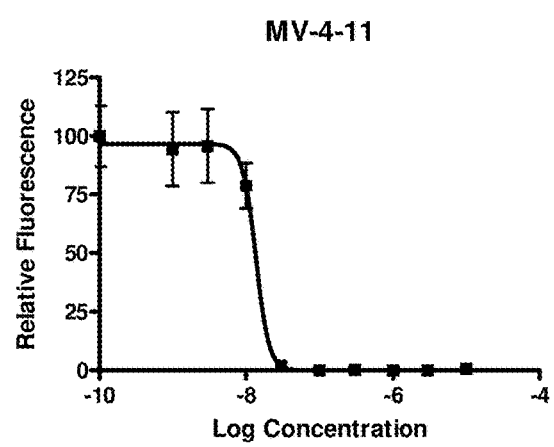

Next, Applicants sought to check the activity of narciclasine when combined with other active agents. Venetoclax is currently indicated for chronic lymphocytic leukemia (CLL) and small lymphocytic lymphoma (SLL) patients. Previous studies also demonstrated that lung cancers with high BCL-2 expression responds well to pan BCL-2 inhibitors. Thus, Applicants combined narciclasine with ABT-737/ABT-263, pan BCL-2 inhibitors or venetoclax (also known as ABT-199, a BCL-2 inhibitor) to examine the effect of the combination. When combined with ABT-737, narciclasine demonstrated synergistic cytotoxic activity at 10 and 20 nM in NCI-H847 (FIGS. 12A-12B) and NCI-H1048 cell lines (FIGS. 12C-12D). Both M3814 and narciclasine showed higher c-MYC downregulation effect and cyclin A suppression effect when combined with ABT-737. Additionally, apoptosis markers showed that the combination results in higher cleavage of PARP and caspase 3 compared with single agents (FIG. 12E).

In vivo xenograft activity was examined for narciclasine or M3814 in combination with ABT-263 or ABT-199 in two xenograft models of small cell lung cancer, NCI-H1048 and NCI-H847. In NCI-H1048 xenografted mice, M3814 or narciclasine as single agents did not affect the event-free survival of the mice carrying human small cell lung cancer compared with control. However, when combined with ABT-263 (M3814) or ABT-199 (narciclasine), the combination significantly extended the event-free survival of xenograft mice (FIGS. 13A-13I and 14A-14I, respectively).

In NCI-H847 xenograft mice, narciclasine as a single agent extended the event-free survival of mice compared with vehicle control. Also, the combination of narciclasine and ABT-199 showed significantly longer event-free survival of the mice compared with the single agents (FIGS. 15A-15I).

In six human acute myelogenous leukemia (AML) cell lines, in vitro cytotoxic activity of narciclasine was evaluated. In all six cell lines, $IC_{50}$ values between 10 and 30 nM were observed after 96 hours of incubation (FIGS. 16A-F).

Figure 17:
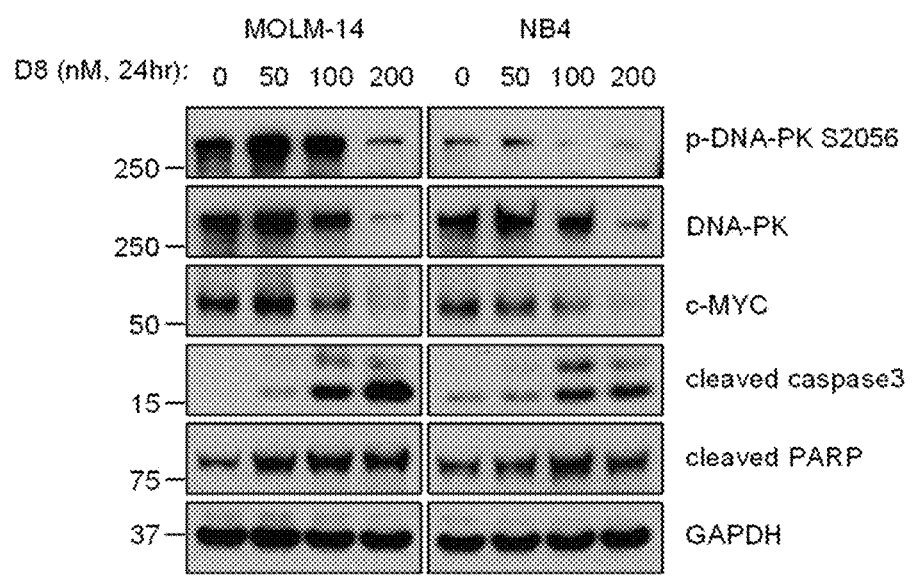
FIG. 17 provides data illustrating the effect of D8 (narciclasine) in the expression of c-MYC and apoptosis in two human acute myelogenous leukemia, MOLM-14 and NB4.

Of the six cell lines, two cell lines (MOLM-14 and NB4) were used to test the effect of narciclasine in c-MYC expression. After 24 hours of incubation at 100 to 200 nM concentration of narciclasine, c-MYC expression was substantially decreased, and PARP and caspase 3 cleavage were observed (FIG. 17).

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of treating a cancer in a subject, said method comprising:
   administering to the subject a composition, wherein the composition comprises:
   narciclasine, and
   a BCL-2 inhibitor selected from the group consisting of ABT-737, ABT-263, ABT-199, derivatives thereof, or combinations thereof,
   wherein the cancer comprises small cell lung cancers associated with c-MYC overexpression.

2. The method of claim 1, wherein the BCL-2 inhibitor comprises ABT-737.

3. The method of claim 1, wherein the BCL-2 inhibitor comprises ABT-199.

4. The method of claim 1, wherein the BCL-2 inhibitor comprises ABT-263.

5. The method of claim 1, wherein the composition further comprises at least one pharmaceutically acceptable carrier, wherein the at least one pharmaceutically acceptable carrier comprises at least one excipient.

6. The method of claim 1, wherein the subject is a human being suffering from the cancer.

* * * * *

SEQUENCE LISTING

<160> NUMBER OF SEQ ID NOS: 1

<210> SEQ ID NO 1
<211> LENGTH: 358
<212> TYPE: PRT
<213> ORGANISM: Human

<400> SEQUENCE: 1

```
Met Ala Gly His Leu Ala Ser Asp Phe Ala Phe Ser Pro Pro Pro Gly
1               5                  10                  15

Gly Gly Gly Asp Gly Pro Gly Gly Pro Glu Pro Gly Trp Val Asp Pro
            20                  25                  30

Arg Thr Trp Leu Ser Phe Gln Gly Pro Pro Gly Gly Pro Gly Ile Gly
                35                  40                  45

Pro Gly Val Gly Pro Gly Ser Glu Val Trp Gly Ile Pro Pro Cys Pro
 50                  55                  60

Pro Pro Tyr Glu Phe Cys Gly Gly Met Ala Tyr Cys Gly Pro Gln Val
65                  70                  75                  80

Gly Leu Val Pro Gln Gly Gly Leu Glu Thr Ser Gln Pro Glu Gly Glu
                85                  90                  95

Ala Gly Val Gly Val Glu Ser Asn Ser Asp Gly Ala Ser Pro Glu Pro
            100                 105                 110

Cys Thr Val Thr Pro Gly Ala Val Lys Leu Glu Lys Glu Lys Leu Glu
        115                 120                 125

Gln Asn Pro Glu Glu Ser Gln Asp Ile Lys Ala Leu Gln Lys Glu Leu
    130                 135                 140

Glu Gln Phe Ala Lys Leu Leu Lys Gln Lys Arg Ile Thr Leu Gly Tyr
145                 150                 155                 160

Thr Gln Ala Asp Val Gly Leu Thr Leu Gly Val Leu Phe Gly Lys Val
                165                 170                 175

Phe Ser Gln Thr Ile Ile Cys Arg Phe Glu Ala Leu Gln Leu Ser Phe
            180                 185                 190

Lys Asn Met Cys Lys Leu Arg Pro Leu Leu Gln Lys Trp Val Glu Glu
        195                 200                 205

Ala Asp Asn Asn Glu Asn Leu Gln Glu Ile Cys Lys Ala Glu Thr Leu
    210                 215                 220

Val Gln Ala Arg Lys Arg Lys Arg Thr Ser Ile Glu Asn Arg Val Arg
225                 230                 235                 240

Gly Asn Leu Glu Asn Leu Phe Leu Gln Cys Pro Lys Pro Thr Leu Gln
                245                 250                 255

Gln Ile Ser His Ile Ala Gln Gln Leu Gly Leu Glu Lys Asp Val Val
            260                 265                 270

Arg Val Trp Phe Cys Asn Arg Arg Gln Lys Gly Lys Arg Ser Ser Ser
        275                 280                 285

Asp Tyr Ala Gln Arg Glu Asp Phe Glu Ala Ala Gly Ser Pro Phe Ser
    290                 295                 300

Gly Gly Pro Val Ser Phe Pro Leu Ala Pro Gly Pro His Phe Gly Thr
305                 310                 315                 320
```

```
Pro Gly Tyr Gly Ser Pro His Phe Thr Ala Leu Tyr Ser Ser Val Pro
            325                 330                 335

Phe Pro Glu Gly Glu Ala Phe Pro Pro Val Ser Val Thr Thr Leu Gly
            340                 345                 350

Ser Pro Met His Ser Asn
        355
```